(12) United States Patent
Yamashita et al.

(10) Patent No.: US 11,188,567 B2
(45) Date of Patent: Nov. 30, 2021

(54) DATA ANALYSIS SUPPORT APPARATUS AND DATA ANALYSIS SUPPORT SYSTEM

(71) Applicant: Hitachi, Ltd., Tokyo (JP)

(72) Inventors: Yuko Yamashita, Tokyo (JP); Tsuyoshi Minakawa, Tokyo (JP); Tomoe Tomiyama, Tokyo (JP); Kenji Kawasaki, Tokyo (JP); Hidenori Yamamoto, Tokyo (JP); Takeshi Handa, Tokyo (JP); Takashi Tsuno, Tokyo (JP); Hiroyuki Hirata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 340 days.

(21) Appl. No.: 16/331,674

(22) PCT Filed: Jul. 21, 2017

(86) PCT No.: PCT/JP2017/026535
§ 371 (c)(1),
(2) Date: Mar. 8, 2019

(87) PCT Pub. No.: WO2018/078971
PCT Pub. Date: May 3, 2018

(65) Prior Publication Data
US 2019/0197047 A1    Jun. 27, 2019

(30) Foreign Application Priority Data
Oct. 25, 2016 (JP) .............................. JP2016-209063

(51) Int. Cl.
*G06F 16/28* (2019.01)
*G06F 11/30* (2006.01)
(Continued)

(52) U.S. Cl.
CPC .......... *G06F 16/285* (2019.01); *G06F 11/301* (2013.01); *G06F 11/3476* (2013.01); *G06F 16/2423* (2019.01); *G06F 16/288* (2019.01)

(58) Field of Classification Search
CPC .... G06F 16/285; G06F 16/288; G06F 11/301; G06F 11/3476
See application file for complete search history.

(56) References Cited

U.S. PATENT DOCUMENTS

| 6,052,687 A | 4/2000 | Miura et al. |
| 10,074,135 B2 * | 9/2018 | Byron ............... G06F 17/30587 |

(Continued)

FOREIGN PATENT DOCUMENTS

| JP | 11-3257 A | 1/1999 |
| JP | 2012-73812 A | 4/2012 |

(Continued)

OTHER PUBLICATIONS

International Search Report (PCT/ISA/210) issued in PCT Application No. PCT/JP2017/026535 dated Oct. 24, 2017 with English translation (four (4) pages).
Japanese-language Written Opinion (PCT/ISA/237) issued in PCT Application No. PCT/JP2017/026535 dated Oct. 24, 2017 with English translation (three (3) pages).

*Primary Examiner* — Kris E Mackes
(74) *Attorney, Agent, or Firm* — Crowell & Moring LLP

(57) ABSTRACT

A data analysis support apparatus includes a relationship network generation section that analyzes a relationship between operating systems, a relationship between operation data tables, a relationship between data items possessed by the operation data tables and a relationship between data values possessed by records of the operation data tables and stores them, as a relationship network; a data item classification section that classifies data items that become a data analysis target into a first data type based on an actual value and a second data type based on a planned value; an analysis (Continued)

data table generation section that generates and accumulates an analysis data table to be used for data analysis; a data model generation section that generates, as a data model, a data item group that allows data analysis in combination; and an analysis target item presentation section that recommends a data item to be made an analysis target.

8 Claims, 44 Drawing Sheets

(51) Int. Cl.
    *G06F 11/34*      (2006.01)
    *G06F 16/242*     (2019.01)

(56) References Cited

U.S. PATENT DOCUMENTS

| | | | |
|---|---|---|---|
| 2006/0230071 A1* | 10/2006 | Kass | G06F 16/2465 |
| 2014/0188785 A1 | 7/2014 | Asai et al. | |
| 2018/0032554 A1* | 2/2018 | Widjanarko | G06F 16/212 |
| 2018/0181667 A1* | 6/2018 | Kolb | G06F 16/9024 |

FOREIGN PATENT DOCUMENTS

| | | |
|---|---|---|
| JP | 2012-103841 A | 5/2012 |
| JP | 2014-130539 A | 7/2014 |
| JP | 2015-165352 A | 9/2015 |
| JP | 2016-133899 A | 7/2016 |

* cited by examiner

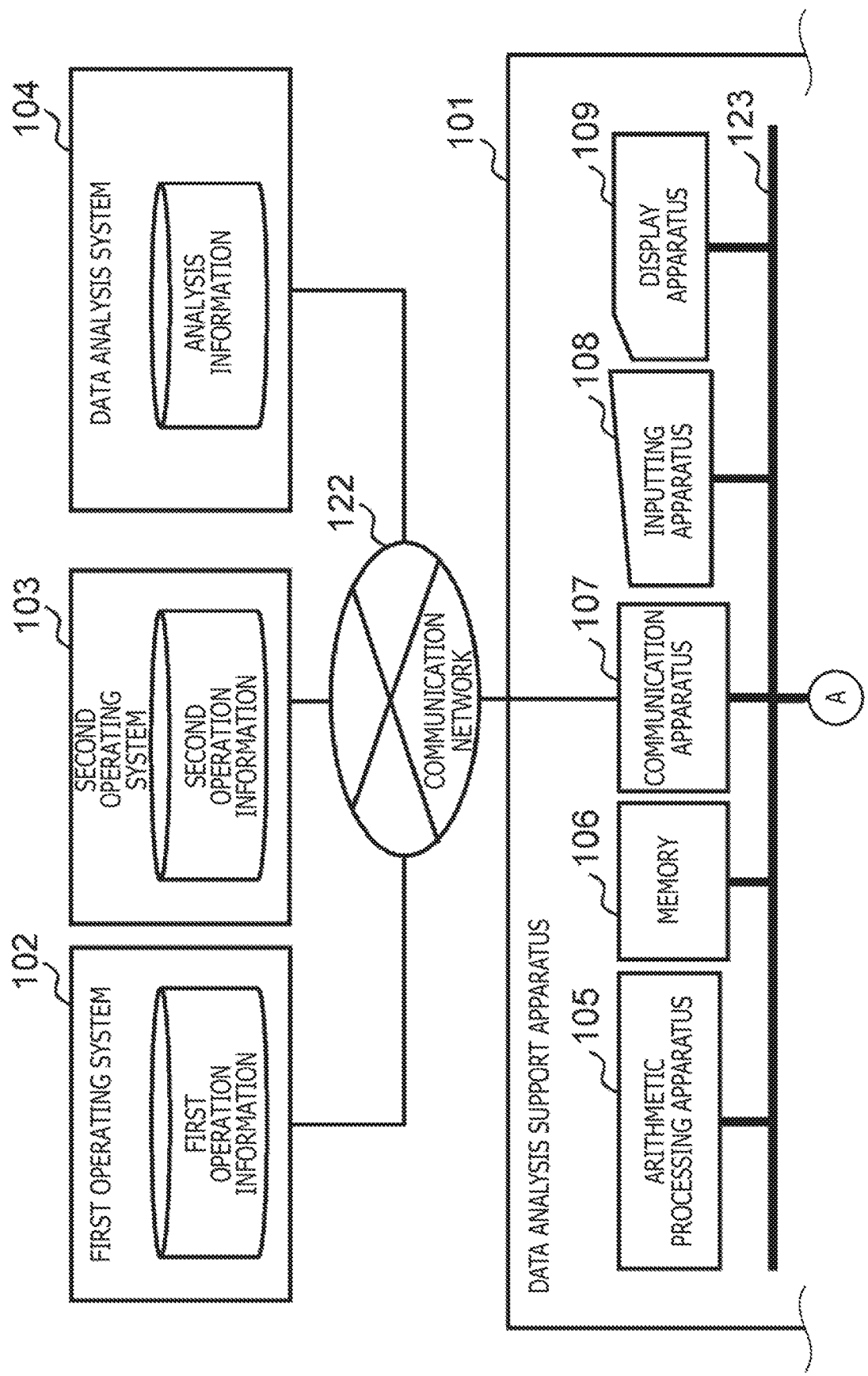

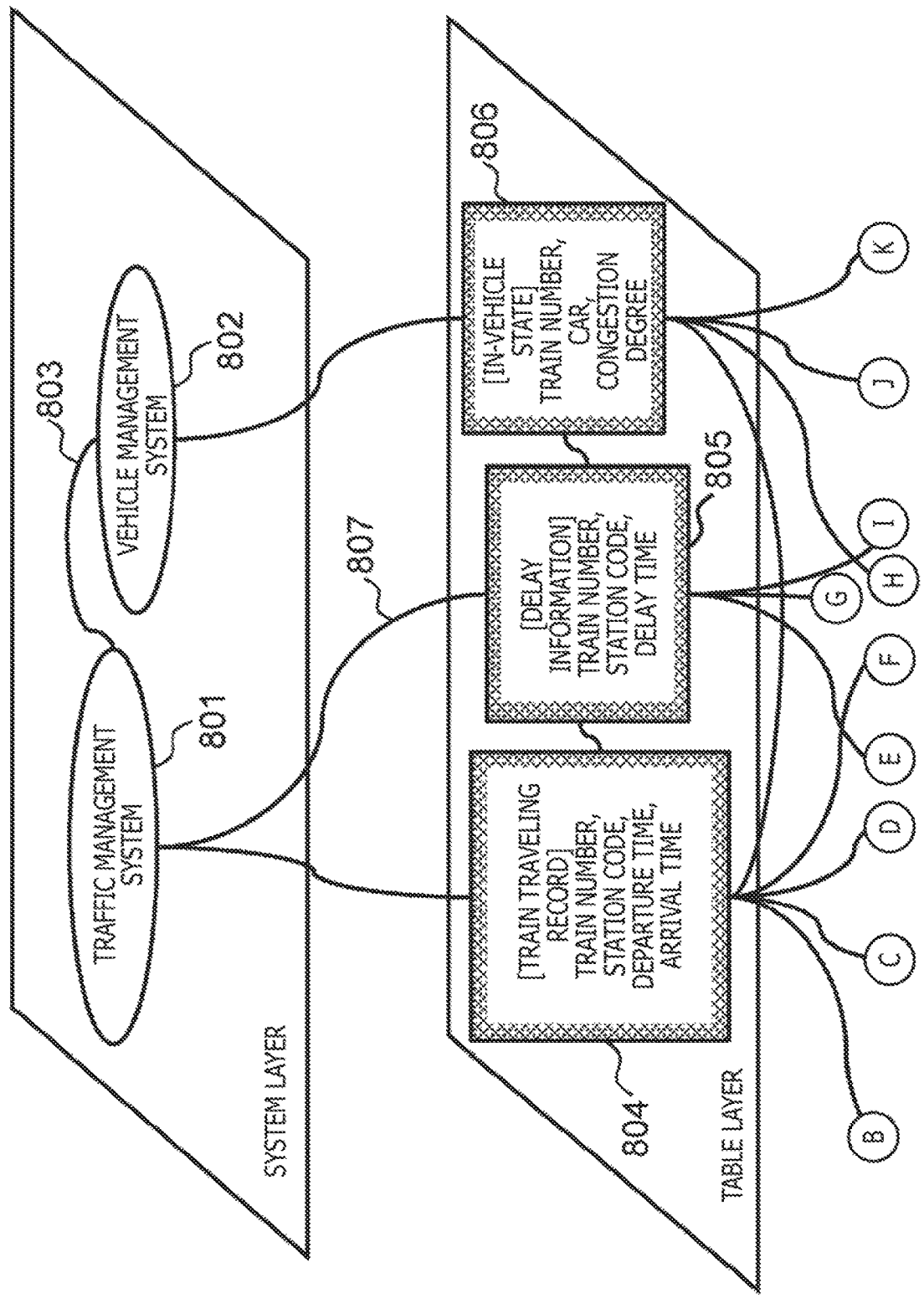

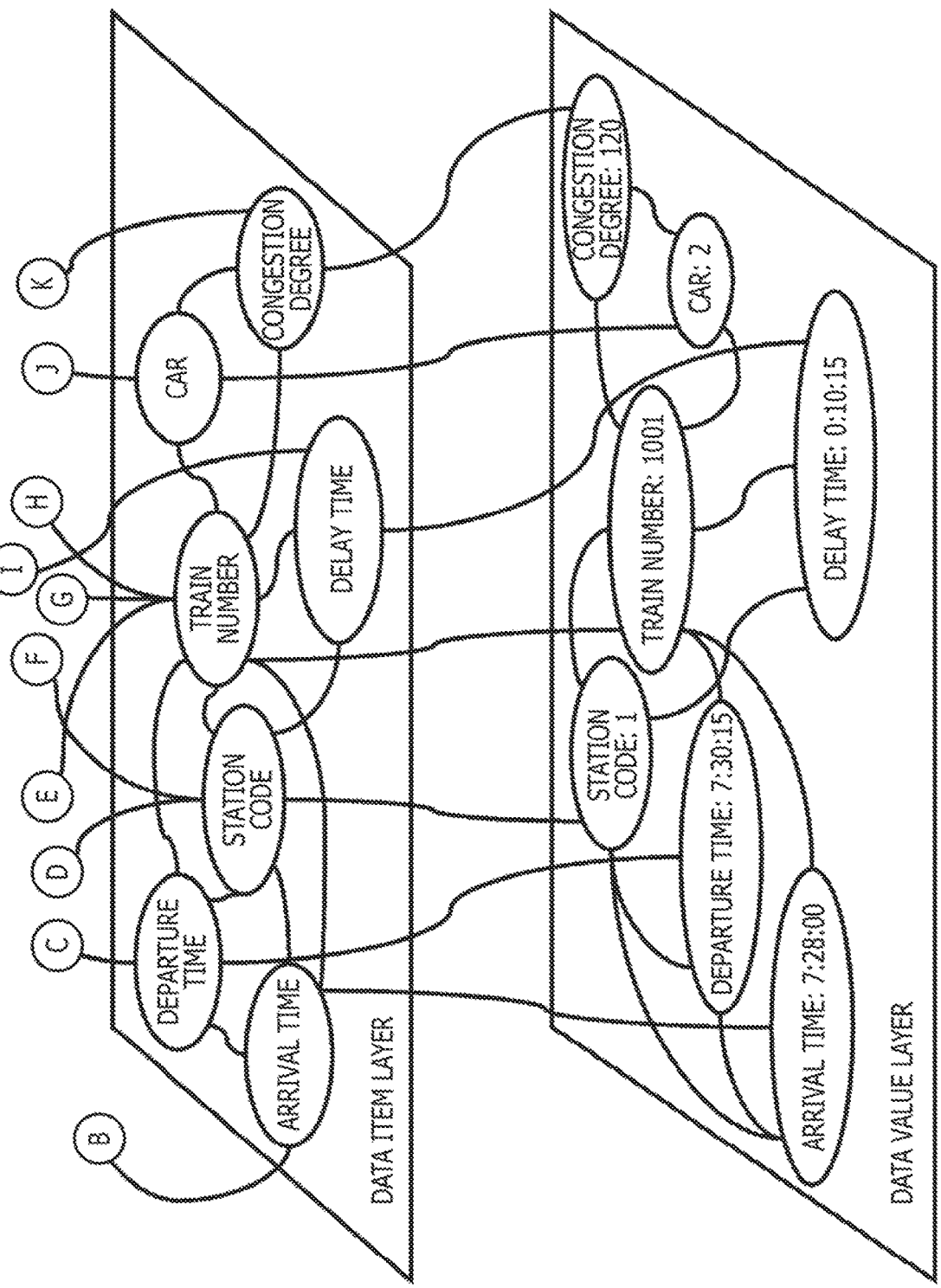

FIG. 3A

| LAYER | NODE | LINK |
|---|---|---|
| SYSTEM LAYER | ● | ● |
| TABLE LAYER | | |
| DATA ITEM LAYER | | |
| DATA VALUE LAYER | | |

FIG. 3B

| ID (901) | SYSTEM NAME (902) |
|---|---|
| 0 | TRAFFIC MANAGEMENT SYSTEM |
| 1 | VEHICLE MANAGEMENT SYSTEM |
| ... | ... |

FIG. 3C

| ID (903) | from (904) | To (905) | TYPE (906) | WEIGHT (907) |
|---|---|---|---|---|
| 0 | 0 | 1 | 1 | 2 |
| ... | ... | ... | ... | ... |

FIG. 4A

| LAYER | NODE | LINK |
|---|---|---|
| SYSTEM LAYER | | |
| TABLE LAYER | | |
| DATA ITEM LAYER | | |
| DATA VALUE LAYER | | |

FIG. 4B

| | 1001 | 1002 | 1003 | 1004 | 1005 |
|---|---|---|---|---|---|
| | ID | TABLE NAME | ITEM | TYPE | SOURCE SYSTEM ID |
| | 0 | TRAIN TRAVELING RECORD | 0,1,2,3 | 1 | 0 |
| | 1 | DELAY INFORMATION | 0,1,4 | 1 | 0 |
| | 2 | IN-VEHICLE STATE | 0,5,6 | 1 | 1 |
| | 3 | STATION MASTER | 1,7,8 | 0 | 0 |
| | ... | ... | ... | ... | ... |

FIG. 4C

| ID | from | To | TYPE | WEIGHT |
|---|---|---|---|---|
| 0 | 0 | 1 | 1 | 2 |
| 1 | 0 | 1 | 1 | 1 |
| 2 | 1 | 2 | 1 | 1 |
| ... | ... | ... | ... | ... |

FIG. 5A

| LAYER | NODE | LINK |
|---|---|---|
| SYSTEM LAYER | | |
| TABLE LAYER | | |
| DATA ITEM LAYER | ● | |
| DATA VALUE LAYER | | ● |

FIG. 5B

| ID | ITEM NAME | WEIGHT | TYPE | TABLE ID |
|---|---|---|---|---|
| 0 | TRAIN NUMBER | 3 | 0 | 0,1,2 |
| 1 | STATION CODE | 2 | 0 | 0,1 |
| 2 | DEPARTURE TIME | 1 | 1 | 0 |
| 3 | ARRIVAL TIME | 1 | 1 | 0 |
| 4 | DELAY TIME | 1 | 1 | 1 |
| 5 | CAR | 1 | 0 | 2 |
| 6 | CONGESTION DEGREE | 1 | 1 | 3 |
| ... | ... | ... | ... | ... |

FIG. 5C

| ID | from | To | TYPE | WEIGHT | TABLE ID |
|---|---|---|---|---|---|
| 0 | 0 | 1 | 1 | 2 | 0,1 |
| 1 | 0 | 2 | 1 | 2 | 1 |
| 2 | 0 | 3 | 1 | 3 | 2 |
| ... | ... | ... | ... | ... | ... |

FIG. 6A

| LAYER | NODE | LINK |
|---|---|---|
| SYSTEM LAYER | | |
| TABLE LAYER | | |
| DATA ITEM LAYER | | |
| DATA VALUE LAYER | | |

FIG. 6B

| ID | VALUE | WEIGHT | DATA ITEM ID | (TABLE ID, RECORD ID) |
|---|---|---|---|---|
| 0 | 1001 | 3 | 0 | (0,1),(1,1),(2,1) |
| 1 | 1 | 2 | 1 | (0,1),(1,1) |
| 2 | 7:30:15 | 1 | 2 | (0,1) |
| 3 | 7:28:00 | 1 | 3 | (0,1) |
| ... | ... | ... | ... | ... |

FIG. 6C

| ID | from | To | TYPE | WEIGHT | (TABLE ID, RECORD ID) |
|---|---|---|---|---|---|
| 0 | 0 | 1 | 1 | 2 | (0,1),(1,1) |
| 1 | 0 | 2 | 1 | 2 | (0,1) |
| 2 | 0 | 3 | 1 | 3 | (0,1) |
| ... | ... | ... | ... | ... | ... |

FIG. 7A

STATION MASTER

| STATION CODE | STATION NAME | STATION ADDRESS |
|---|---|---|
| 1 | HITACHI NORTH | KITATOTUKA 1-2-3, YOSHIDA-SHI, HITACHI-KEN |
| 2 | HITACHI SOUTH | MINAMITOTSUKA 1-2-3, YOSHIDA-SHI, HITACHI-KEN |
| 3 | HITACHI WEST | NISHITOTSUKA 1-2-3, YOSHIDA-SHI, HITACH-KEN |
| ... | ... | ... |

FIG. 7B

TRAIN TRAVELING RECORD TABLE

| TRAIN NUMBER | STATION CODE | DEPARTURE TIME | ARRIVAL TIME |
|---|---|---|---|
| 1001 | 1 | 7:30:15 | 7:28:00 |
| ... | ... | ... | ... |

FIG. 7C

DELAY INFORMATION TABLE

| TRAIN NUMBER | STATION CODE | DELAY TIME |
|---|---|---|
| 1001 | 1 | 0:10:15 |
| ... | ... | ... |

FIG. 7D

IN-VEHICLE STATE TABLE

| TRAIN NUMBER | CAR | CONGESTION DEGREE |
|---|---|---|
| 1001 | 2 | 120 |
| ... | ... | ... |

FIG. 8A

| ANALYSIS TABLE ID | ANALYSIS TABLE |
|---|---|
| 1 | |
| 2 | |
| ... | ... |

| TRAIN NUMBER | STATION CODE | DEPARTURE TIME | ARRIVAL TIME | DELAY TIME | STATION NAME |
|---|---|---|---|---|---|
| | 5 | 7:30:15 | 7:28:00 | 0:10:15 | HITACHI NORTH |
| | 5 | 7:40:15 | 7:41:00 | 0:23:45 | HITACHI SOUTH |
| | 5 | 7:45:30 | 7:48:15 | 0:06:15 | HITACHI NORTH |
| ... | ... | ... | ... | ... | ... |

| STATION ADDRESS | ADDRESS | OBSERVATION PLACE |
|---|---|---|
| KITATOTUKA 1-2-3, YOSHIDA-SHI, HITACHI-KEN | YOSHIDA-SHI, HITACHI-KEN | 1 |
| MINAMITOTSUKA 1-2-3, YOSHIDA-SHI, HITACHI-KEN | YOSHIDA-SHI, HITACHI-KEN | 1 |
| NISHITOTSUKA 1-2-3, YOSHIDA-SHI, HITACHI-KEN | YOSHIDA-SHI, HITACHI-KEN | 1 |
| ... | ... | ... |

| TIME | PRECIPITATION AMOUNT | WIND SPEED |
|---|---|---|
| 7:30:00 | 0.2 | 5 |
| 7:30:00 | 0.3 | 3 |
| 8:00:00 | 0.1 | 7 |
| ... | ... | ... |

| MODEL ID | DATA ITEM | SCORE | LINK | ANALYSIS TABLE |
|---|---|---|---|---|
| 1 |  |  |  | 1 |
| 2 |  |  |  |  |
| ... | ... | ... | ... | ... |

1501 — MODEL ID
1502 — DATA ITEM
1503 — SCORE
1504 — LINK
1505 — ANALYSIS TABLE

FIG. 9B

| ITEM ID | ITEM NAME |
|---|---|
| 0 | TRAIN NUMBER |
| 1 | STATION CODE |
| 2 | DELAY TIME |
| 3 | TRACK NUMBER |
| 4 | DEPARTURE TIME |
| 5 | STATION NAME |
| 6 | STATION ADDRESS |
| ... | ... |

1506 — ITEM ID
1507 — ITEM NAME

FIG. 9C

| SCORE ID | ITEM ID (1) | ITEM ID (2) | CORRELATION COEFFICIENT | SAMPLE NUMBER |
|---|---|---|---|---|
| 1 | 1 | 2 | 0.8 | 10 |
| 2 | 1 | 4 | 0.1 | 250 |
| 3 | 2 | 10 | -0.6 | 1000 |
| ... | ... | ... | ... | ... |

1513 — SCORE ID
1514 — ITEM ID (1)
1515 — ITEM ID (2)
1516 — CORRELATION COEFFICIENT
1517 — SAMPLE NUMBER

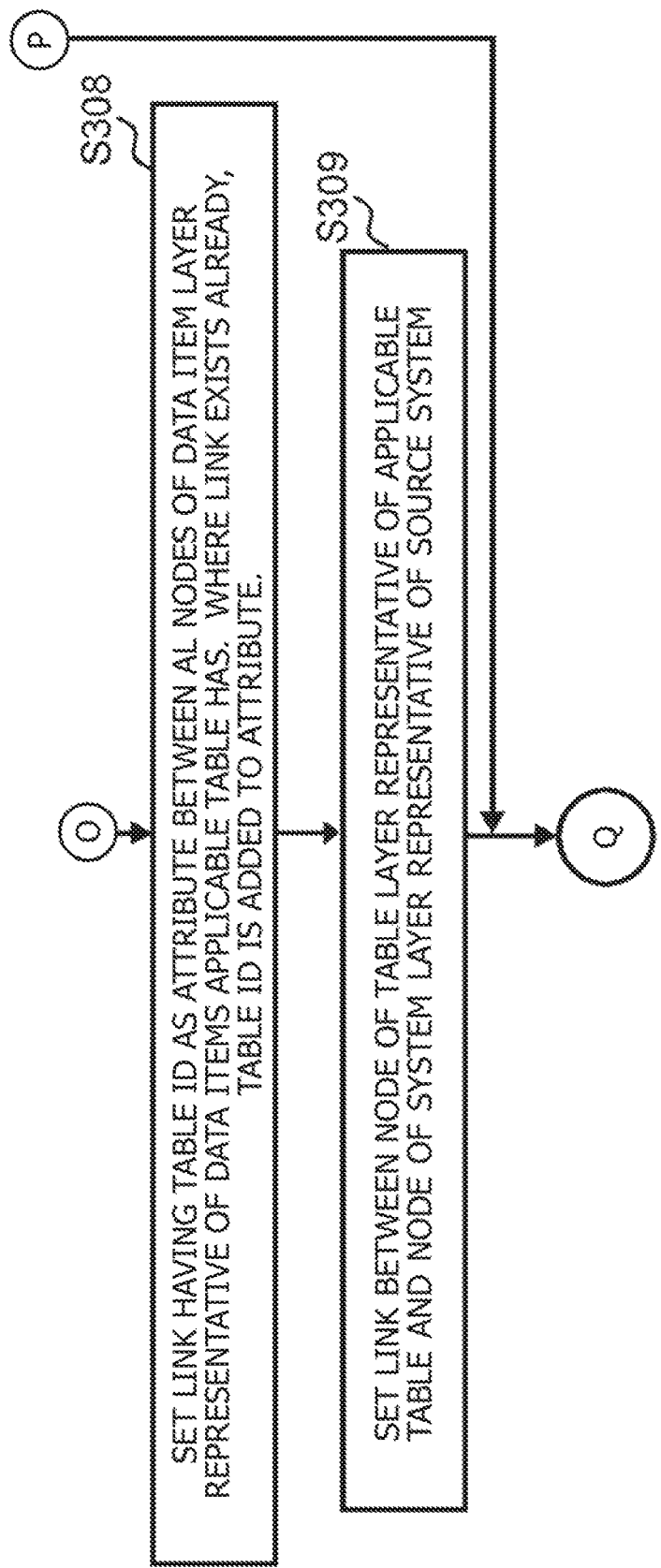

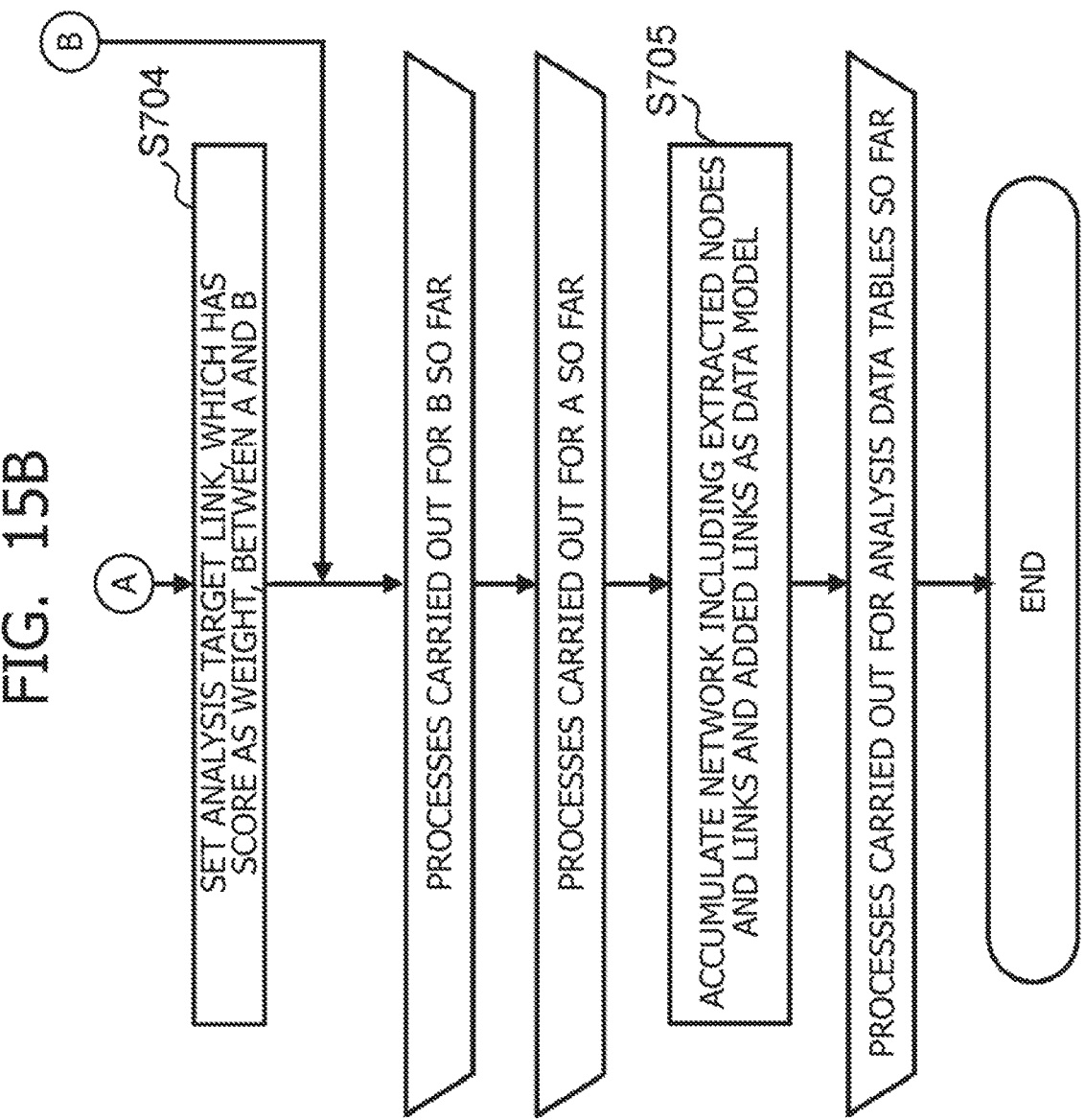

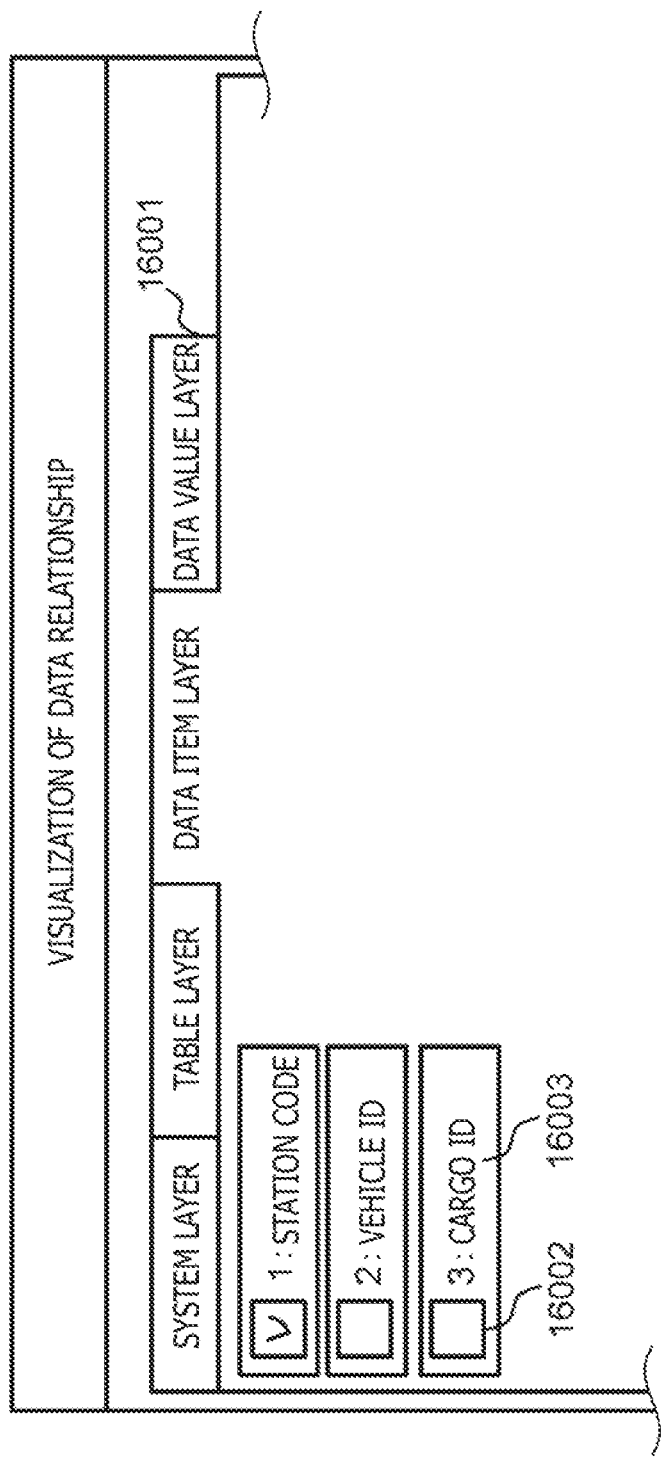

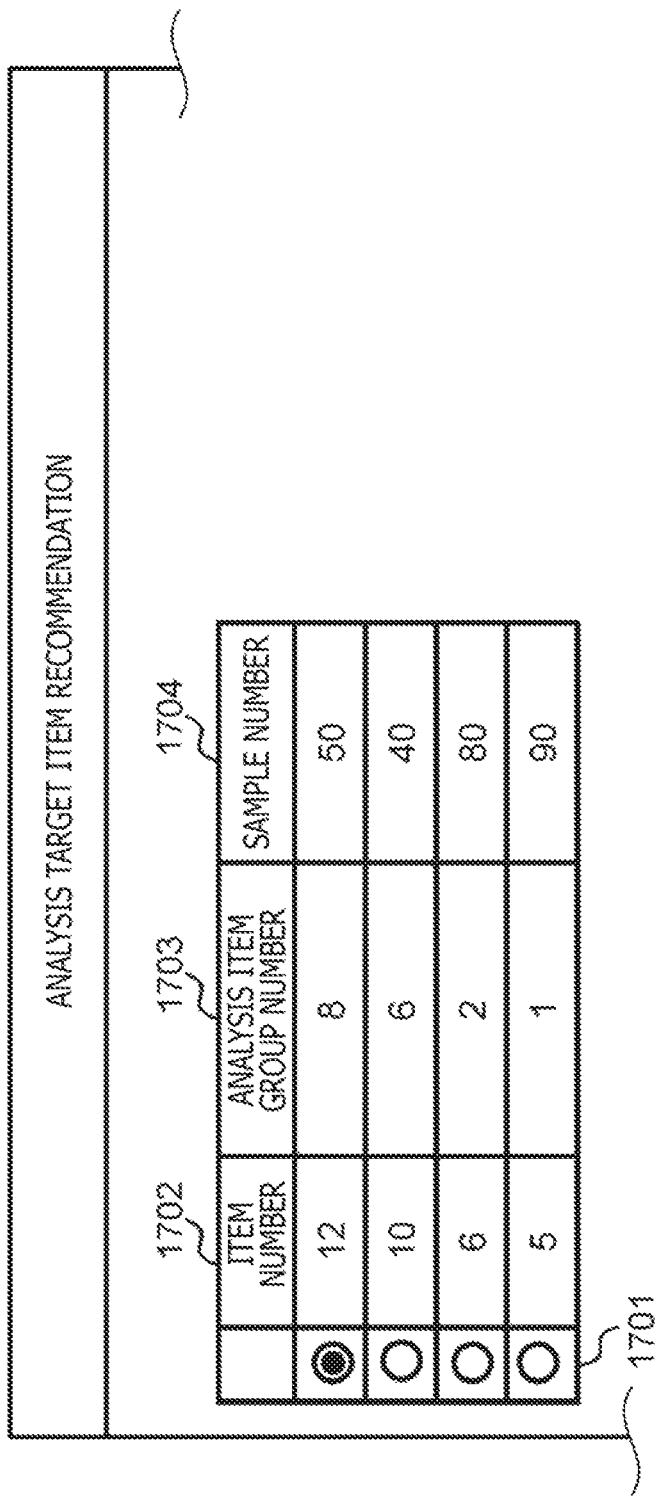

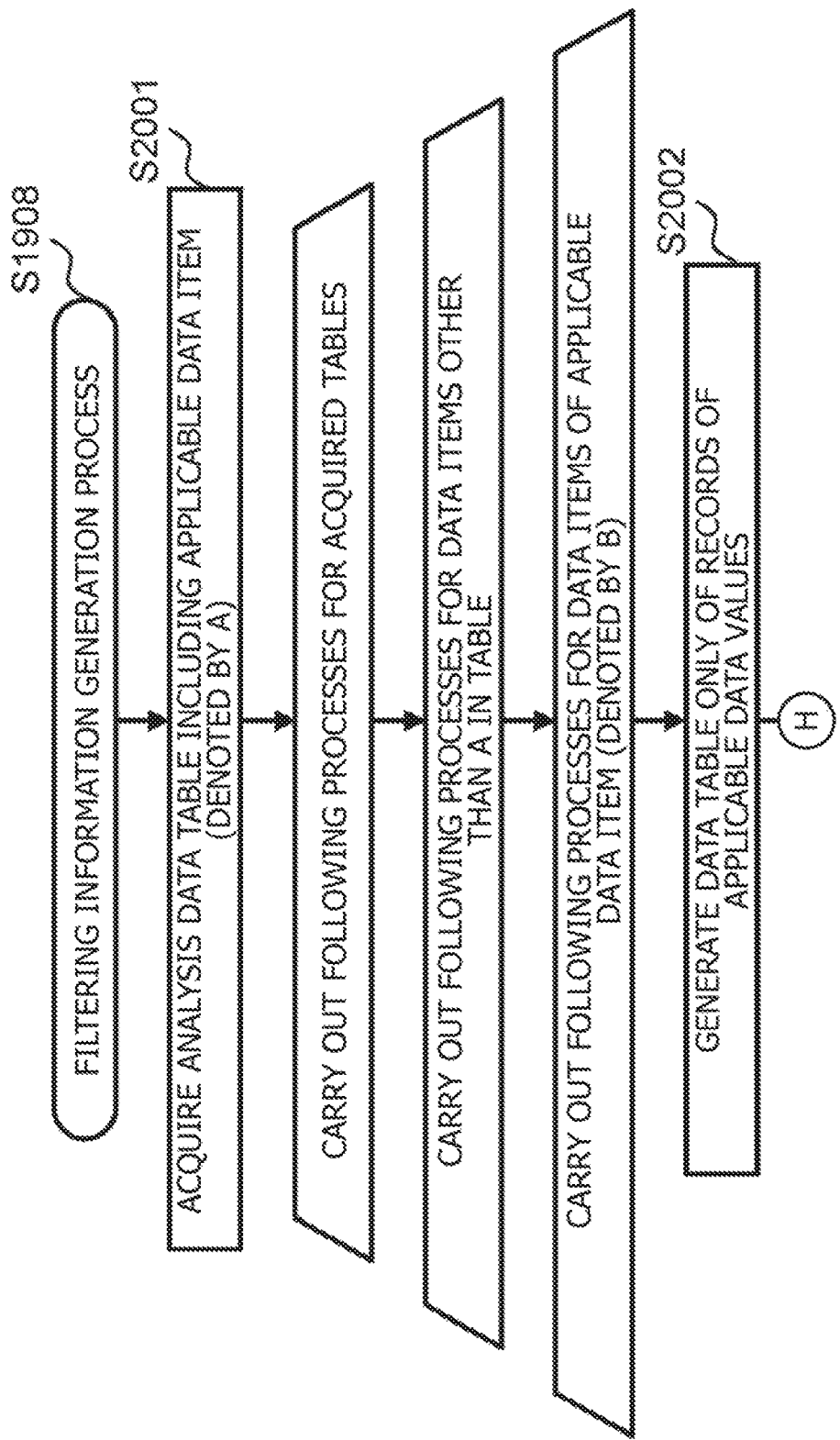

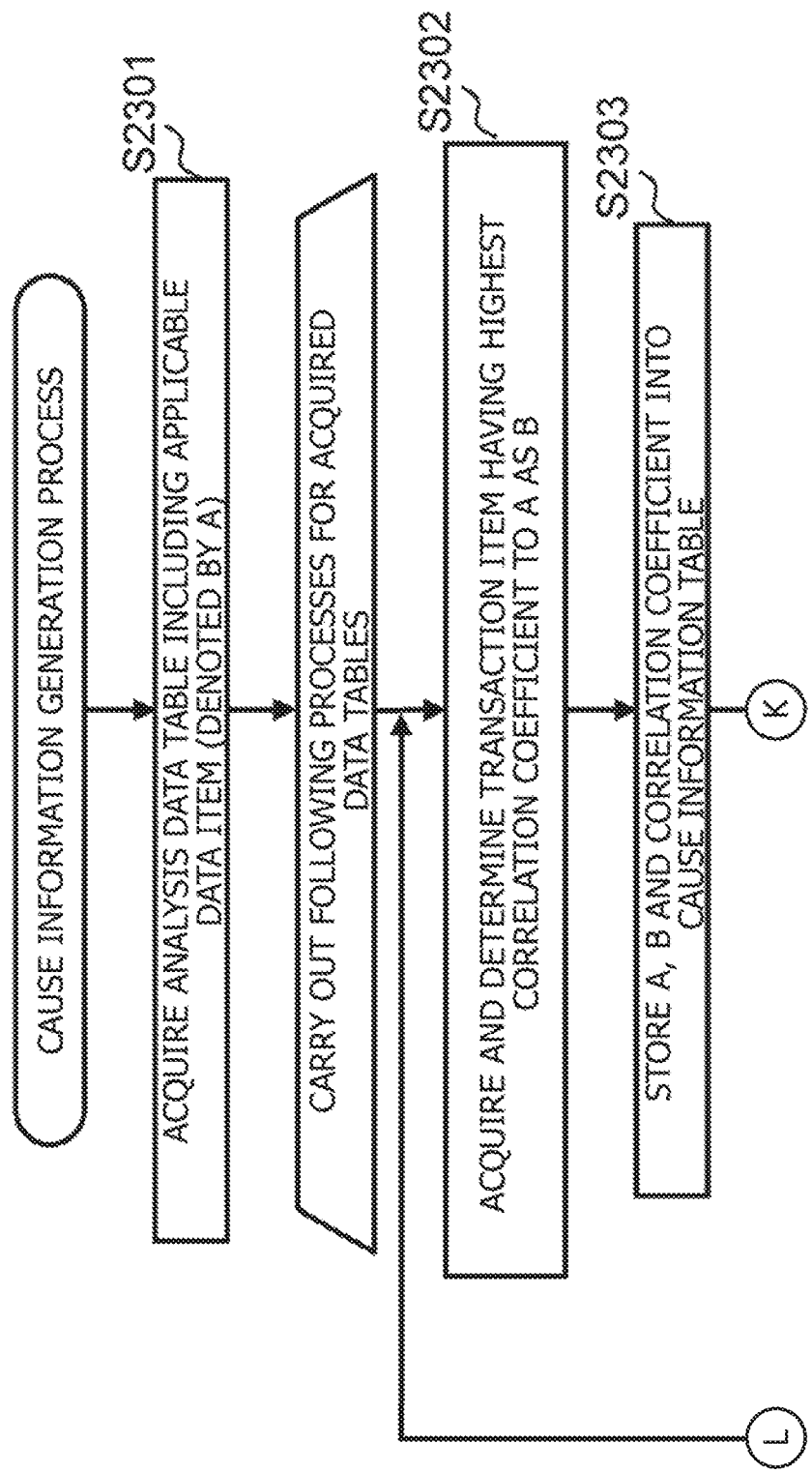

DATA ANALYSIS SUPPORT APPARATUS AND DATA ANALYSIS SUPPORT SYSTEM

TECHNICAL FIELD

The present invention relates to a data analysis support apparatus and a data analysis support system and is suitably applied particularly to a data analysis support apparatus and a data analysis support system relating to a technology for recommending candidates for a data item that is to be made an analysis target when data of a plurality of systems are analyzed.

BACKGROUND ART

In the railway, industry and other fields, with the retirement of veteran generations, needs for data utilization toward accumulation and succession by IT of knowhow cultivated in the field and measures for further improving the work efficiency are increasing. Meanwhile, especially in the railway field, operating systems for operation, sales, maintenance and so forth of railway companies have been developed separately from each other, and cross data utilization is difficult.

When data are to be analyzed, data items are combined variously to find out a group of data items with which a desired analysis can be carried out. However, generally the importance and the burden of this work increase as the number of data items increases. In order to select analysis target items, it is necessary to understand the substance of data.

If an ER chart and data specification sheets of operating systems in which table definitions are described are available, then it is possible to understand data by reading the data specification sheets. However, in an old-fashioned system, occasionally a data specification sheet is not ready for repeated system renovation. Further, in the case of a system having a large scale, it is difficult to read all specification sheets. In the case where data of a system by a different company are treated, it is sometimes impossible to obtain a pertaining data specification sheet.

In this connection, conventionally the number of candidates is reduced with knowledge and experience of analysis representatives to select analysis target items. Therefore, there is a problem that the analysis result relies upon the ability of the analysis representatives.

In the prior art, the relevance of data between data items of multidimensional data is calculated, and a group of data items suitable for an analysis target are extracted on the basis of the relevance and are presented as analysis target items to be recommended to a user (refer to Patent Document 1).

PRIOR ART DOCUMENT

Patent Document

Patent Document 1: JP-2012-103841-A

SUMMARY OF THE INVENTION

Problem to be Solved by the Invention

However, according to the prior art (Patent Document 1) described above, since data items of an analysis target are recommended in regard to data items in a same data table, analysis target items targeting a plurality of tables cannot be recommended. Further, in the case where analysis is performed across a plurality of tables, it is necessary to extract and use table definition information such as main key information, reference information and so forth from a DB or the like.

The present invention has been made taking the foregoing into consideration and proposes a data analysis support apparatus and a data analysis support system by which, targeting a plurality of tables, even a person who does not have data knowledge or a person who does not have field knowledge can easily select analysis target items and perform analysis without using table definition information. For example, in the railway field, data of a variety of operating systems of a railway operator are not analyzed after data analysis experts understand the data taking time, but when a person in charge of the railway operator analyses a plurality of pieces of operation information in combination using the data analysis system, the person can understand the data and select analysis target items to perform analysis without spending time.

Means for Solving the Problem

In order to solve such a subject as described above, according to the present invention, a data analysis support apparatus that supports analysis targeting operation data of operation data tables in at least one or more operating systems includes a data item classification section configured to classify data items possessed by the individual operation data into a first data type based on an actual value and a second data type based on a planned value or a pre-definition, a relationship network generation section configured to generate a relationship between the operating systems, a relationship between the operation data tables, a relationship between the data items possessed by the operation data tables and a relationship between data values possessed by records of the operation data tables as a relationship network, an analysis data table generation section configured to generate, based on the relationship network, an analysis data table that includes at least one data items included in the first data type, a data model generation section configured to calculate a score, for analysis target candidates configured from combinations of the data items, a score to be used as an analysis recommendation degree based on the analysis data table, and an analysis target item presentation section configured to output the analysis target candidates together with the analysis recommendation degrees based on the scores calculated by the data model generation section.

Further, in the present invention, a data analysis support system including a data analysis support apparatus that supports analysis targeting operation data of operation data tables in at least one or more operating systems includes a data analysis support apparatus including a data item classification section configured to classify data items possessed by the individual operation data into a first data type based on an actual value and a second data type based on a planned value or a pre-definition, a relationship network generation section configured to generate a relationship between the operating systems, a relationship between the operation data tables, a relationship between the data items possessed by the operation data tables and a relationship between data values possessed by records of the operation data tables as a relationship network, an analysis data table generation section configured to generate, based on the relationship network, an analysis data table that includes at least one data items included in the first data type, a data model generation section configured to calculate a score, for analysis target candidates configured from combinations of the data items, a score to be used as an analysis recommendation degree based on the analysis data table, and an analysis target item presentation section configured to output the analysis target candidates together with the analysis recommendation degrees based on the scores calculated by the data model generation section, and an analysis apparatus configured to determine an analysis target item based on the analysis target candidates outputted from the data analysis support apparatus.

Effect of the Invention

With the present invention, targeting a plurality of tables, even a person who does not have data knowledge or a person who does not have field knowledge can easily select analysis target items and perform analysis without using table definition information.

BRIEF DESCRIPTION OF THE DRAWINGS

FIGS. 1A and 1B are views depicting an example of a system configuration of a data analysis support system including a data analysis support apparatus according to a first embodiment.

FIGS. 2A and 2B are views depicting an example of a relationship network according to the first embodiment.

FIGS. 3A to 3C are views (part 1) depicting an example of a table configuration of relationship network information.

FIGS. 4A to 4C are views (part 2) depicting an example of a table configuration of relationship network information.

FIGS. 5A to 5C are views (part 3) depicting an example of a table configuration of relationship network information.

FIGS. 6A to 6C are views (part 4) depicting an example of a table configuration of relationship network information.

FIGS. 7A to 7D are views depicting an example of operation information possessed by an operating system.

FIGS. 8A to 8D are views depicting an example of a table configuration of an analysis data table information table.

FIGS. 9A to 9C are views depicting an example of a table configuration of a data model information table.

FIGS. 11A to 11C are flow charts (part 1) depicting an example of a relationship network generation-update process according to the first embodiment.

FIGS. 15A and 15B are flow charts depicting an example of a data model generation process according to the first embodiment.

FIGS. 16A and 16B are views depicting a first example of a screen image in the first embodiment.

FIGS. 17A and 17B are views depicting a second example of a screen image in the first embodiment.

FIGS. 20A to 20C are flow charts depicting a filtering information generation process according to the second embodiment.

FIGS. 23A to 23C are flow charts depicting a cause information generation process according to the third embodiment.

MODES FOR CARRYING OUT THE INVENTION

In the following, embodiments of the present invention are described in detail with reference to the drawings. It is to be noted that the present embodiments are described taking a data analysis support apparatus and a data analysis support system when data relating to a railway are analyzed as an example of an application target thereof.

(1) First Embodiment (1-1) Example of System Configuration

Figure 1B:
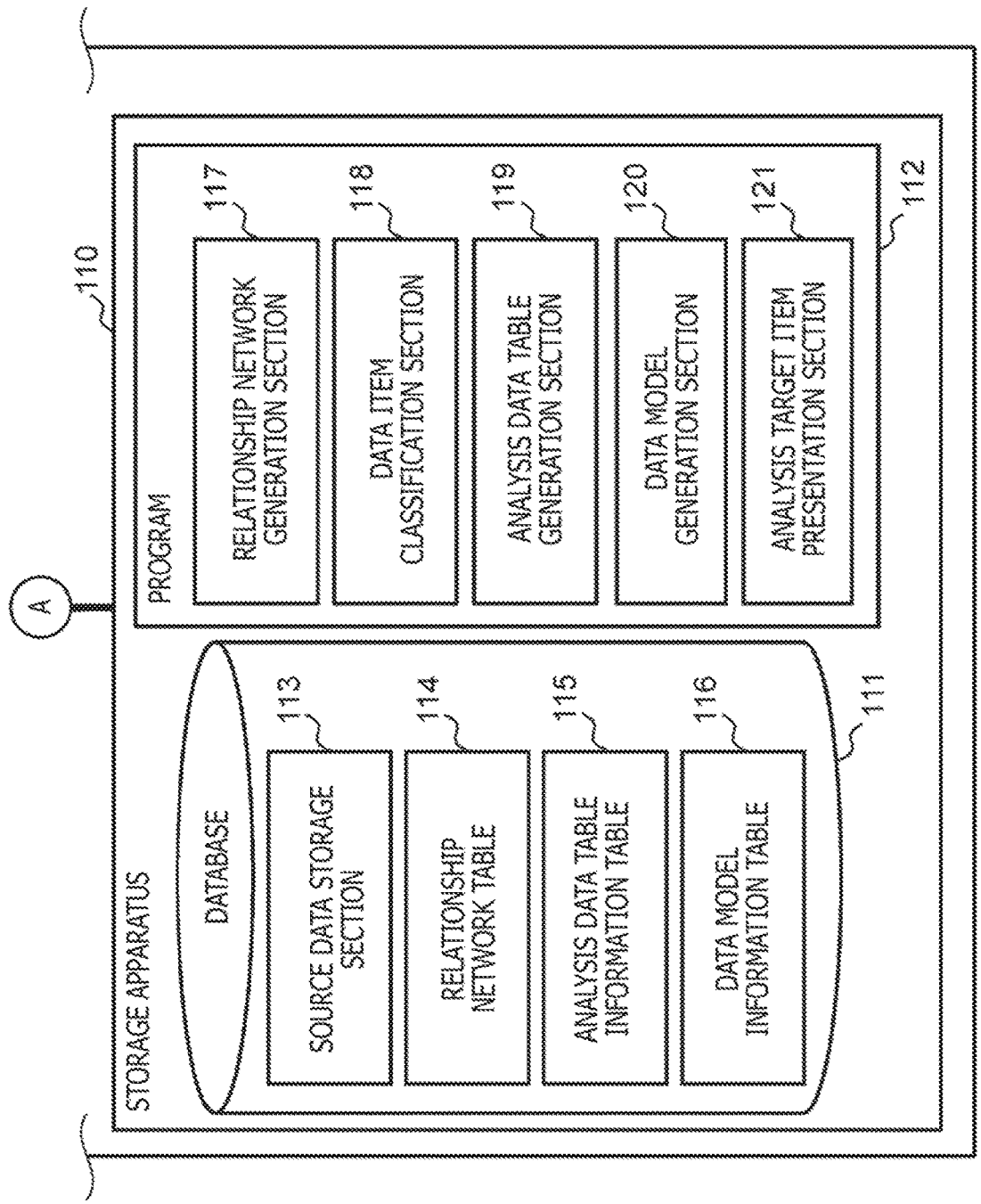

FIGS. 1A and 1B are views depicting an example of a system configuration of a data analysis support apparatus according to a first embodiment. The data analysis support apparatus 101 is connected for communication to a first operating system 102 and a second operating system 103 that individually possess operation information that becomes a data analysis target and a data analysis system 104 that executes data analysis through a communication network 122.

The data analysis support apparatus 101 transmits and receives operation information that is an analysis target to and from the first operating system 102 and the second operating system 103 and transmits and receives an analysis data table and a data model to and from the data analysis system 104.

The data analysis support apparatus 101 is configured such that a storage apparatus 110, an arithmetic processing apparatus 105, a memory 106, a communication apparatus 107, an inputting apparatus 108 and a display apparatus 109 are connected to a data bus 123.

The storage apparatus 110 is configured from a nonvolatile storage device and is, for example, a hard disk drive. The storage apparatus 110 has a database 111 and a program 112 stored therein. The database 111 has variable tables hereinafter described placed therein, and the program 112 cooperates with the various tables of the database 111 to perform search, update, new registration and deletion of data.

The inputting apparatus 108 has a function for accepting a key input or a sound input by a user. While, in the present embodiment, the data analysis support apparatus 101 includes the inputting apparatus 108, the data analysis system 104 may be configured otherwise such that it includes the input apparatus 108 and the user performs an inputting operation from the data analysis system 104 to the data analysis support apparatus 101 through the communication network 122.

The display apparatus 109 has a displaying function of a display that displays process data and so forth. While, in the present embodiment, the data analysis support apparatus 101 includes the display apparatus 109, the data analysis support apparatus 101 may be configured otherwise such that the data analysis system 104 includes the display apparatus 109 and the data analysis support apparatus 101 causes the display apparatus 109 to display process data on the data analysis system through the communication network 122.

The arithmetic processing apparatus 105 reads out and stores the program 112 retained in the storage apparatus 110 into a storage area of the memory 106 and executes the program 112 to perform overall control of the apparatus itself and execute various decisions, arithmetic operations and control processes.

The memory 106 is an example of a volatile storage device and is, for example, a RAM. The database 111 manages various dabbles. The database 111 includes a source data storage section 113, a relationship network table 114, an analysis data table information table 115 and a data model information table 116.

Although the present embodiment is described assuming that all operation information to be possessed by the first operating system 102 and the second operating system 103 is acquired, every time they are updated, by the communication apparatus 107 by communication through the communication network 122 and is placed into the source data storage section 113, the present embodiment may otherwise be structured for the operation information as analysis target data such that all data items retained by the tables that are operation information and data values of part of them (for example, only records for several days) are placed in the source data storage section and are acquired from the operating system 102 or 103 through the communication network 122 as occasion demands.

In the program 112, processes executed by the arithmetic processing apparatus 105 are described. This program 112 includes a relationship network generation section 117, a data item classification section 118, an analysis data table generation section 119, a data model generation section 120 and an analysis target item presentation section 121.

The relationship network generation section 117 analyzes data tables that are operation information placed in the source data storage section 113, constructs a relationship between the operating systems, a relationship between the data tables, a relationship between data items possessed by the operation data tables and a relationship between data values possessed by records of the operation data tables as a relationship network and stores the relationship network into the relationship network table 114. Attribute information and a configuration of the relationship network information stored in the relationship network table 114 are hereinafter described with reference to FIGS. 3A to 6C. Also details of the relationship network are hereinafter described with reference to FIGS. 2A and 2B.

The data item classification section 118 classifies tables and data items representative of operation information that is a data analysis target into a master or a transaction, namely, a first data type based on an actual value or a second data type based on a planned value or a pre-definition, and stores them as type information of the table information and the data item information in the relationship network table 114.

The analysis data table generation section 119 integrates data tables of operation information, which is source data, utilizing the relationship network information and places the integrated operation information as a data analysis table to be used for data analysis into the analysis data table information table 115 to accumulate a group of data items that become an analysis target. The placement of the operation information into the analysis data table information table 115 makes it possible for the data analysis system 104 to easily acquire the analysis data table information table 115 through the communication network 122 when it is to execute data analysis.

The data model generation section 120 sets a set of data items that allows data analysis in combination as a data model together with a key item, a data item that becomes a filtering item upon analysis and a score calculated for each of combinations of the data items as a data model, and accumulates the data model into the data model information table 116.

The analysis target item presentation section 121 displays data items that become an analysis target for each data model and emphatically displays a combination of data items that becomes the analysis target together with scores to recommend the combination to the user.

(1-2) Relationship Network

FIGS. 2A and 2B are views depicting an overall picture of an example of a relationship network. In the present embodiment, the "relationship network" represents relatedness of data including a relationship between data across a plurality of systems in order to generate relationship information between data regarding a variety of operation information possessed by a plurality of different operating systems.

Such a relationship network as described above can support a user to understand the substance and relationships of a variety of operation information without reading table specification sheets or the like by being displayed on the display apparatus 109 as hereinafter described above (refer to FIGS. 16A and 16B).

The relationship network represents a data model that dynamically constructs relationships between systems, between data tables, between data items and between data values in order to make it possible to allow structures of a variety of data to be taken in automatically and search and utilize the thus taken in data. As depicted in FIGS. 2A and 2B, the relationship network is configured from four layers of a system layer, a table layer, a data item layer and a data value layer.

In the system layer, each original (source) operating system of operation information that is made a target is represented as a node and, if different systems include common data, then this is represented by a link 803 between the nodes representing the systems. The system layer represents whether or not cross-data analysis between the systems is possible.

In the table layer, each data table indicative of operation information is represented as a node, and if different data tables include a common data item, then this is presented by a link between the nodes representative of the data tables. The table layer plays a role as an ER chart representative of connection between data tables.

In the data item layer, each of data items possessed by the data tables is represented as a node, and if data items have a relationship, then this is represented by a link between the nodes. Selection support of an analysis target item is performed by generating an analysis data table using the data items.

In the data value layer, a data value of each of the data items of records of the data tables is represented as a node, and presence of data values in a same record is represented by a link between the nodes. The data value layer can be used when individual data values having a relationship therebetween are investigated like, for example, "what relates to the A station."

FIGS. 2A and 2B depict an example of the relationship network constructed assuming such a configuration as described below. In particular, while the first operating system 102 is a traffic management system, the second operating system 103 is a vehicle management system. While the traffic management system possesses a train traveling record table (train traveling record table of FIG. 7B) and a delay information table (delay information table of FIG. 7C), the vehicle management system possesses an in-vehicle state table (in-vehicle state table of FIG. 7D). In the present embodiment, data that construct such a relationship network as described above is referred to as "relationship network information." This relationship network information is stored in the relationship network table 114 (refer to FIGS. 1A and 1B). Here, as an example, such a relationship network as described above is exemplified.

In the present embodiment, a node 801 representative of the traffic management system and a node 802 representative of the vehicle management system exist in the system layer, and a link 803 exists between the nodes 801 and 802. Further, a node 804 representative of the train traveling record table, a node 805 representative of the delay information table and a node 806 representative of the in-vehicle state exist in the table layer, and links are set between the nodes 804, 805 and 806.

Further, although a link 807 exists between the node 801 of the system layer and the node 805 of the table layer, this link 807 represents the table possessed by the traffic management system. Also nodes of the data item layer and nodes of the data value layer are data items and data values of records possessed by the tables indicated in FIG. 7A to FIG. 7D. In particular, in FIG. 2, a possession relationship is represented using a link between layers. Although, in the present example, only data values of a first record in each table are indicated as nodes of the data value layer for the sake of omission, originally data values of all records exist as nodes having no overlap thereamong.

In FIGS. 2A and 2B, in order to make it possible to search and utilize data of the layers, such relationships as tables possessed by the systems, data items possessed by the tables and data values possessed by the data items are represented using links between nodes between layers.

Although details are hereinafter described, every time new data is inputted, the relationship network is updated at any time. Upon such updating, the additional information is converted into nodes and links to update the structure of the relationship network. Here, such a mechanism is employed that, in the case where a link to be added exists already in the relationship network, the strength of the relationship between the nodes is represented as a weight of the link by increasing the weight of the link (magnitude of the relevance).

(1-3) Relationship Network Information

FIGS. 3A to 3C depict an example of a table configuration of data relating to nodes and links of the system layer of the relationship network from among the data tables indicative of relationship network information placed in the relationship network table 114 by the relationship network generation section 117.

The nodes of the system layer have a node ID 901 and a system name 902 as attributes thereof. The links of the system layer have a link ID 903, a from item 904 that is a link source node ID, a to item 905 that is a link destination node ID, a type 906 and a weight 907 as attributes thereof.

Figure 12A:
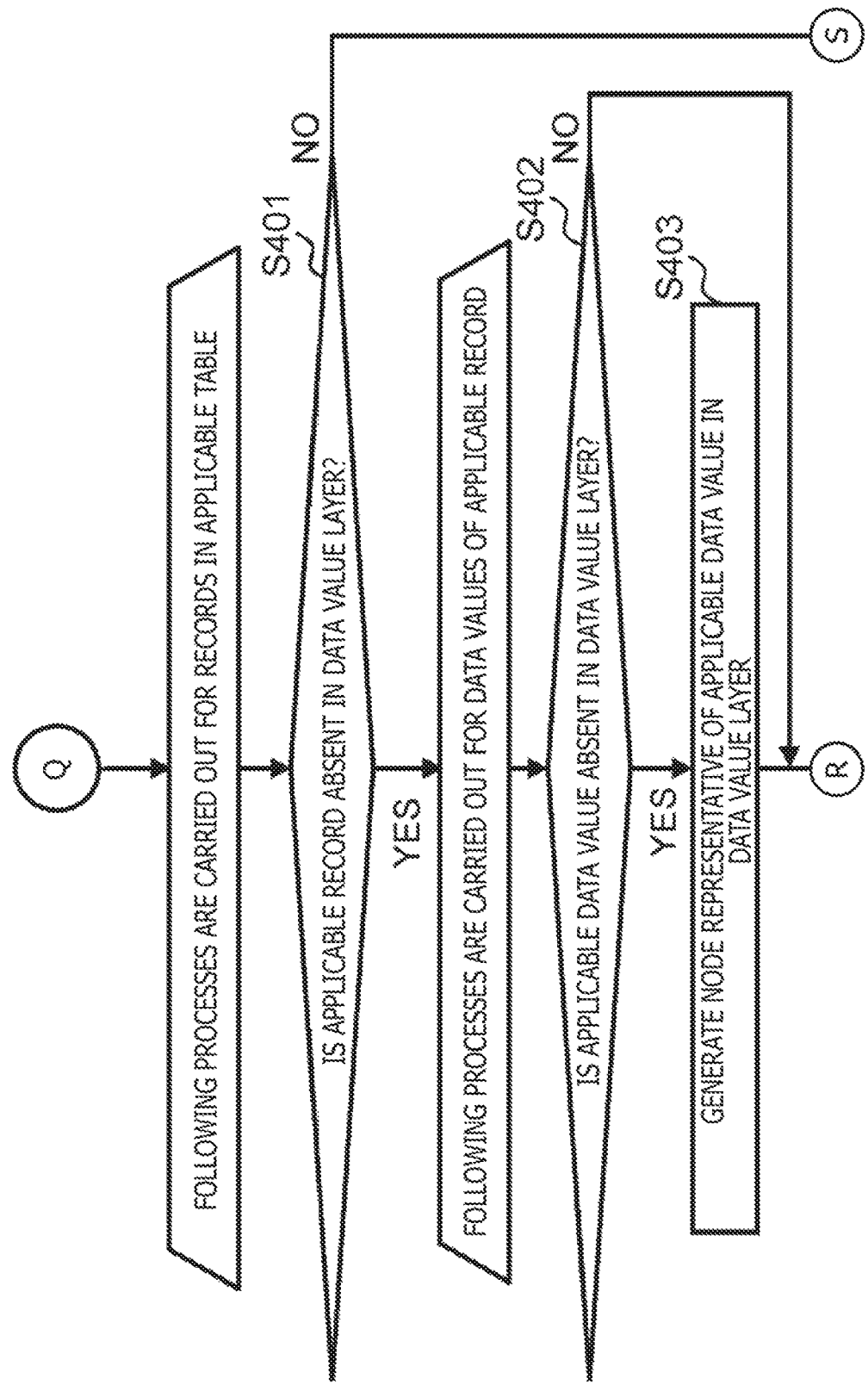
FIGS. 12A to 12C are flow charts (part 2) depicting the example of the relationship network generation-update process according to the first embodiment.

The type 906 and the weight 907 are set and calculated when a link is set at step S408 of FIG. 12A hereinafter described.

Figure 12B:
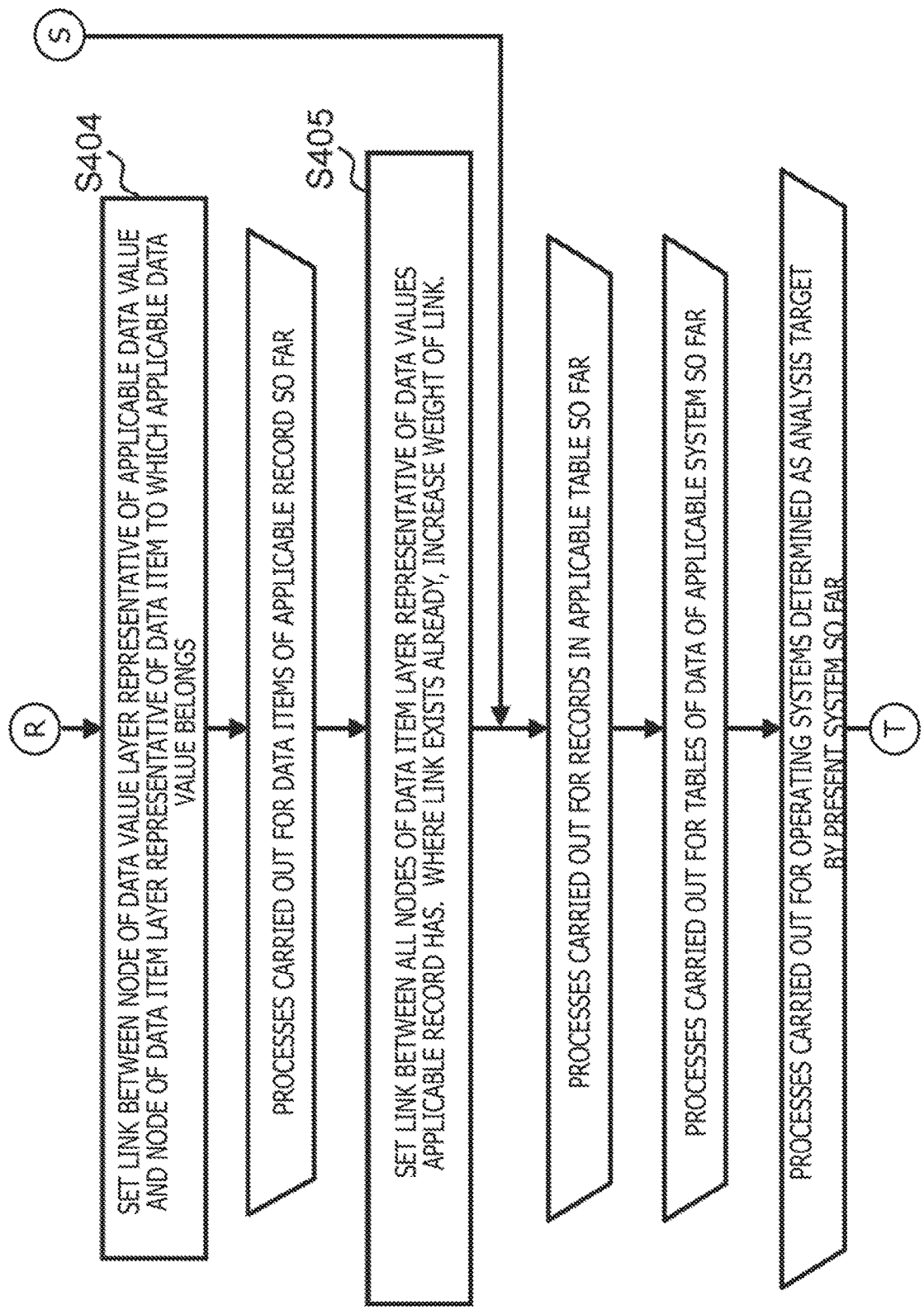
Figure 12C:
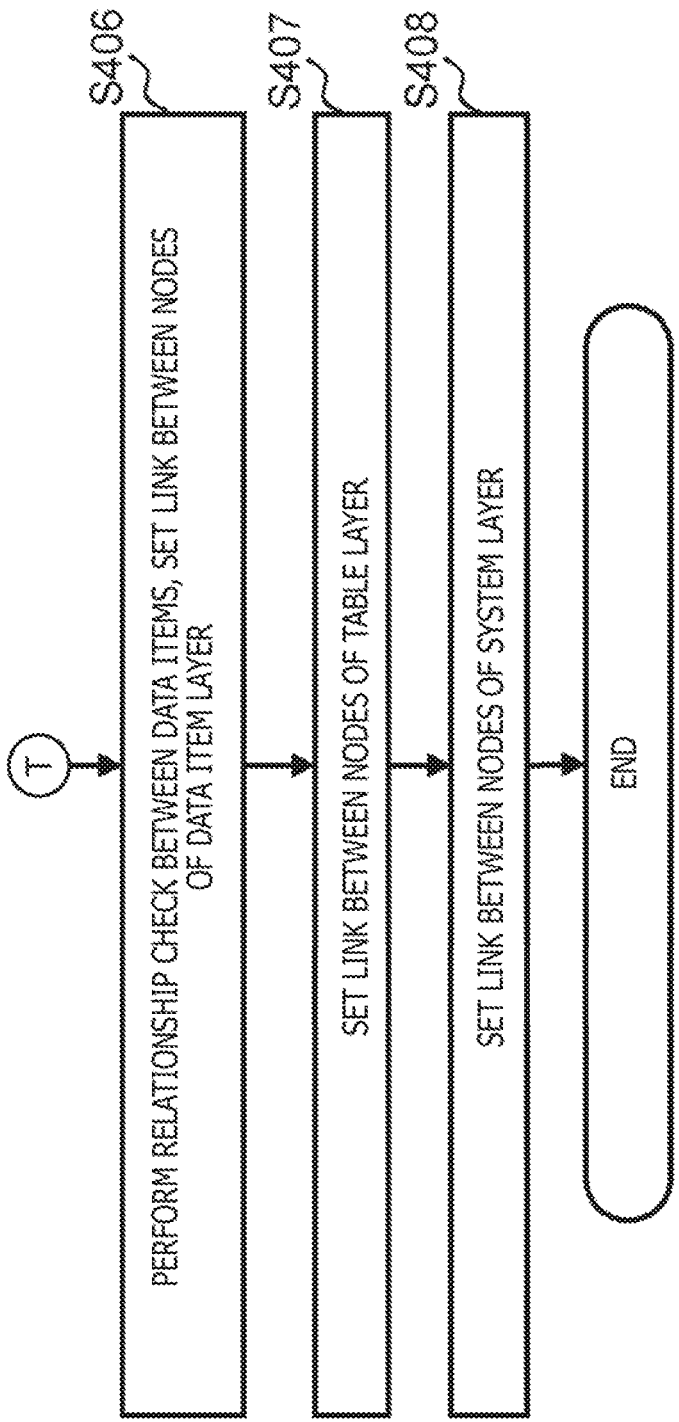

FIG. 4A to FIG. 4C depict an example of a table configuration of data relating to the nodes and the links of the table layer of the relationship network from among the data tables representative of the relationship network information that is stored into the relationship network table 114 by the relationship network generation section 117. The nodes of the table layer have a node ID 1001, a table name 1002, an item 1003 that is an ID of a an ID of a data item possessed by the table, a type 1004, and a source system ID 1005 that is an ID of the system that has the table as attributes. The source system ID 1005 represents a link between the system layer and the table layer depicted in FIGS. 2A and 2B. The type 1004 stores results at step S501 of FIG. 13 hereinafter described. The links of the table layer have a link ID, a from item that is a link source node ID, a to item that is a link destination node ID, a type and a weight as attributes thereof. The type and the weight are set and calculated when a link is set at step S407 of FIG. 12C hereinafter described.

Figure 11A:
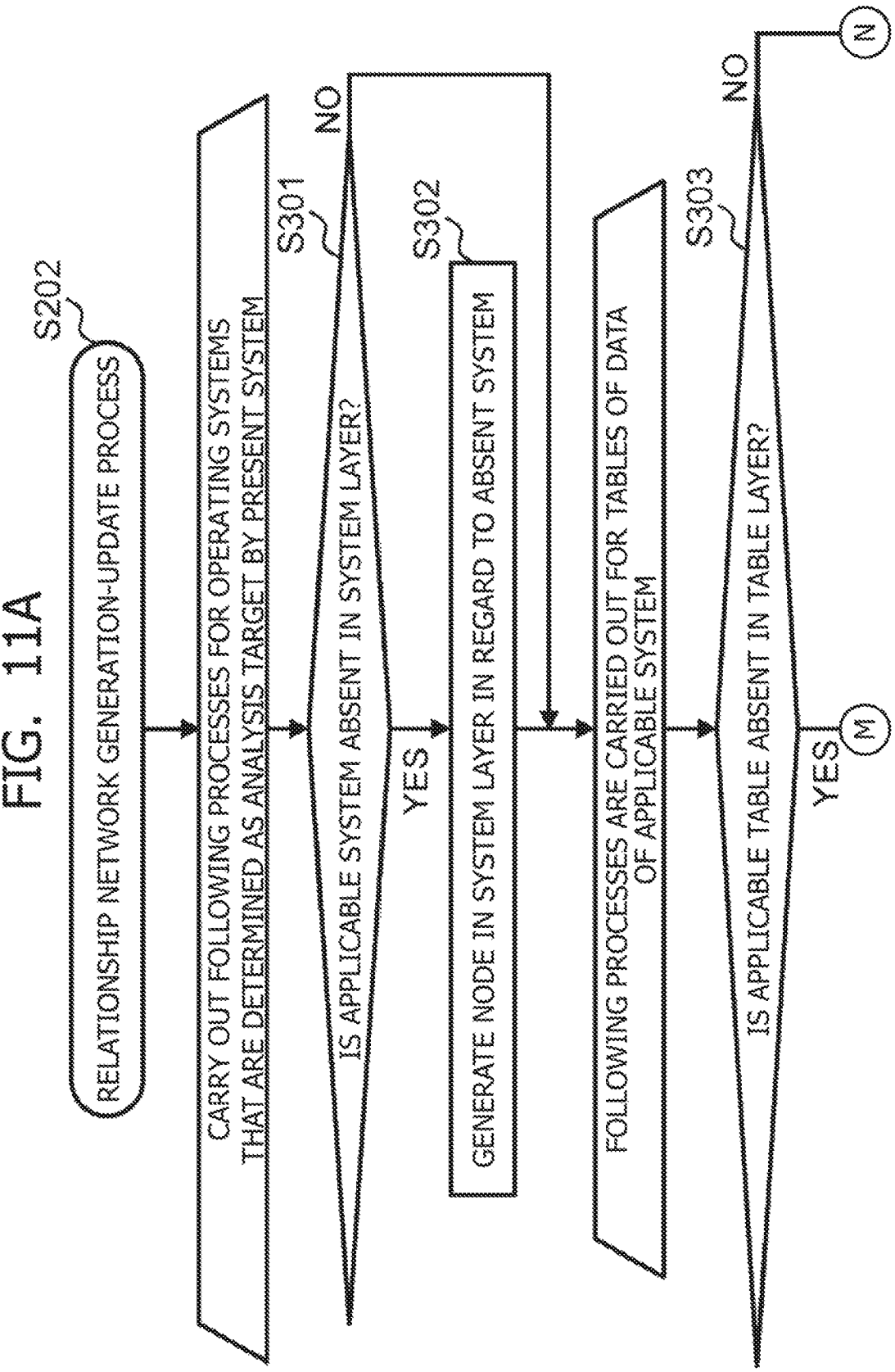
Figure 11B:
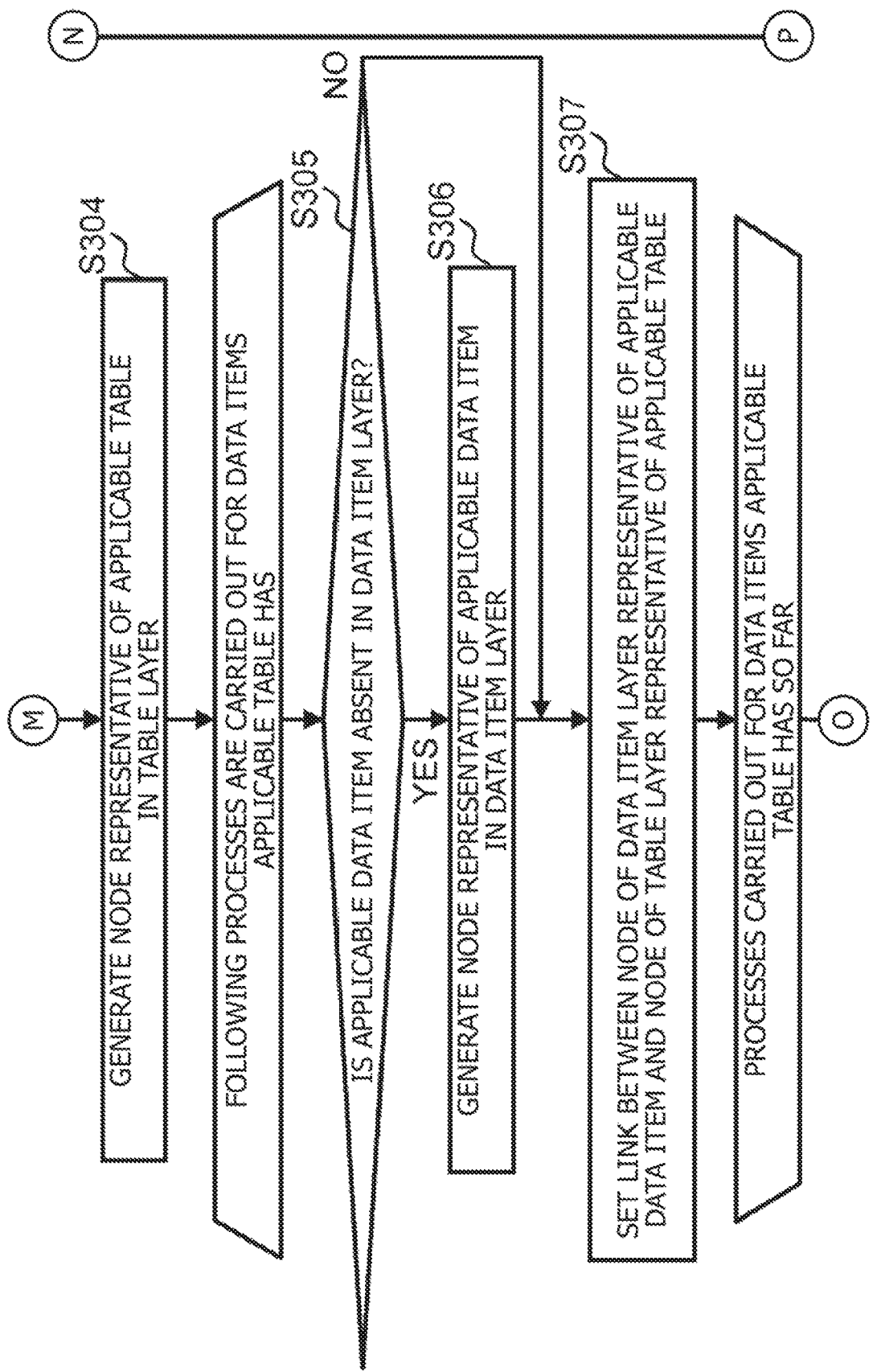

FIG. 5A to FIG. 5C depict an example of a table configuration relating to nodes and links of the data item layer of the relationship network from among the data tables representative of the relationship network information that is placed into the relationship network table 114 by the relationship network generation section 117. The nodes of the data item layer have a node ID, an item name, a weight, a type and a table ID that is an ID of the table that possesses the data items. The type 1004 stores results at step S502 and step S504 of FIG. 13 hereinafter described. Further, the table ID represents a link between the table layer and the data item layer depicted in FIGS. 2A and 2B. The links of the data item layer have a link ID, a from item that is a link source node ID, a to item that is a link destination node ID, a type, a weight and a table ID indicated by the link as attributes. The type, weight and table ID are set and calculated when a link is set and updated at step S308 of FIGS. 11A to 11C hereinafter described.

FIG. 6A to FIG. 6C depict an example of a table configuration of data relating to the nodes and the links of the data value layer of the relationship network from among the data tables representative of the relationship network information that is placed into the relationship network table 114 by the relationship network generation section 117. The nodes of the data value layer have a set of a node ID, a value, a weight, a data item ID that is a data item ID that possesses the applicable data value, a node ID in the table layer of the table that has the applicable data value and a record ID of the applicable record, which is set in order from 1 into the applicable record in the table as an attribute. The data item ID represents a link between the data item layer and the data value layer depicted in FIGS. 2A and 2B. The links of the data value layer have a set of a link ID, a from item that is a link source node ID, a to item that is a link destination node item, a type, a weight, a node ID in the table layer of the table indicated by the link and a record ID of the applicable record set in order to records in the table beginning with 1 as an attribute. The set of the type, weight, table ID and record ID is set and calculated when a link is set and updated at step S405 of FIG. 12B hereinafter described.

FIG. 7A represents an example of a data table of a station master; FIG. 7B represents an example of a data table of a train traveling record table; FIG. 7C represents an example of a data table of a delay information table; and FIG. 7D represents an example of a data table of an in-vehicle state table.

The station master depicted in FIG. 7A has a station code, a station name and a station address as columns thereof and manages their information. The train traveling record table depicted in FIG. 7B has a train number, a station code, departure time and arrival time as columns thereof and manages their information. The delay information table depicted in FIG. 7C has a train number, a station code and a delay time as columns thereof and manages their information. The in-vehicle state table depicted in FIG. 7D has a train number, a car and a congestion degree as columns thereof and manages their information.

FIG. 8A to FIG. 8D depict an example of a configuration of the analysis data table information table 115 (refer to FIGS. 1A and 1B) that stores an analysis data table generated by the analysis data table generation section 119 and an example of an analysis data table. The analysis data table information table 115 manages one analysis data table as one record. An item of each record has an analysis table ID 1421 indicative of a unique ID of the analysis data table and an analysis table 1422 that stores the analysis data table.

Figure 14A:
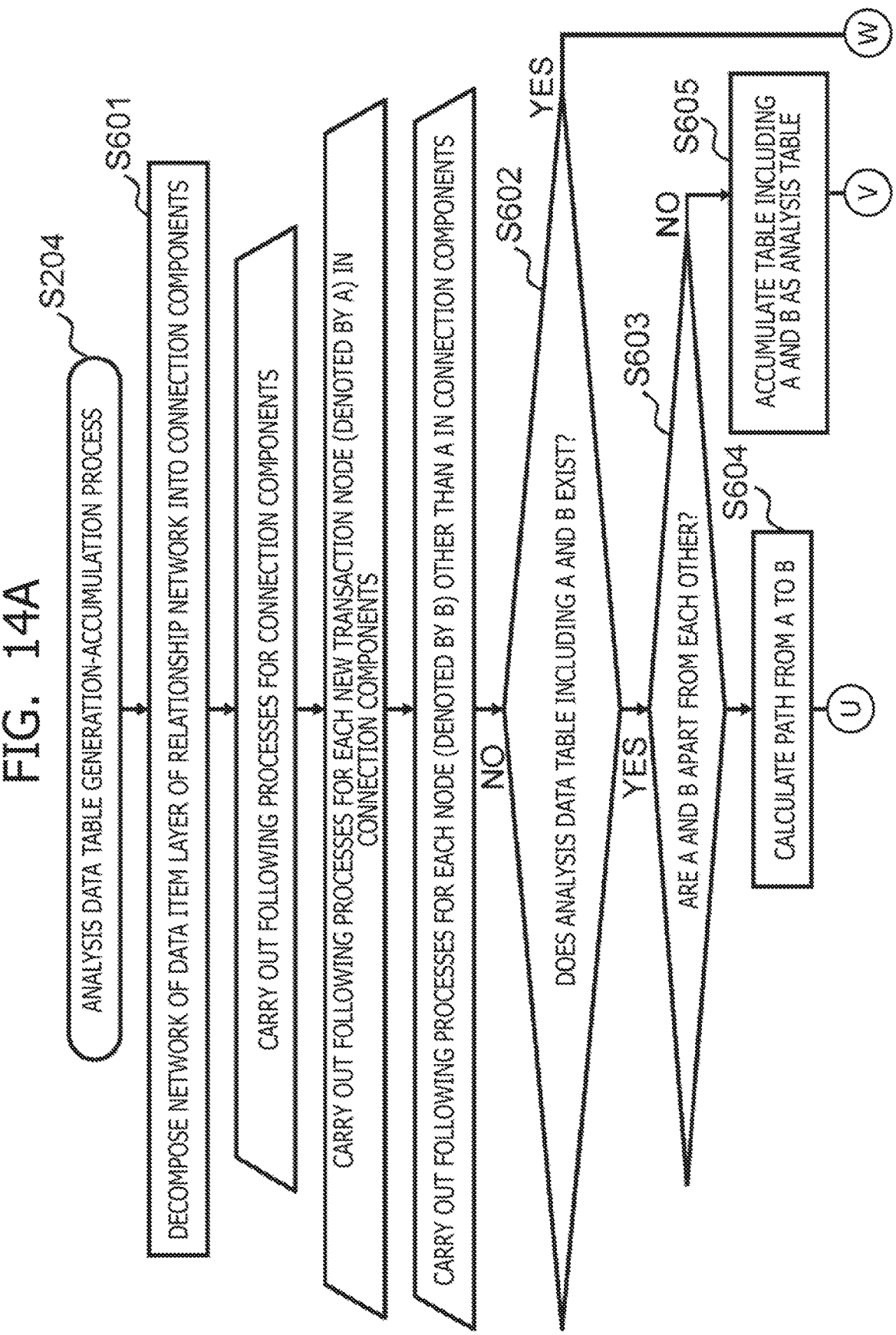
FIGS. 14A to 14C are flow charts depicting an example of an analysis data table generation-accumulation process according to the first embodiment.
Figure 14B:
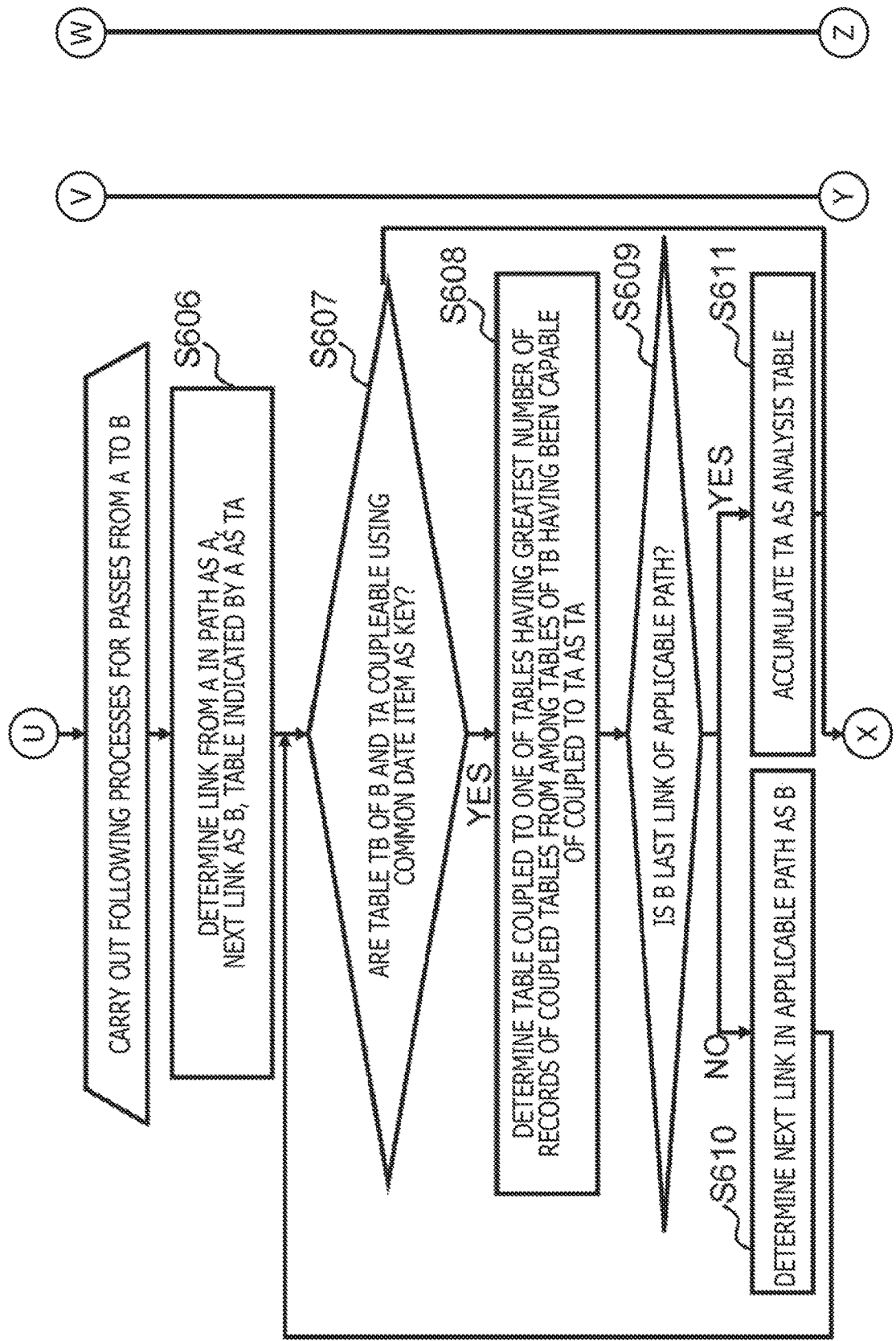
Figure 14C:
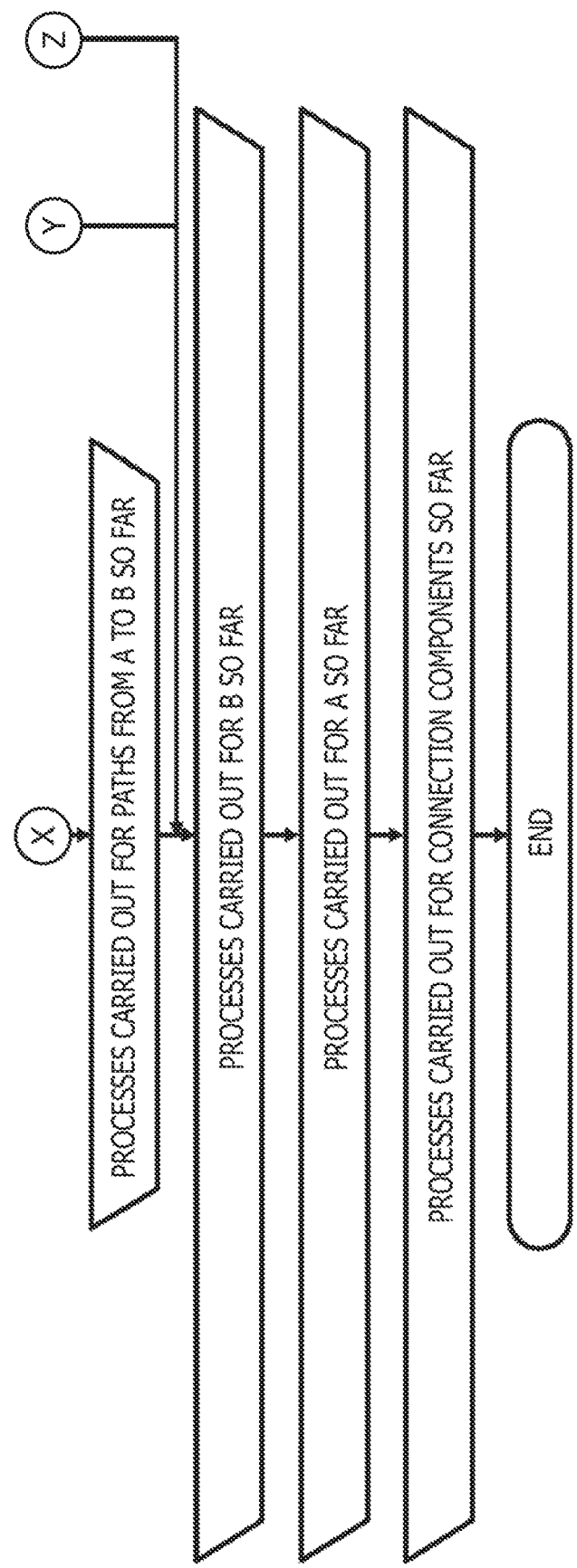
Figure 16B:
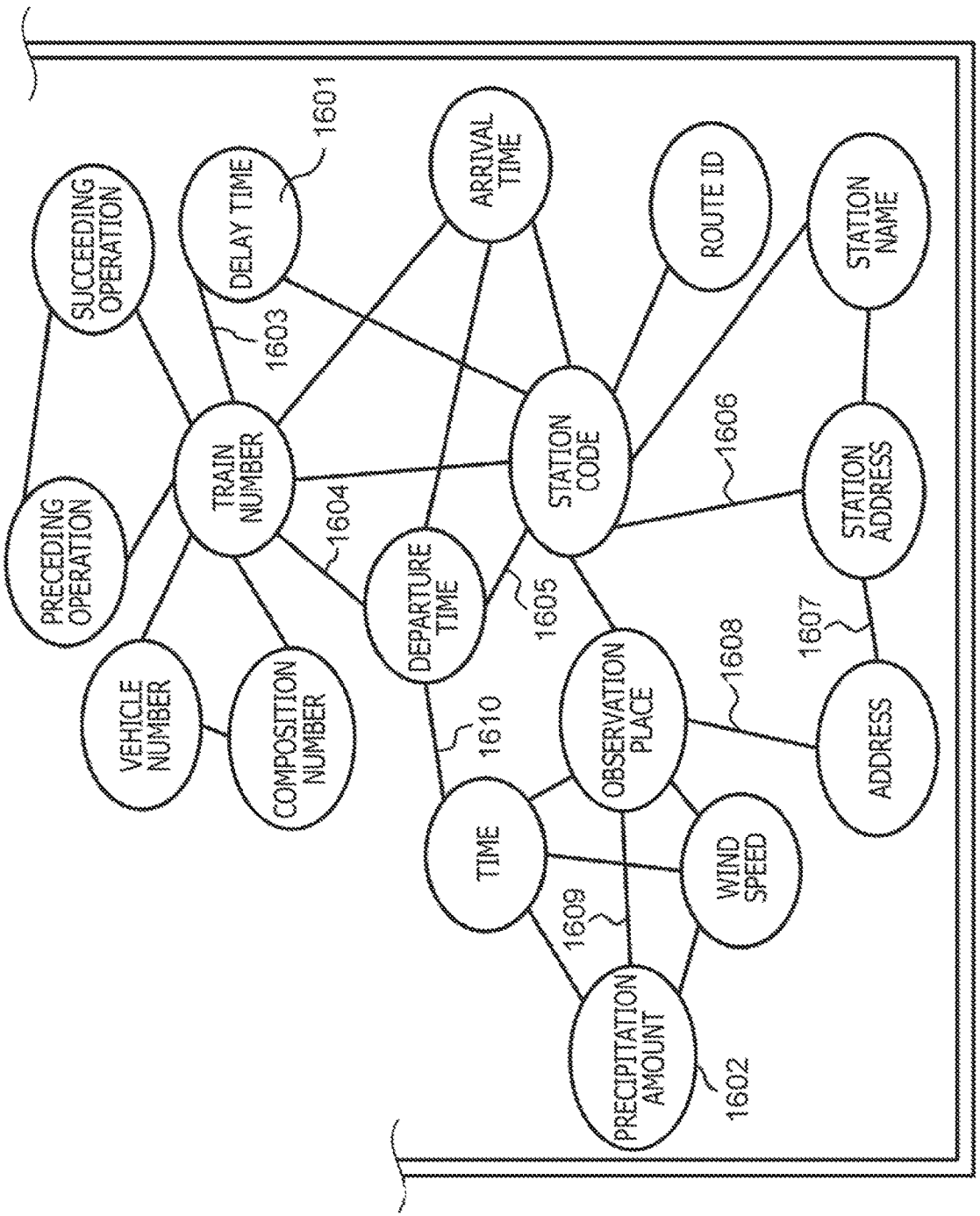

FIG. 8B to FIG. 8D depict an example of an analysis data table that is stored in the analysis table 1422 and depicts an analysis data table that is generated when, in a relationship network depicted in FIG. 16, a delay time node 1601 is a node A depicted in FIGS. 14A to 14C, a precipitation amount node 1602 is a node B and a path includes links 1603, 1604, 1605, 1606, 1607, 1608 and 109. It is to be noted that FIGS. 16A and 16B represent, in addition to the traffic management system and the vehicle management system exemplified in FIGS. 2A and 2B, a relationship network of the data item layer when open data that is weather information are placed into the source data storage section 113 and made a target of handling.

The table indicated by the link 1603 is the delay information table (refer to FIG. 7C) that has a train number 1401, a station code 1402 and a delay time 1405 as columns thereof. The table indicated by the link 1604 is the train traveling record table (refer to FIG. 7B) including a train number 1401, a station code 1402, departure time 1403 and arrival time 1404.

First, the two tables are coupled to each other using the train number 1401 and the station code 1402 that are common data items as a key. Then, since the table indicated by the link 1605 is the train traveling record table, even if it is coupled, the table indicates no change after it is coupled.

The table indicated by the next link 1606 is the train master table (refer to FIG. 7A) having a station code 1402, a station name 1406 and a station address 1407 as columns thereof. The station master table and the tables coupled to the station master table till now are coupled using the station code as a key.

Since the next link 1607 in the path is a link of one to many types having no table ID, reference is had to the next link 1608. The table indicated by the link 1608 is an observation place master table that includes an observation place 1409 and an address 1408 of a weather observation spot, which are open data.

For integration with the present table, the station address 1407 and the address 1408 connecting to the link 1607 are used. For the address, full coincidence is not applied, but addresses between which the distance is shortest are collated using map information or the like to integrate the tables.

The table indicated by the link 1608 in the path is the weather information table that includes an observation place 1409, time 1410, a precipitation amount 1411 and a wind speed 1412 that are open data. The tables integrated till now and the weather information table are integrated using the observation place 1409, time 1410 that can be associated by a link 1610 and the departure time 1403, which are common data items, as a key. Also in regard to association of time, by collating the closest time values similarly to the collation of the places, the association of time can be performed even if the time values do not fully coincide with each other.

FIGS. 9A to 9C depict an example of a table configuration of the data model information table 116. Into this data model information table 116, a data mode generated by the data model generation section 120 is placed.

In the data model information table 116, one data model is managed as one record. Each record has items of a model ID 1501 indicative of an ID unique to the data model, a data item 1502 for storing a data item table included in the model, a score 1503 for storing a score table between data items in the model, a link 1504 for storing a table indicative of links between nodes indicative of data items included in the model in the data item layer of the relationship network, and an analysis table 1505 in which the analysis table ID 1421 indicative of corresponding analysis data table IDs is stored.

In the data item table stored in the data item 1502, one data item is managed as one record. Each record has items of an item ID 1506 and an item name 1507 as depicted in FIG. 9B.

In the score table stored in the score 1503, a pair of data items are managed as one record. Each record has items of a score ID 1513, an item ID (1) 1514 and an item ID (2) 1515 calculated at step S703, a correlation coefficient 1516 indicative of a correlation coefficient between values of the data item indicated by the item ID (1) 1514 and the data item indicated by the item ID (2) 1515 and a sample number 1517 indicative of a sample number used when the correlation coefficient is calculated. It is to be noted that this sample number 1517 corresponds to a value calculated at step S703 of FIGS. 15A and 15B hereinafter described.

In the link table stored in the link 1504, though not depicted, one link between a pair of nodes is managed as one record, and the table configuration of the same is a configuration similar to that of the link table depicted in FIG. 5C.

(1-4) Example of Operation of Data Analysis Support System (1-4-1) Basic Processing Procedure (Data Analysis Support Process)

Figure 10:
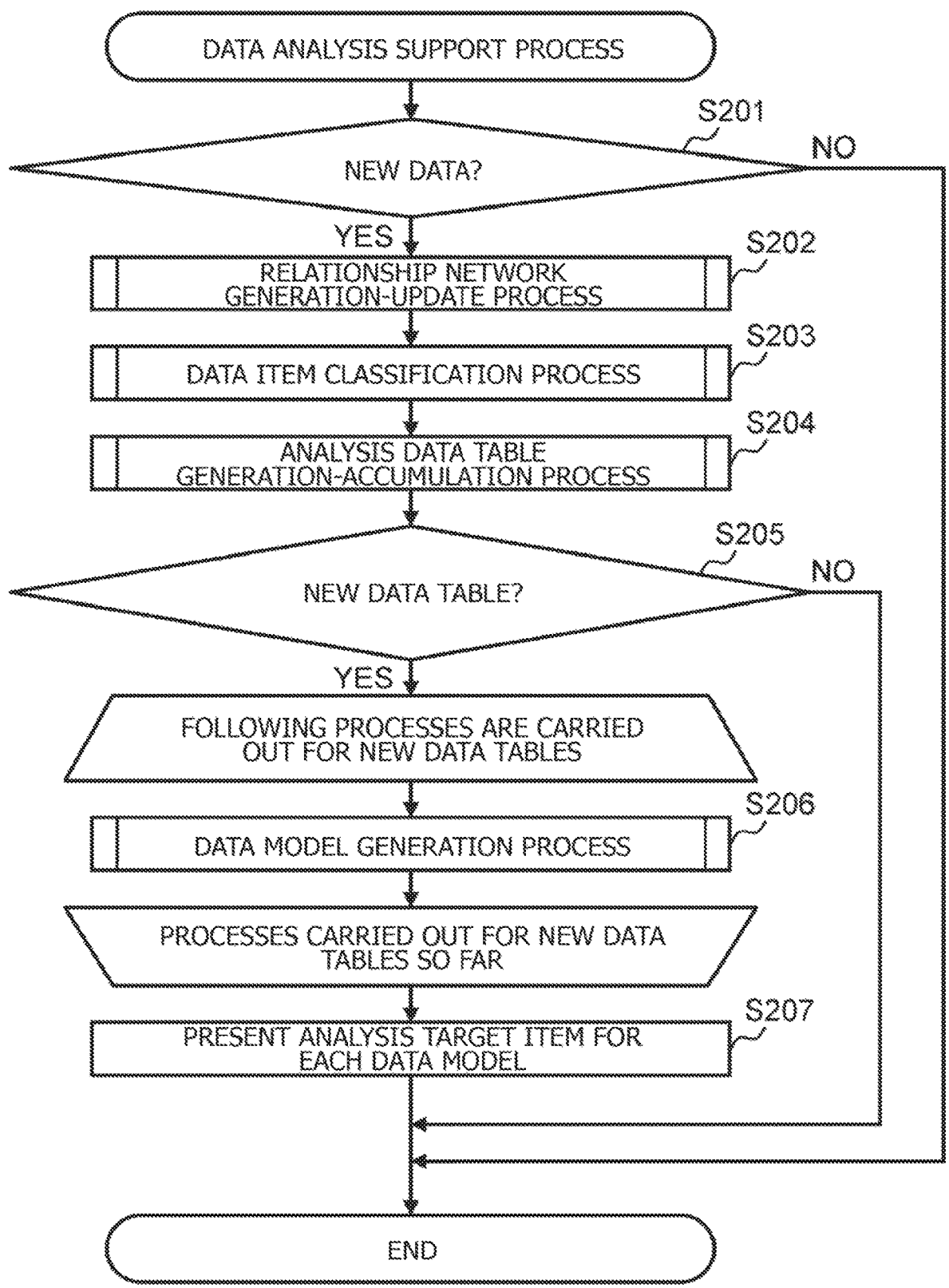
FIG. 10 is a flow chart depicting an example of a data analysis support process according to the first embodiment.

FIG. 10 depicts a basic processing procedure by the data analysis support apparatus 101 according to the first embodiment. In particular, FIG. 10 depicts an example of a flow of processing carried out when an operating system is connected newly to the data analysis support apparatus 101, when operation information possessed by the connected operating system is updated, when an update instruction is received from the data analysis system 104 or in the like case.

At step S201, the relationship network generation section 117 decides whether or not there is new data, namely, whether or not a data table that is operation information targeted by the present data analysis support apparatus is updated. On the basis of a result of the decision, in the case where the data table is updated, namely, in the case where a new operating system is connected, in the case where addition of data or change of data is performed for a data table possessed by the first operating system 102 or 103 connected already, in the case where the data analysis support apparatus 101 is introduced newly or in the like case, the relationship network generation section 117 performs such step S202 as described below. On the other hand, in the case where the data table is not updated, the relationship network generation section 117 ends the present processing.

At step S202, the relationship network generation section 117 analyses the data table that is operation information stored in the source data storage section 113 and constructs, constructs a relationship between the operating systems, a relationship between the data tables, a relationship between data items possessed by the operation data tables and a relationship between data values possessed by records of the operation data tables as a relationship network and stores the relationship network into the relationship network table 114. Details of this are hereinafter described with reference to FIGS. 11 and 12.

At step S203, the data item classification section 118 classifies data tables and data items representative of the operation information of a data analysis target into a first data type (transaction) based on an actual value and a second data type (master) based on a planned value or a pre-definition, and stores them as classification information of the table information or the data item information of the relationship network table 114. Details of this are hereinafter described with reference to FIG. 13.

At step S204, the analysis data table generation section 119 integrates the data tables of the operation information that are source data utilizing the relationship network information and places the integrated information as a data analysis table to be used for data analysis into the analysis data table information table 115. Consequently, combinations of the data items that become an analysis target are accumulated. Details of this are hereinafter described with reference to FIGS. 14A to 14C.

At step S205, the analysis data table generation section 119 decides whether or not a new data table exists, namely, whether or not the analysis data tables stored in the analysis data table information table 115 include an updated data table or a new data table comparing with those before the present process is executed. If such a data table as just described exists, then the analysis data table generation section 119 executes step S206, but if such a data table does not exist, then the analysis data table generation section 119 ends the present processing.

At step S206, the data model generation section 120 generates a data model for each of any analysis data table that has been updated or for any new data table. In the present process, the data model generation section 120 generates a set of data items for which data analysis can be performed in combination as a data model together with the key item, the data item that becomes a filtering item upon analysis and a score calculated for each combination of data items, and accumulates the data model into the data model information table 116. Details are hereinafter described with reference to FIGS. 15A and 15B.

After the process at step S206 is carried out for each analysis table, step S207 is executed. At this step S207, the analysis target item presentation section 121 displays data items that become an analysis target for each data model and emphatically displays a combination of data items that become an analysis target together with its score thereby to recommend the combination of data items to the user. A display example is hereinafter described with reference to FIGS. 17A and 17B. Thereafter, the present processing is ended.

(1-4-2) Relationship Network Generation-Update Process

FIGS. 11A to 11C and 12 individually depict an example of a detailed procedure of the relationship network generation-update process (step S202) depicted in FIG. 10. This relationship network generation-update process is executed by the relationship network generation section 117. First, the following process is carried out for the operating systems that possess source data to be recommended as an analysis target by the present apparatus.

At step S301, the relationship network generation section 117 decides whether or not a node representative of the applicable operating system is absent in the system layer of the relationship network. If a node of the applicable system is absent in the system layer, then step S302 is executed, but if a node of the applicable system is present in the system layer, then step S303 is executed.

At this step S302, the relationship network generation section 117 generates a node representative of the applicable system in the system layer. This node has a node ID and a system name set in an order in which they are generated in the system layer as an attribute.

If the system names are separate for individual operating systems, for example, in the source data storage section 113, then they may be set from a directory name or the like, or may be inquired to the operating system 102 or 103 from the communication apparatus 107 through the communication network 122.

The following processes are carried out for each of the data tables of the operation information of the operating systems 102 and 103. First, at step S303, the relationship network generation section 117 decides whether or not the applicable data table exists in the table layer of the relationship network. If the applicable table does not exist in the table layer of the relationship network, then step S304 is executed, but if the applicable table exists in the table layer of the relationship network, then the processing advances to step S401.

At step S304, the relationship network generation section 117 generates a node representative of the applicable data table in the table layer. The node has a node ID set in an order in which it is generated in the table layer, a table name, data items possessed by the table, a type, and a source system ID that is a node ID of the system in the system layer as an attribute. The type is 0 if the applicable table is a master table, but is 1 if the applicable table is a transaction table. The table name can be acquired from the file name or the like. The type can be discriminated from an update frequency of the applicable table, increase or decrease of the record number or a table name.

Then, the following processes are carried out for the data items possessed by the applicable table. At step S305, the relationship network generation section 117 decides whether or not the node representative of the applicable data item is absent in the data item layer of the relationship network.

The decision of whether or not the node representative of the applicable data item is absent in the data item layer of the relationship network basically depends upon the decision of whether or not the node is same by comparison of the data item names and the data values. For example, nodes that have a same data item name, includes a same data value or a proximate or similar numerical value (similarity degree by a similarity decision is equal to or higher than a fixed level) and having a same format are determined as same nodes.

Even if data item names are not fully same as each other, if the similarity degree when a similarity decision is carried out is equal to or higher than a fixed level and besides the data values include a same data value or data values having proximate numerical values or similar numerical values, or have a same format, then they are regarded as same nodes. As an alternative, dictionary information may be stored in advance to perform a same item decision. If nodes representative of a same item are absent, then step S306 is executed, but if nodes having a same item exist, then step S307 is executed.

At step S306, the relationship network generation section 117 generates a node representative of the applicable data item in the data item layer. The node includes a node ID set in an order in which it is generated in the data item layer, a data item name, a weight, and a table ID that is a node ID in the table layer of a table having the applicable data item as an attribute.

As regards the weight, it is 1 as one example at step S306, and when it is decided at step S305 that the node exists already, the weight is incremented by 1 before the processing advances from step S305 to step S307. Also as regards the table ID, when it is decided at step S305 that the node exists already, the table ID then is stored additionally before the processing advances from step S305 to step S307.

At step S307, the relationship network generation section 117 sets a link between the node of the data item layer representative of the applicable data item and the node of the table layer representative of the table. Although, in the present example, the present link is managed as a table ID that is an attribute of the node of the data item layer, the relationship network table 114 may otherwise possess a table for managing links between the table layer and the data item layer. The foregoing processes are carried out for the data items possessed by the applicable table.

Then at step S308, the relationship network generation section 117 sets links each having a table ID as an attribute, a weight 1 and a type of a value indicative of "same table" between all nodes of the data item layer representative of the data items possessed by the applicable table, adds, in the case where a link exists already, a table ID to the attribute, and increments the weight by 1.

At step S309, the relationship network generation section 117 sets a link between the node of the table layer representative of the applicable table and the node of the system layer representative of the source system. When the link is set, if a link exists between the nodes already, then the weight is incremented by one and the ID representative of the applicable table is added to the table ID. In the case where a link is set newly, a link of the weight 1 is set. While, in the present example, the present link is managed as the source system ID that is an attribute of the node of the table layer, the relationship network table 114 may possess a table for managing links between the system layer and the table layer.

Thereafter, the following processes are carried out for each record in the applicable table as depicted in FIG. 12. At step S401, the relationship network generation section 117 decides whether or not the applicable record is absent in the data value layer of the relationship network. Here, that the applicable record is present in the data value layer of the relationship network signifies that a corresponding node exists in regard to all data values possessed by the applicable record and, between the nodes, a link having the ID of the applicable table and the ID of the record exists. If no such link exists, then step S402 is executed, but if such a link exists, then the processing advances to processing for the next record.

Steps S402 to S404 are processes carried out for data values possessed by the applicable record. At step S402, the relationship network generation section 117 decides whether or not a node indicative of the applicable data value is absent in the data value layer of the relationship network. In the case where a node indicative of the applicable data value is absent in the data value layer of the relationship network, step S403 hereinafter described is executed, but in the case where a node indicative of the applicable data value is present in the data value layer of the relationship network, a link is set between the node of the data value layer representative of the applicable data value and the node of the data item layer representative of the data item to which the applicable data value belongs (step S404).

At step S403, the relationship network generation section 117 generates a node representative of the applicable data value in the data value layer. The node has a set of a node ID set in an order in which it is generated in the data value layer, a data value, a weight, a node ID in the table layer of the table having the applicable data value and a record ID of the applicable record set in order beginning with 1 in the record in the table as an attribute.

As regards the weight, it is 1 as one example at step S403, and when it is decided at step S402 that the node exists already, the weight is incremented by 1 before the processing advances from step S402 to step S404. Also as regards the table ID and the record ID, when it is decided at step S402 that the node exists already, the table ID and the record ID having the applicable data value are similarly stored additionally before the processing advances from step S402 to step S404.

At step S404, the relationship network generation section 117 sets a link between the node of the data value layer representative of the applicable data value and the node of the data item layer representative of the data item to which the applicable data value belongs.

When the link is set, the relationship network generation section 117 increments the weight by 1 when a link already exists between the nodes and adds the ID representative of the applicable table and adds a record ID representative of the record to the table ID and the record ID. In the case where a link is set newly, a link of the weight 1 is set. While, in the present example, the present link is managed as a set of a table ID and a record ID that are an attribute of the node of the data value layer, the relationship network table 114 may otherwise retain a table for managing links between the data item layer and the data value layer.

At step S405, the relationship network generation section 117 sets, between all nodes of the data value layer representative of the data value possessed by the applicable record, a link having a weight 1, a type having a value indicative of "same record," a node ID in the table layer of the applicable table and a record ID of the applicable table set in order from 1 to the record in the table as an attribute thereof. In the case where a link exists already, the weight of the link is incremented by 1. Also in regard to the table ID and the record ID, similarly the applicable table ID and record ID having the applicable data value are stored additionally.

The foregoing processes are carried out for the records in the applicable table. The foregoing processes are carried out for the data tables of the operation information of the applicable system. Further, the foregoing processes are carried out for the operating systems that possess source data to be recommended as an analysis target by the present apparatus.

At steps S406, the relationship network generation section 117 performs check of the relevance between the data items and sets links between the nodes of the data item layer. For example, by referring to the relationships of the data values, such structural relationships between data items as indicated by (a) to (d) given below are extracted, and links are set between the nodes of the data item layer.

(a) Inclusion relationship: an inclusion relationship of data item names and an inclusion relation of data value sets (in the case of successive values, ranges) are checked to extract a structural relationship.

(b) One-to-many relationship: it is checked whether data values have a one-to-many relationship to extract a structure relationship.

(c) One to one relationship: it is checked whether data values have a one-to-one relationship to extract a structure relationship.

(d) Equivalence: a structure relationship is extracted by similarity degree analysis of data item names and data value set comparison.

As regards the items relating to time and place, such a relationship as described above may be set assuming that, even in the case where data values are close to each other, they can be coordinated with each other. Further, as regards the relationship between data items, the relationships presented as above are not restrictive, and a relationship known generally may be calculated to set a link.

At step S407, the relationship network generation section 117 sets links between the nodes of the table layer. A link is set in the case where a link is set between nodes of the data item layer representative of a data item possessed by the data table or in the case where same data items are provided. The weight of the link is the sum of the numbers of data items same as the weight of links between the nodes of the data item layer, and the type (plural types are allowable) is a type of the link or a value indicating that the link has a same data item.

At step S408, a link is set between nodes of the system layers. A link is set in the case where a link is set between nodes of the table layer representative of the data table possessed by the system or in the case where the same data table is had. Thereafter, the present process is ended.

If, at step S408, a link is set between nodes of the table layer representative of the data table possessed by the system, then the relationship network generation section 117 places the type of the link of the table layer into the type 906 (plural types are allowable), and the sum of weights is placed into the weight 907. In the case where the same data table is had, a type representative of this is stored into the type 906, and the weight 907 is incremented by a same table number.

(1-4-3) Data Item Classification Process

Figure 13:
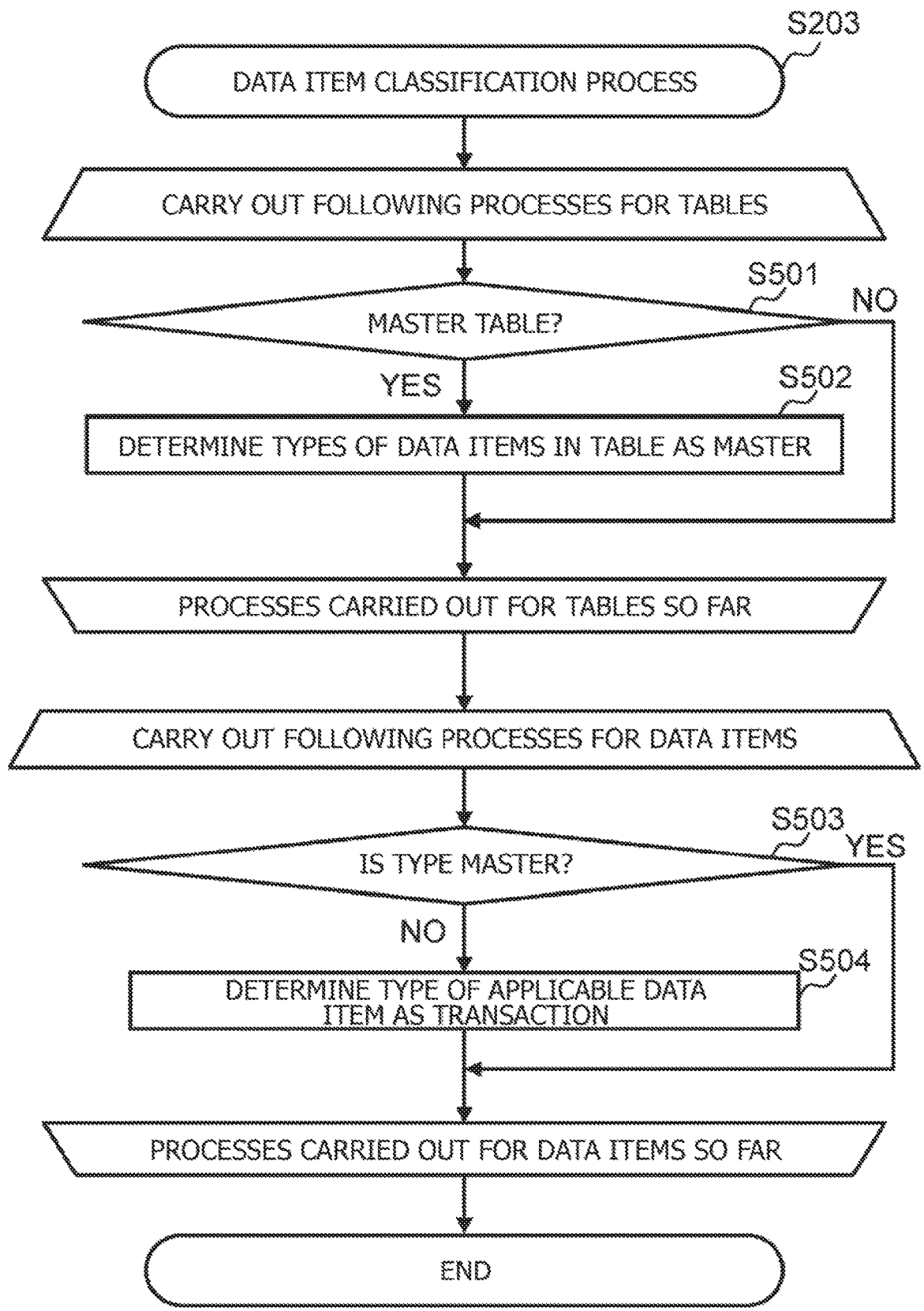
FIG. 13 is a flow chart depicting an example of a data item classification process according to the first embodiment.

FIG. 13 is a flow chart depicting the data item classification process (step S203) depicted in FIG. 10. First, for the tables indicated by the nodes existing in the table layer of the relationship network, the data item classification section 118 carries out such processes at steps S501 and S502 as described below.

At step S501, the data item classification section 118 decides whether or not the applicable table is a master table. For example, in the case where the table is not updated for a fixed period of time or where no record is added after generation of the table, the data item classification section 118 decides that the applicable table is a master table, and stores 0 indicative of a master table into the type information of the node of the table layer depicted in FIGS. 4A to 4C, whereafter it executes step S502.

In the case where the applicable table is not a master table, the data item classification section 118 places 1 indicative of a transaction table into the type information of the node of the table layer depicted in FIGS. 4A to 4C and advances the processing to processing for the next table. If the process is completed for all tables, then the processing advances to step S503.

At step S502, the data item classification section 118 sets the type of the data items possessed by the table decided as a master table to master. In particular, the data item classification section 118 stores 0 indicative of a master to the type information of the node of the data item layer depicted in FIG. 5A as depicted in FIG. 5B.

Then, the data item classification section 118 carries out processes at steps S503 and S504 for each of the data items indicated by the nodes existing in the data item layer of the relationship network. At step S503, the data item classification section 118 decides whether or not the applicable data item is master. In particular, the data item classification section 118 decides whether or not the type of the node depicted in FIGS. 5A to 5C is 0. The data item classification section 118 advances to processing for a next data item if the type of the node is 0, but ends the present processing if the processing is completed for all data items. If the type of this node is not 0, then the data item classification section 118 advances the processing to step S504.

Step S504 is a process that sets the type of the applicable data item to transaction. In particular, the data item classification section 118 places 1 representative of transaction into the type information of the node of the data item layer depicted in FIGS. 5A to 5C. The data item classification section 118 carries out the processes described above for the node items indicated by the nodes existing in the data item layer of the relationship network, and ends the present processing.

(1-4-4) Analysis Data Table Generation-Accumulation Process

FIGS. 14A to 14C are flow charts depicting the analysis data table generation-accumulation process at step S204 in FIG. 10. This analysis data table generation-accumulation process is executed by the analysis data table generation section 119.

At step S601, the analysis data table generation section 119 decomposes a network, which is configured from nodes and links of the data item layer of the relationship network, into connection components. The present process is carried out using a general algorithm for decomposing connection components, which applies depth-first search to an undirected graph.

Then, the analysis data table generation section 119 carries out the following processes for each connection component. The following processes are carried out for each node whose type is transaction and which is generated newly at step S306 from among the nodes in the connection components. The applicable node is represented by A. Further, for each node other than the node A in the connection components, the following processes are carried out. The applicable node is represented by B and described below.

At step S602, the analysis data table generation section 119 decides whether or not an analysis data table including both of data items represented by A and B exist in the analysis data table information table 115. It is to be noted that the present process may be omitted while the present process is described for all of A and B.

The analysis data table generation section 119 advances the processing to step S603 if the analysis data table does not exist in the analysis data table information table 115, but ends the processing for B if the analysis data table exists in the analysis data table information table 115.

At step S603, the analysis data table generation section 119 decides whether or not the node A and the node B are adjacent to each other in the network, namely, whether or not a link having the table ID as an attribute is absent between A and B. If the applicable link is present, then the analysis data table generation section 119 advances the processing to step S605, at which the table having the table ID represented by the link is accumulated as a table including A and B into the analysis data table information table 115. Thereafter, the processing for B is encoded.

On the other hand, if A and B are not adjacent to each other at step S603, then the analysis data table generation section 119 advances the processing to step S604, at which it calculates paths from A to B.

Thereafter, the following processes are carried out in an ascending order of the length of the paths from A to B. At step S606, the link having a table ID first when tracing from a link from A in the applicable path is represented by A and a next link having a table ID is represented by B, and a table indicated by the table ID of A is represented as table ta. In the case where a plurality of tables exist as such table ta, the following processes are executed for each table.

At step S607, the analysis data table generation section 119 decides, where a node of the table layer having the table ID of B is represented as table tb, whether or not the table ta and the table tb can be coupled from the table ta to the table tb using a common data item as a key.

In the case where a plurality of tables exist as such table tb, the analysis data table generation section 119 executes processing for each table. Here, the common data item indicates an item common as a node of the data item layer from among the data items possessed by the table ta and the table tb.

As regards the common item, if a data value corresponding to a data value in the table ta exists uniquely in the table tb, then they can be coupled through collation. As regards items representative of time or place, it may be set that, also in the case where they are proximate to each other, they can be collated with each other. Further, an inquiry may be issued to the user through the display apparatus 109 such that the user determines a data value to be collated through the inputting apparatus 108. If coupling is performed to generate a new table in this manner, then the processing advances to step S608. If such coupling cannot be performed or the record number as a result of the coupling is 0, then the processing for the applicable path is ended at the present step.

At step S608, the analysis data table generation section 119 determines a table obtained by coupling, from among the tables tb that can be coupled to the tables ta, the table to which one of the tables ta, which has the greatest record number of the coupled table, is coupled as table ta. It is to be noted that one of the coupled tables having the greatest number of records may not be selected, but a table coupled to each tb may be determined as table ta such that the following process are executed for each ta. Step S609 is a process for deciding whether the link b is the last link of the applicable path, namely, whether the end node of the ink b is B.

If the link b is the last link, then step S611 is executed. In particular, the table to is accumulated into the analysis data table information table 115, and the processing for B is ended. On the other hand, if the link b is not the last link, then a link having a table ID first when the path is traced from a next link of the path, namely, from a link whose source node is the end node of the link b, is newly determined as link b (step S610), whereafter the processing returns to step S607.

The processes described above are executed for each of A and B. Further, the processes described above are executed for each connection component, and then the present processing is ended.

(1-4-5) Data Model Generation Process

Figure 15A:
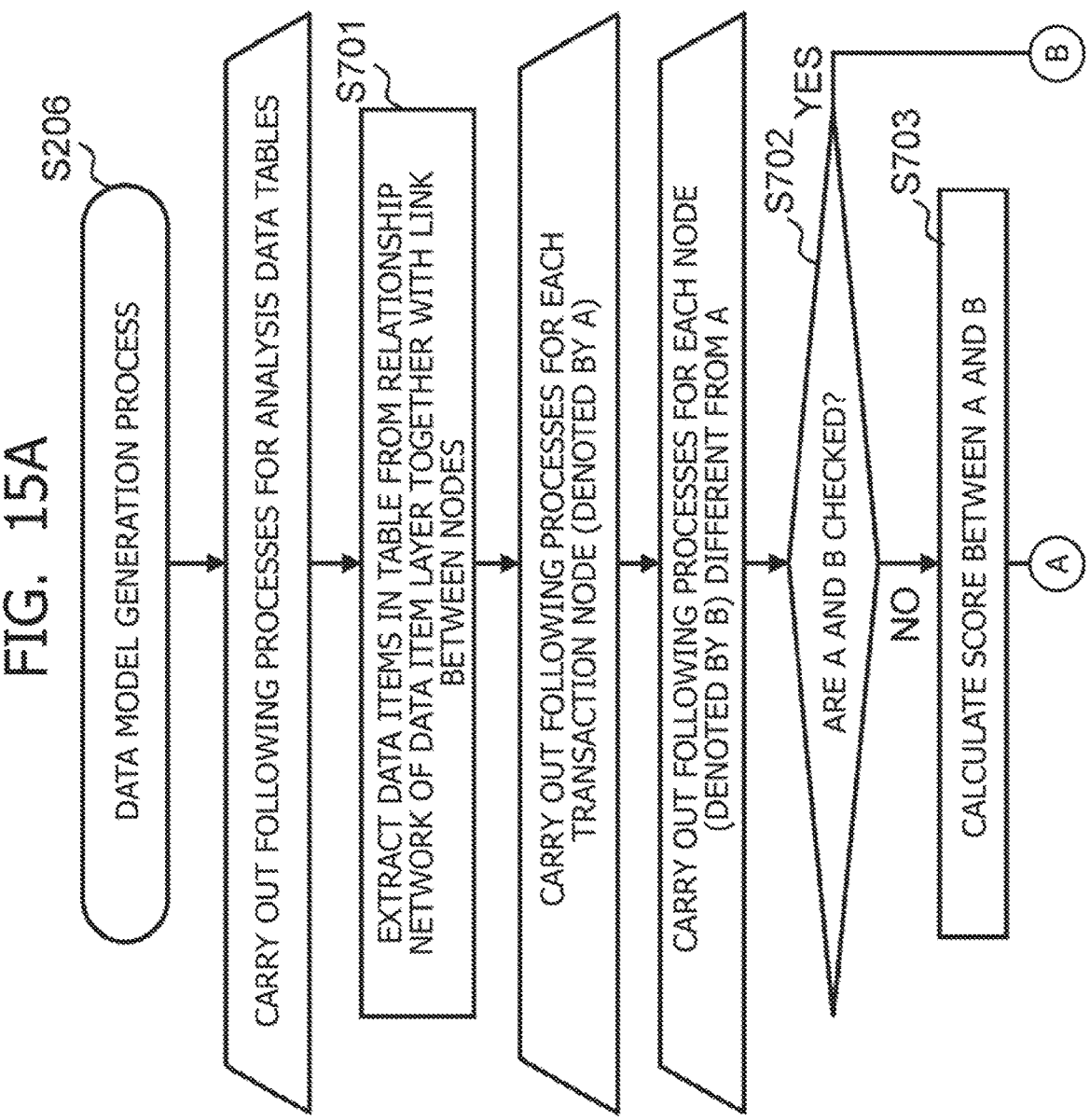

FIGS. 15A and 15B depict the data model generation model (step S206) depicted in FIG. 10. This data model generation process is executed by the data model generation section 120. The present process is carried out for each analysis data table stored in the analysis data table information table 115.

At step S701, the data model generation section 120 extracts nodes from the relationship network of the data item layer in regard to data items in the applicable analysis data table together with links between the nodes.

For each of the nodes that are extracted in this manner and whose type among the data items indicates transaction, the data model generation section 120 carries out the following processes. The applicable node is represented by A. Further, for each node other than A from among the extracted nodes, the data model generation section 120 carries out the following processes. The following description is given representing the applicable node that is not A by B.

At step S702, the data model generation section 120 decides whether or not A and B are checked already, namely, whether or not the score between the data items A and B is calculated. In the case where the score is not calculated as yet, the data model generation section 120 advances the processing to step S703, but in the case where the score is calculated already, the data model generation section 120 advances the processing to processing for a next node pair.

At step S703, the data model generation section 120 calculates the score between A and B. The score is a numerical value that can be calculated using an analysis data table like a correlation coefficient that is calculated using columns of a data item indicated by A and columns of the data item indicated by B of the applicable analysis data table and a sample number when a correlation coefficient is calculated.

At step S704, the data model generation section 120 performs a process for setting, between A and B, a link whose weight is the score calculated at step S703 and in which the type is analysis target. The processes described above are carried out for each of the combinations of A and B.

At step S705, the data model generation section 120 accumulates a relationship network (that corresponds to the "network" depicted in the figure) that includes the nodes and links extracted already at step S701 and the links added at step S704 as a data model into the data model information table 116. The processes described above are carried out for the analysis data tables and then end the present processing. It is to be noted that, while, in the present embodiment, the relationship network of the data item layer is a data model, also corresponding relationship networks of the system layer, table layer and data value layer may be added to the data model.

(1-5) Example of Screen Image

FIGS. 16A and 16B depict an example of a first screen image on which a relationship network generated by the relationship network generation section 117 is displayed on the display apparatus 109. The present first screen image represents a manner in which relationships among operation information are visualized to a user.

If each system layer, each table layer, each data item layer and each data value layer are selected by a tab 16001, then the selected layers are displayed on the screen of the display apparatus 109. In FIGS. 16A and 16B, the data item layer is illustrated as an example from among the layers.

In the present first screen image example, connection components selected by a check box 16002 through the inputting apparatus 108 by the user when a relationship network is decomposed into connection components are displayed. In a text 16003 of the check box 16002, the name of the node representative of the center of the connection component is displayed.

Figure 17B:
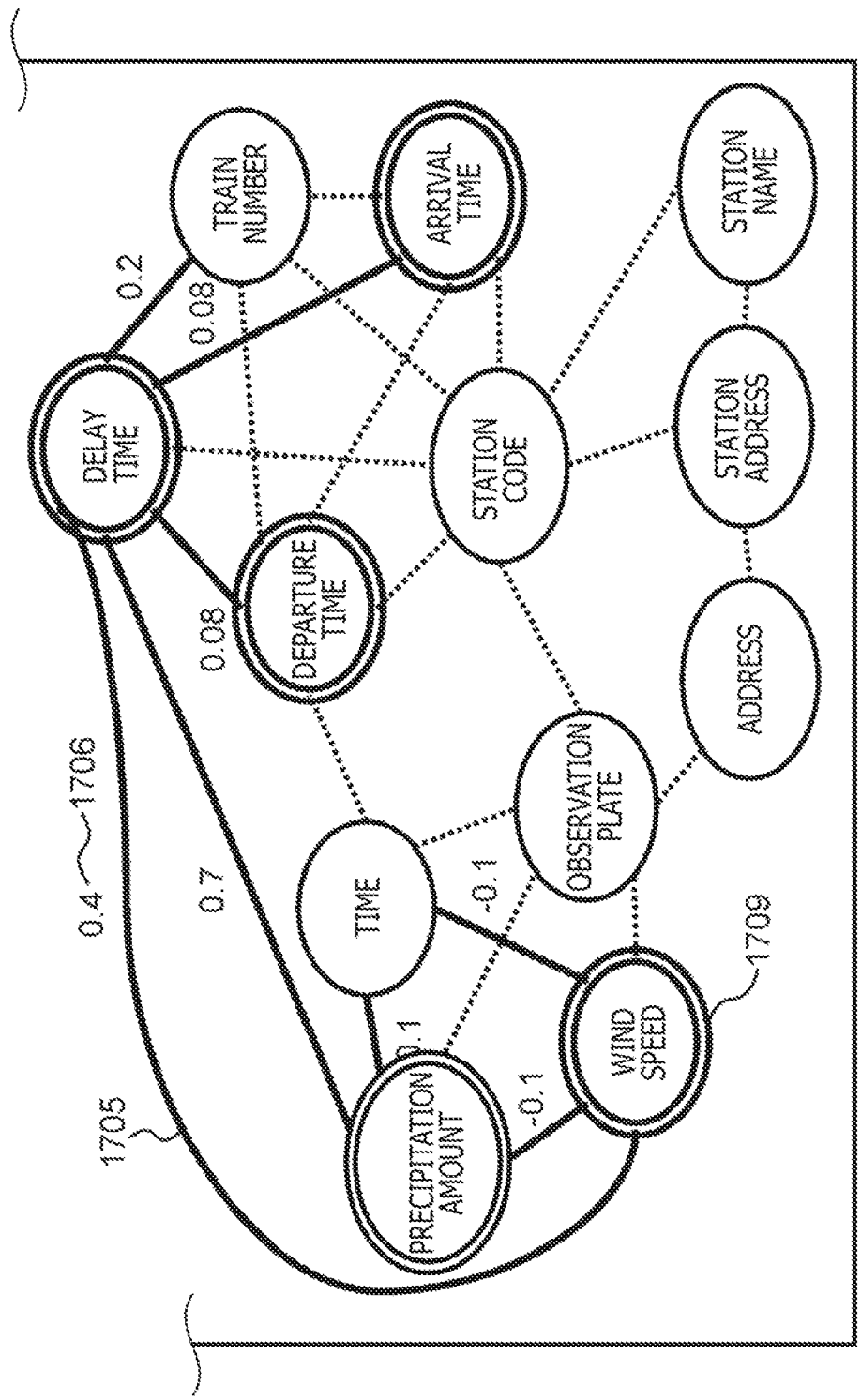

FIGS. 17A and 17B depict a second screen image example on which data items that become an analysis target are recommended to the user. In particular, the analysis target item presentation section 121 displays the data items that become an analysis target on the display apparatus 109 to recommend the data items to a user who comes into contact with the display substance.

In the present second screen image example, for each of data models that are generated by the data model generation section 120 and are to be placed into the data model information table 116, a combination of data items that become an analysis target is displayed emphatically together with a score calculated at step S703 described hereinabove.

The data model displayed emphatically in this manner is selected by the user operating a radio button 1701 through the inputting apparatus 108. The arrangement order of choices is a descending order of correlation coefficients, which are a kind of score calculated at step S703 described above of the data models, from the highest correlation coefficient, also a different score may be used or the order may be a descending order of a value calculated by combination of scores. In the present embodiment, as information of the data model, a data item number 1702 that is a record number of a table indicated in the data item 1502, an analysis item group number 1703 that is a record number of the table indicated by the score 1503 and a sample number 1704 that is a record number of the table indicated by the analysis table 1505 are displayed. A transaction data item that becomes an analysis target is displayed emphatically in a form different from that of the other nodes like a wind speed node 1709.

In the present embodiment, as an analysis target item, for example, a precipitation amount, a delay time, departure time and arrival time are displayed emphatically in addition to the wind speed. As a group of analysis target items, a link and a score between items are indicated like a link 1705 and a score 1706.

In the present embodiment, eight groups of the precipitation amount and delay time, the precipitation amount and wind speed, the precipitation amount and time, the delay time and wind speed, the time and wind speed, the arrival time and delay time, the departure time and delay time and the train number and delay time are recommended as groups of analysis target items. The scores of them are 0.7, −0.1, 0.1, 0.4, −0.1, 0.08, 0.08 and 0.2, respectively.

It is to be noted that, when an overall relationship network is displayed as in FIGS. 16A and 16B, a common model, relationship data, specification information and so forth relating to an operation field of the operating system may be stored into the database 111 in advance such that they are used to display the nodes of the relationship network hierarchically or display the nodes in aggregation.

For example, in the case where data relating to a railway are handled, if a master table that becomes a common model in regard to such invariables as stations, trains and tracks is generated in advance and the master table is incorporated into the relationship network, then it is possible to take in relationships of data to the invariables.

It is to be noted that the user may edit and use the relationship network in the first screen image example depicted in FIGS. 16A and 16B through the inputting apparatus 108 or the data analysis system 104 such that the relationship network is stored together with an analysis result for each user or for each analysis system so as to make it possible to refer to the storage substance upon analysis.

Further, at step S406, the relationship network generation section 117 may set relationship links of data items using dictionary information stored in advance in the database 111. Although it is described in the description of the present embodiment that the relationship network has four layers of the system layer, table layer, data item layer and data value layer as depicted in FIGS. 2A and 2B, this is not restrictive, and in the case where the data analysis support apparatus 101 can extract a site name and a company name to which each system belongs, the relationship network generation section 117 may include a side layer and a company layer above the system layer. Thereupon, one site or company is made one node, and a link is set between the node and a lower node possessed by the site and the company.

Furthermore, if a link exists between system nodes of different sites, then by setting a link also between the site nodes or company nodes, it is possible to represent connections between the different sites or between the different companies.

Thereupon, for example, at step S406, the relationship network generation section 117 may decompose a relationship network of the data item layer for each company, associate different company nodes with each other in the case where the position information and the time and date are within fixed ranges, associate the different company nodes with each other using dictionary information or the editing substances of users and so forth, determine, if an isomorphism, which include at least one or more associations and associates the different nodes with each other, exists, that the data items indicative of the nodes that can be associated with each other with the isomorphism as similar data items and set a new link between the data items to extract a new analysis target item. It is to be noted that, when an isomorphism is searched for, links of the target may be of all types or may be restricted to analysis target links or the like.

This makes it possible to accumulate, for example, items of the different company data as analysis target items. It is to be noted that an inquiry about whether or not the data items are actually similar to each other may be issued to the user such that a similarity link is set by an approval operation of the user.

As described above, in the present embodiment, a data analysis support apparatus 101 that supports analysis targeting each operation data of each operation data table in each of at least one or more operating systems includes a data item classification section 118 that classifies each data item possessed by each operation data into a first data type based on an actual value and a second data type based on a planned value or a pre-definition, a relationship network generation section 117 that generates a relationship between the operating systems, a relationship between the operation data tables, a relationship between the data items possessed by the operation data tables and a relationship between the data values possessed by the records of the operation data tables as a relationship network, an analysis data table generation section 119 that generates an analysis data table including at least one of the data items included in the first data type on the basis of the relationship network, a data model generation section 120 that determines a score representative of an analysis recommendation degree on the basis of the analysis data table in regard to analysis target candidates configured from a combination of the data items, and an analysis target item presentation section 121 that outputs the analysis target candidates together with the analysis recommendation degrees based on the scores determined by the data model generation section 120.

According to such a configuration as described above, targeting a plurality of data tables, even a person who does not have data knowledge or a person who does not have field knowledge can select an analysis target item readily without using table definition information and perform analysis.

(2) Second Embodiment

A data analysis support system that includes a data analysis support apparatus 101A according to a second embodiment has a configuration substantially similar to that and executes operation substantially similar to that of the data analysis support system that includes the data analysis support apparatus 101 according to the first embodiment. Thus, in the following, description is given principally of differences between them.

In the first embodiment, an example is demonstrated in which a group of data items to be analyzed is recommended in regard to all data items of all data tables corresponding to operation information of all operating systems 102 and 103 connected to the data analysis support apparatus 101. In contrast, in the second embodiment, an example is demonstrated in which one data item that becomes an analysis target is determined by an input of a user and data items to be analyzed in combination with the item are recommended.

Figure 18A:
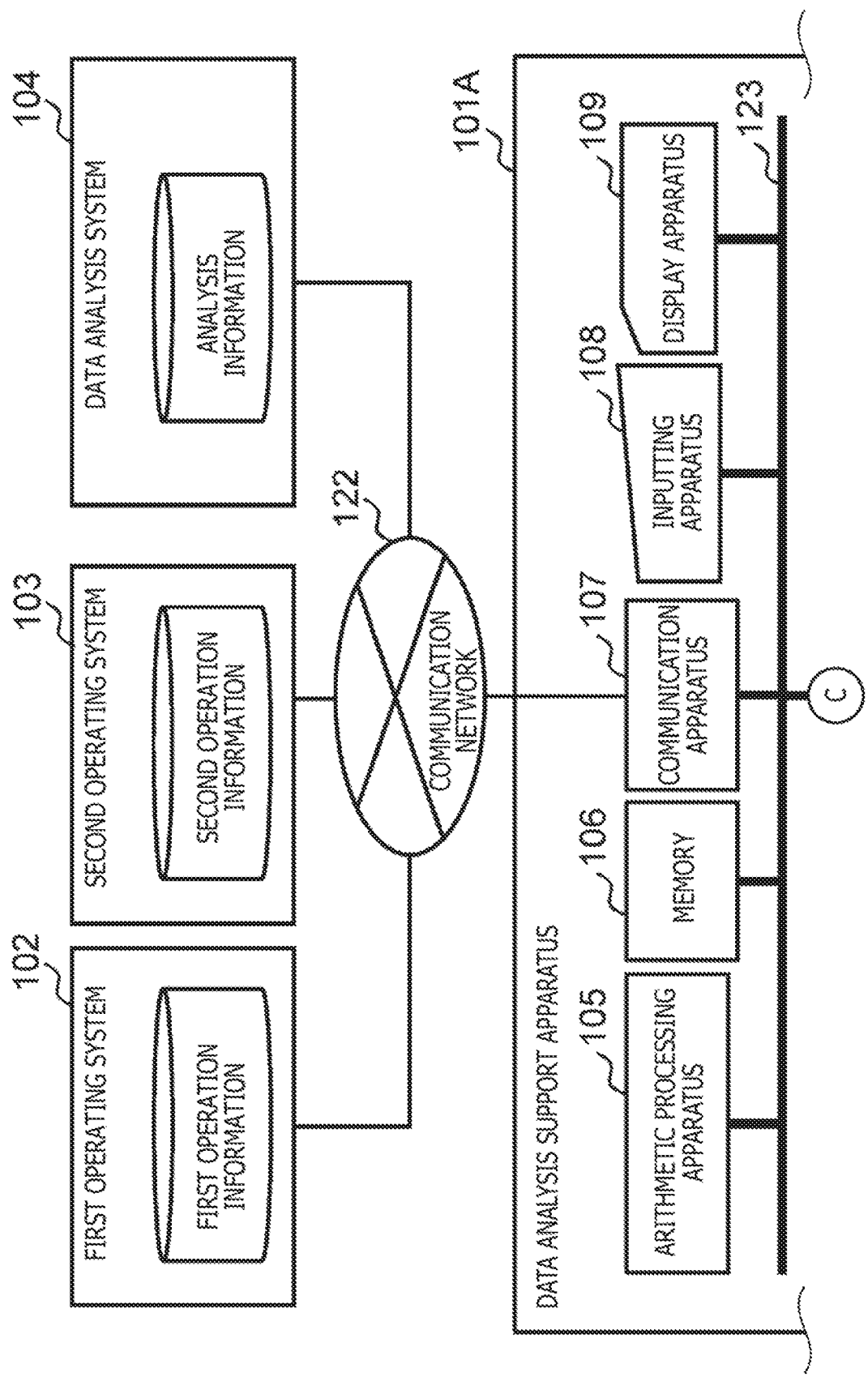
FIGS. 18A and 18B are views depicting an example of a system configuration of a data analysis support system including a data analysis support apparatus according to a second embodiment.
Figure 18B:
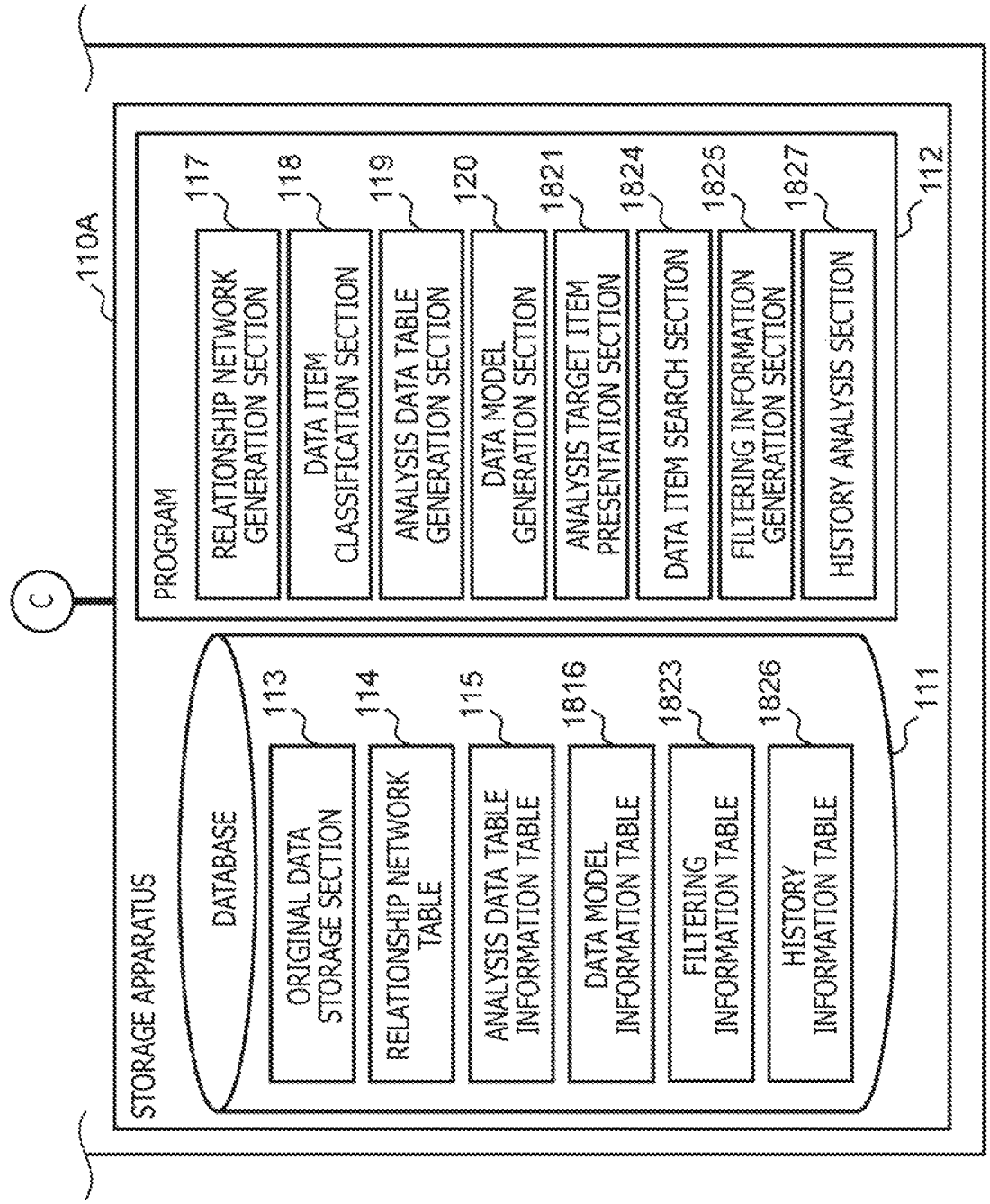

FIGS. 18A and 18B are block diagrams depicting an example of a system configuration of the data analysis support system including the data analysis support apparatus 101A according to the second embodiment. The data analysis support apparatus 101A according to the second embodiment includes a filtering information table 1823 and a history information table 1826 in addition to the configuration of the database 111 depicted in FIGS. 1A and 1B and includes a data item search section 1824, a filtering information generation section 1825 and a history analysis section 1827 in addition to the configuration of the program 112. Like portions to those of FIGS. 1A and 1B are denoted by like reference characters, and description of them is omitted.

The data item search section 1824 searches for and extracts applicable data items to a keyword inputted from a user. The filtering information generation section 1825 narrows down analysis data tables with data values having data items to calculate scores of correlation coefficients or the like and extracts and accumulates data items if they have higher scores such as correlation coefficients.

Figure 19A:
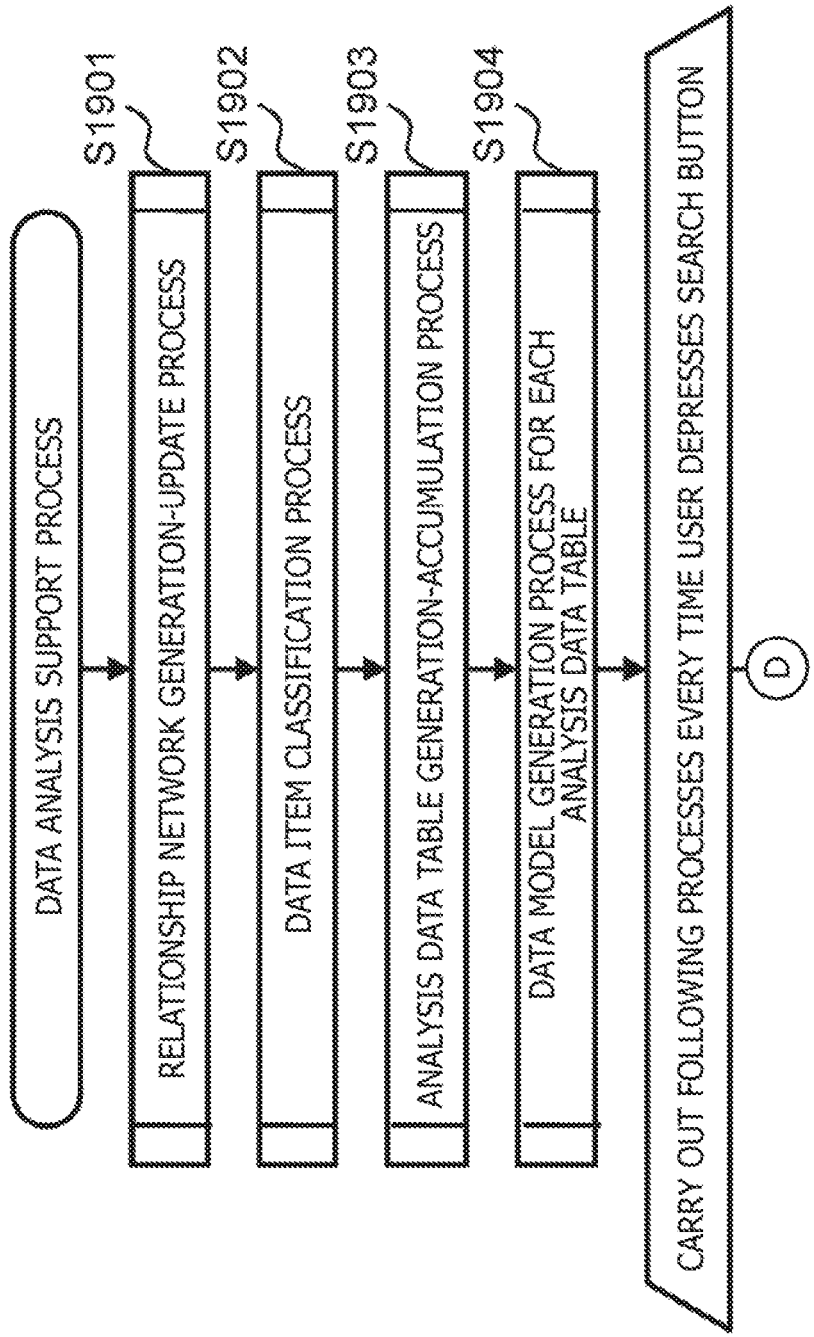
FIGS. 19A to 19C are flow charts depicting a data analysis support process according to the second embodiment.
Figure 19B:
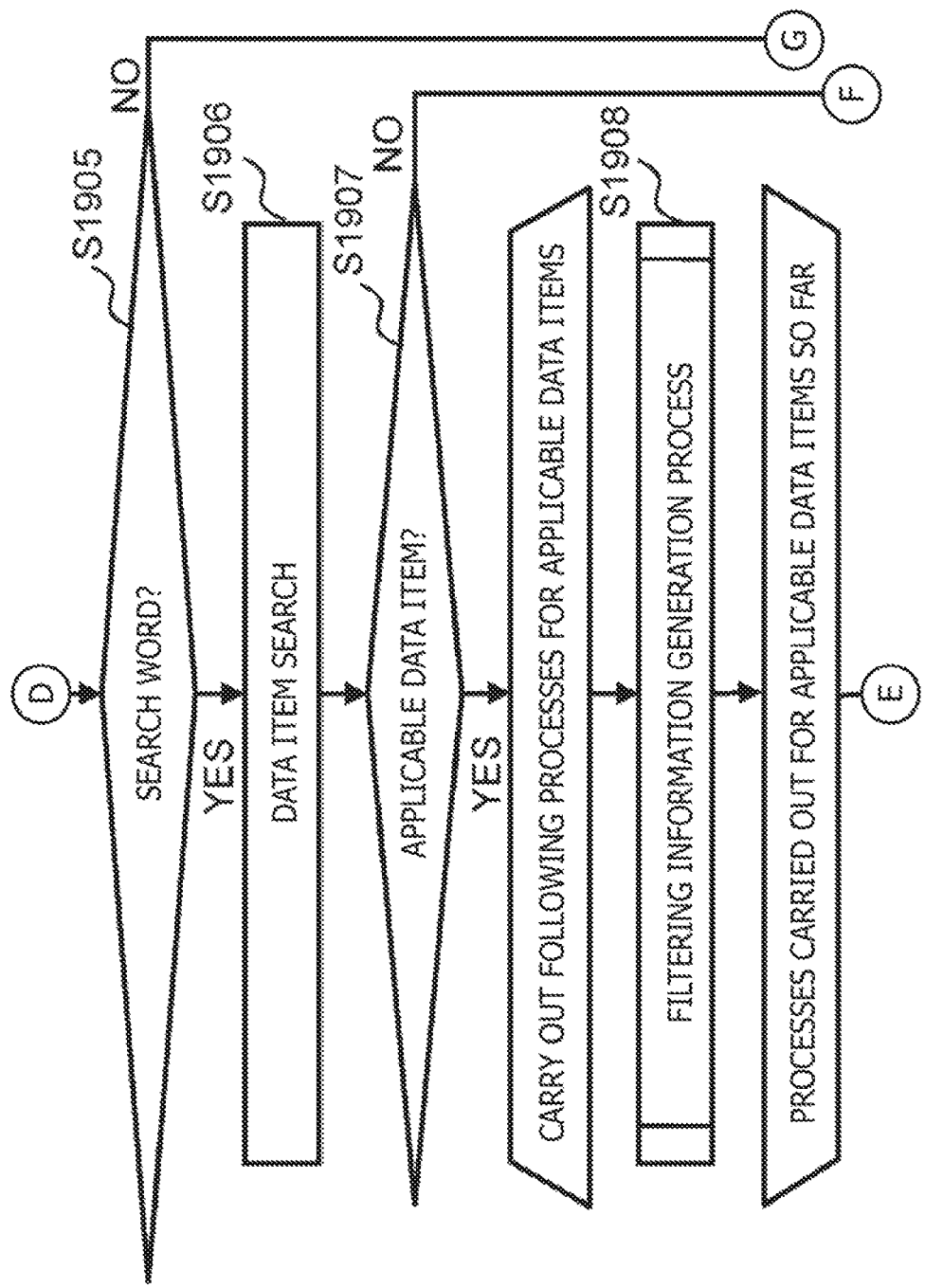
Figure 19C:
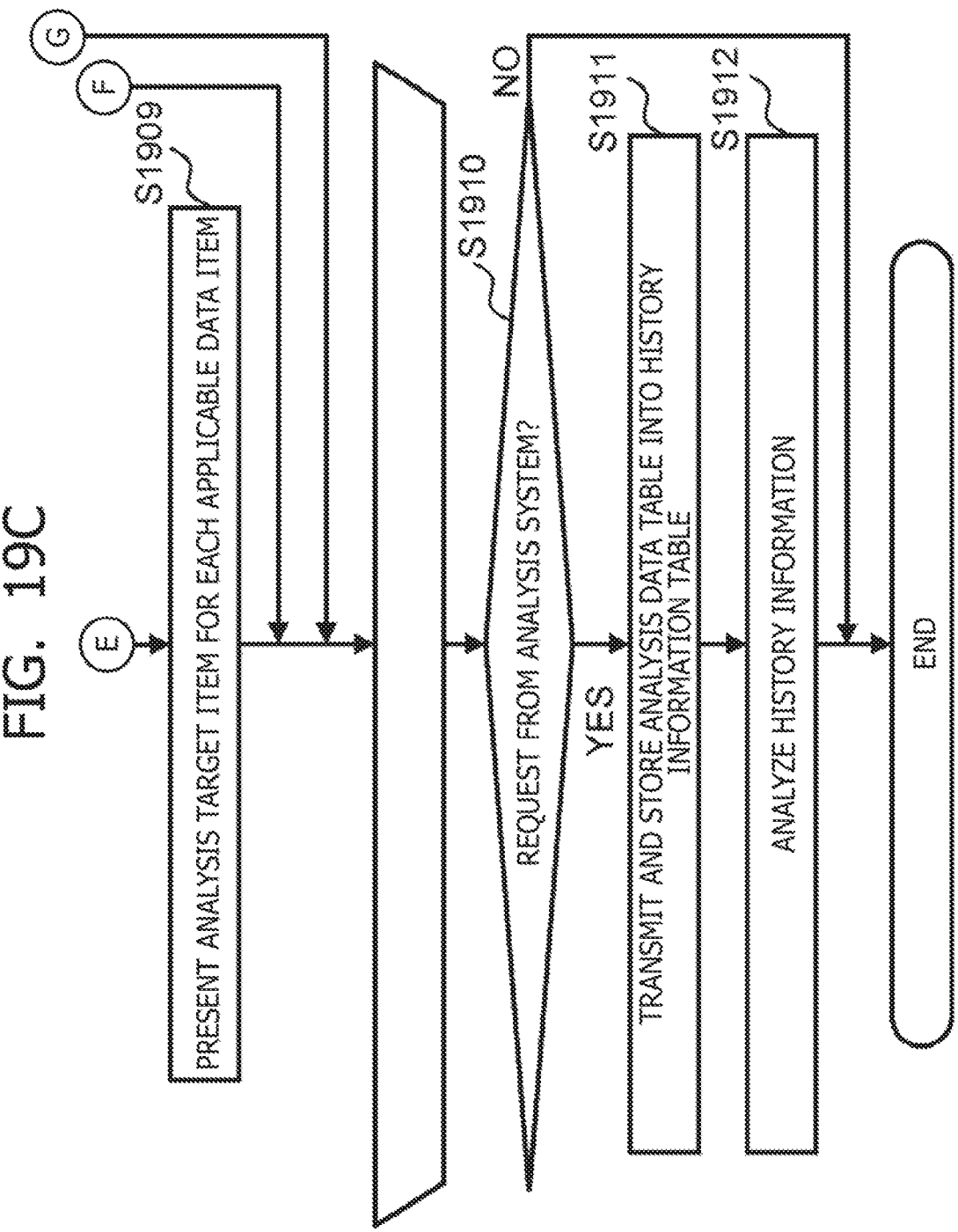

FIGS. 19A to 19C are flow charts depicting an example of a basic processing procedure of the data analysis support apparatus 101A according to the second embodiment. At step S1901, the relationship network generation section 117 generates a relationship network. Since the process at this step S1901 is substantially similar to that at step S202 depicted in FIG. 10, description of it is omitted.

At step S1902, the data item classification section 118 classifies the data items into a first data type based on an actual value and a second data type based on an evaluation value or a pre-definition. Since the process at this step S1902 is a similar process to that at step S203 depicted in FIG. 13, description of it is omitted.

At step S1903, the analysis data table generation section 119 generates and accumulates analysis data. Since the process at this step S1903 is a similar process to that at step S204 depicted in FIGS. 14A to 14C, description of it is omitted.

At step S1904, the data model generation section 120 generates a data model for each of the analysis data tables generated at step S1903. Since the present process is a similar process to that at step S206 depicted in FIG. 15, description of it is omitted.

Figure 21A:
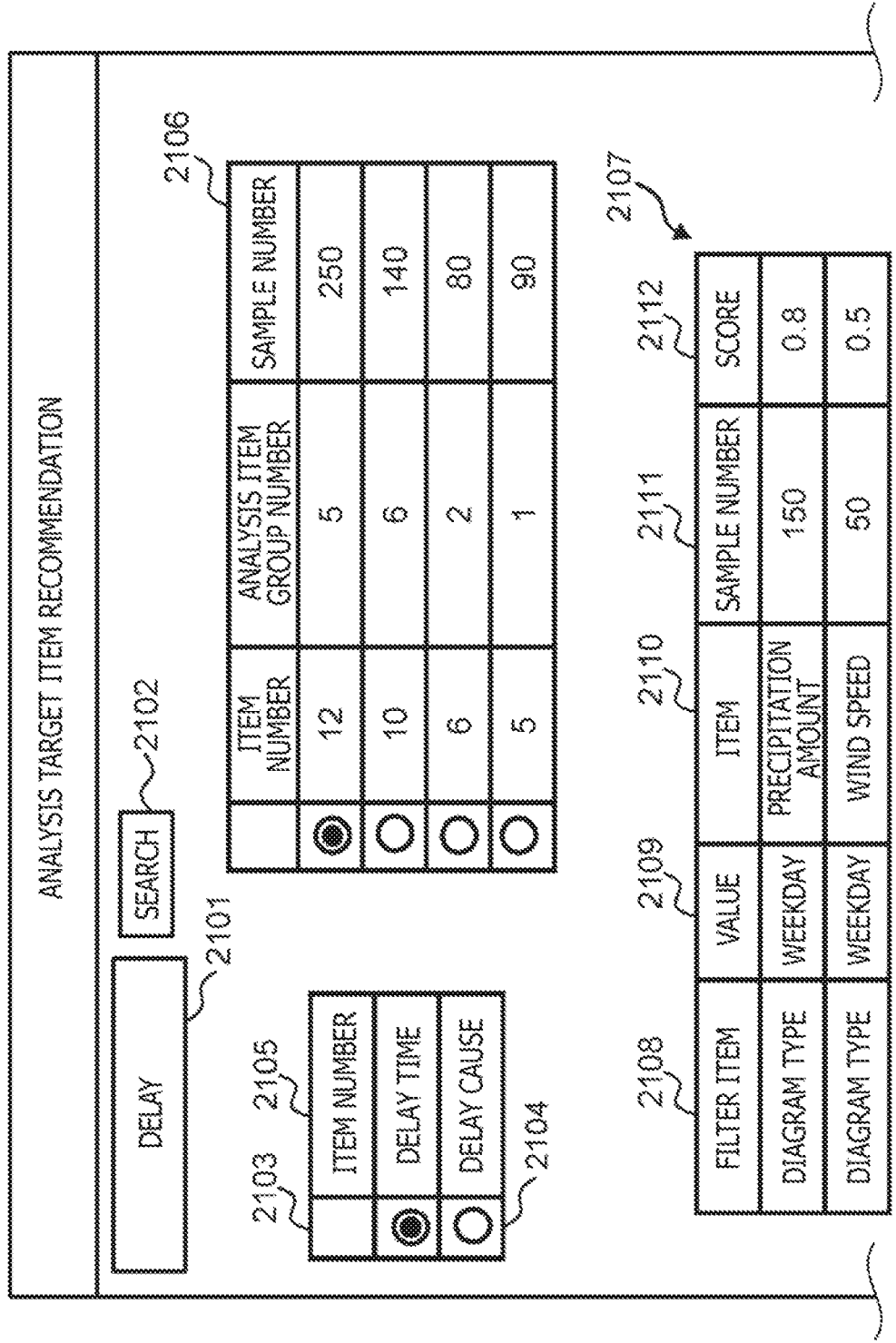
FIGS. 21A and 21B are views depicting a first example of a screen image in the second embodiment.
Figure 21B:
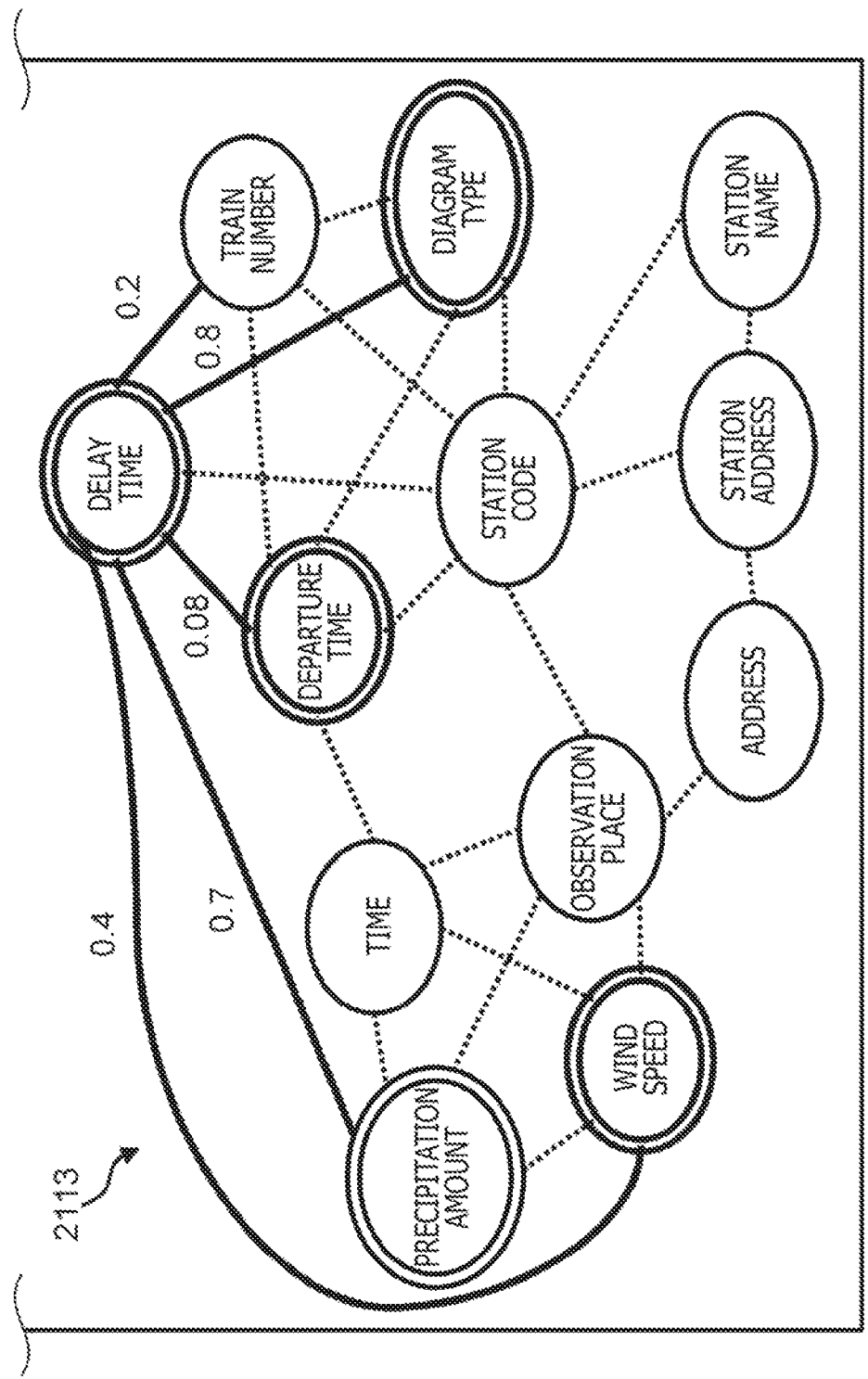

The following processes are carried out every time the user depresses a search button 2102 of FIGS. 21A and 21B through the inputting apparatus 108. The process at step S1905 is a process for deciding whether a keyword is inputted to a search box 2101 upon depression of the search button 2102 by the user, namely, whether or not a keyword relating to an item to be analyzed is inputted to the search box 2101 through the inputting apparatus 108 by the user. If a keyword is inputted, then step S1906 is executed, but if a keyword is not inputted, then the process responsive to the depression of the search button 2102 is ended.

The process at step S1906 is a process of the data item search section 1824 for searching for a data item relating to the keyword inputted by the user. In the present process, it is searched whether item names of nodes (refer to FIGS. 5A to 5C) of the data item layer and the values of the nodes (refer to FIGS. 6A to 6C) of the data value layer in the relationship network table 114 include a data item that includes the input keyword to extract a data item. If the keyword exists in any of the item names of the nodes of the data item layer, then the data item is extracted. Further, if the keyword exists in any of the values of the nodes of the data value layer, then also the data item to which the data value belongs is extracted.

The process at step S1907 is a process for deciding whether or not a data item that includes the input keyword or a data item corresponding to the data value is found at step S1906. If the applicable data item is found, then a process at step S1908 is carried out for each of such applicable data items. On the other hand, if the applicable data item is not found, then the process responsive to the depression of the search button 2102 is ended.

At step S1908, the filtering information generation section 1825 generates filtering information relating to the applicable data item.

Figure 20B:
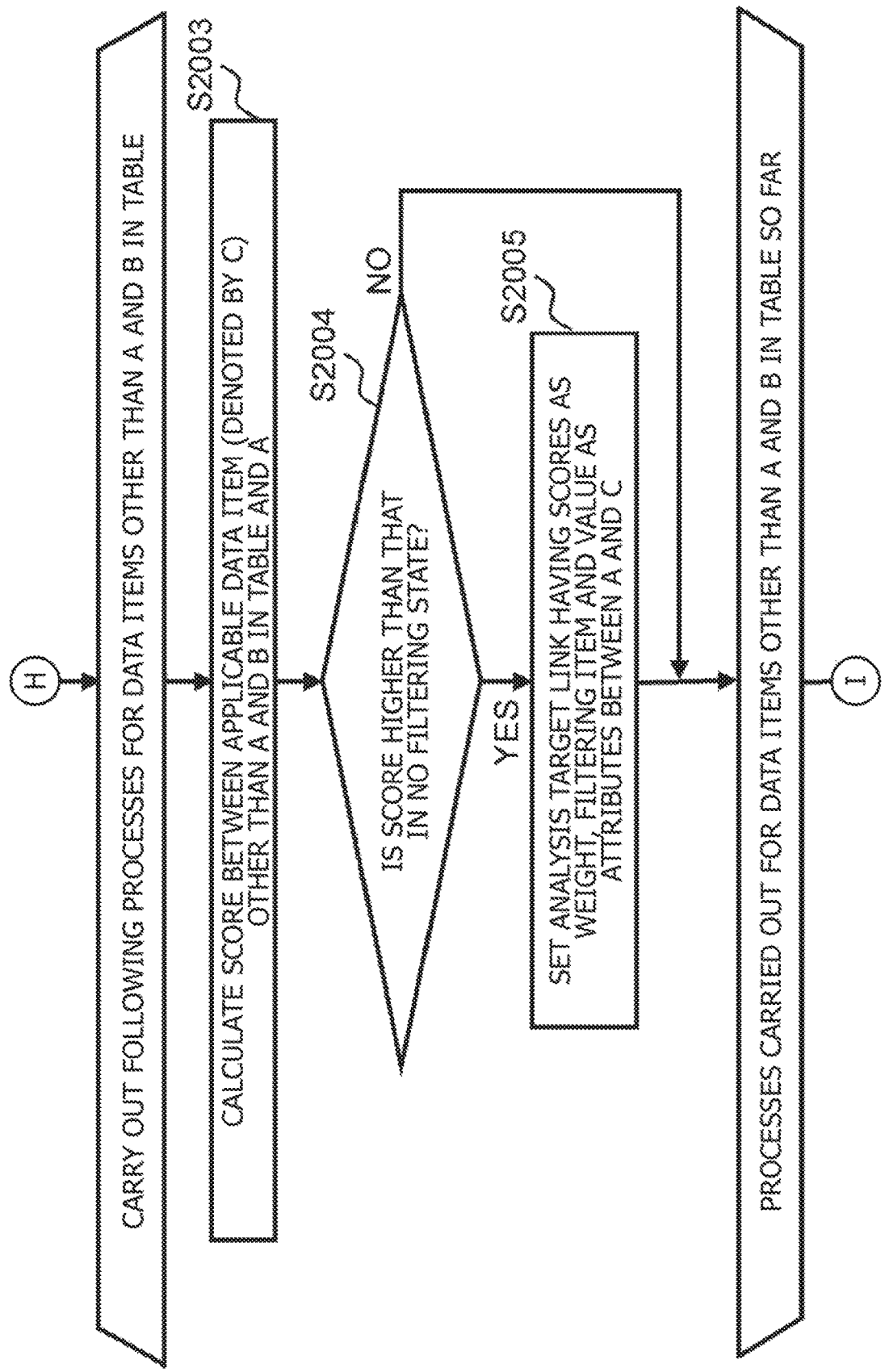
Figure 20C:
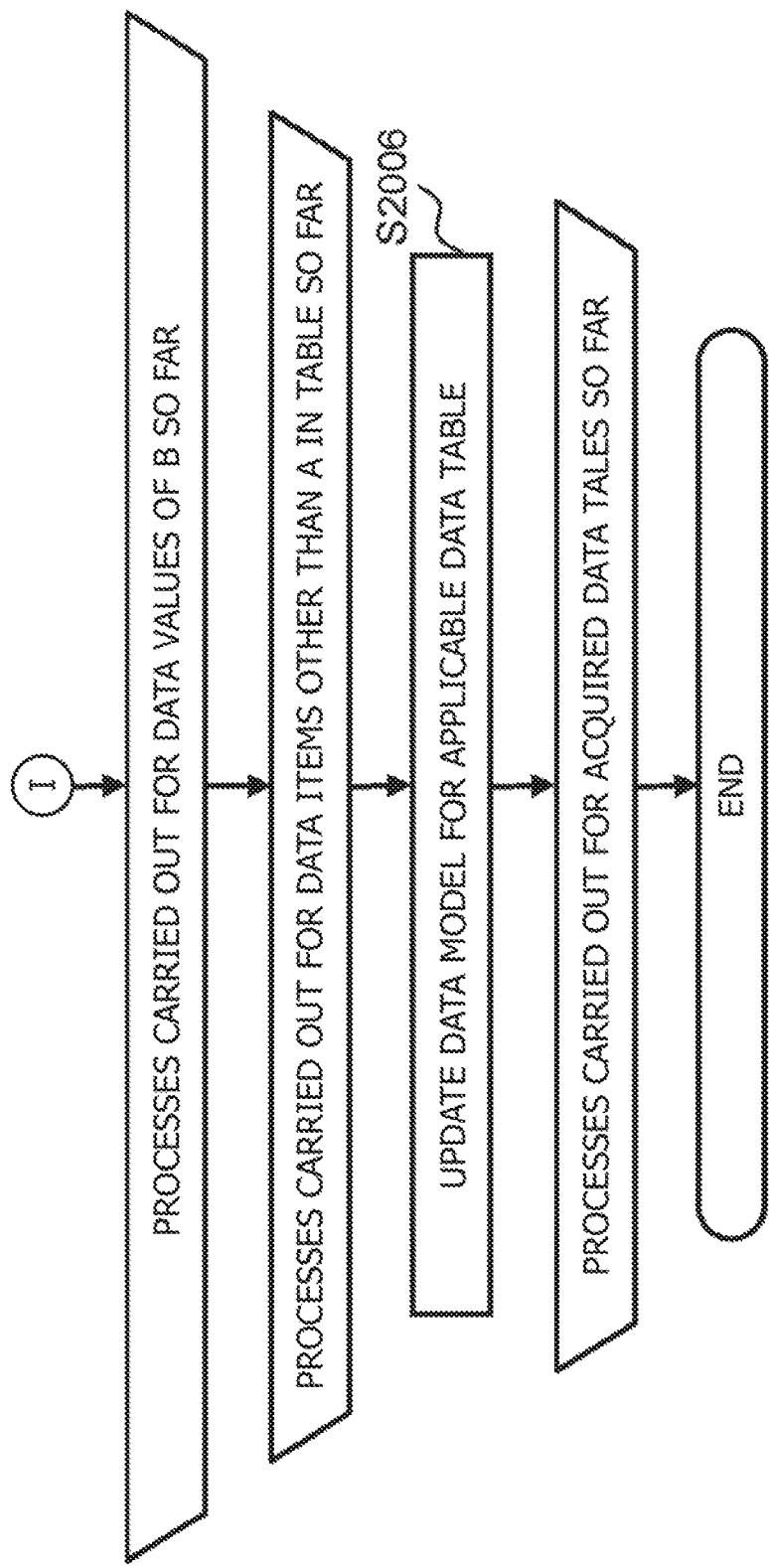

FIGS. 20A to 20C depict an example of processing carried out by the filtering information generation section 1825 at step S1908 depicted in FIGS. 19A to 19C. The process at step S2001 is a process for extracting, where the applicable data item is represented by A, an analysis data table having A as a data item thereof from the analysis data table information table 115.

The filtering information generation section 1825 carries out the following processes for each of such extracted analysis data tables (referred to as table ta). Further, the filtering information generation section 1825 carries out the following processes for each of the data items other than A in the applicable analysis data table. Further, determining the applicable data item other than A as B, the filtering information generation section 1825 carries out the following processes for each of sets (partial sets except the whole set of all data values) that have one or more data values B has as a component.

First at step S2002, the filtering information generation section 1825 converts the applicable analysis data table into an analysis data table that has, as records thereof, only records whose data item B coincides with one of the components of the applicable data value set and stores the analysis data table newly into the analysis data table information table 115. Then, in the newly generated present analysis data table (referred to as table tb), for the data items other than A and B in the table tb, the following processes are carried out.

At step S2003, the filtering information generation section 1825 determines the applicable data item other than A and B in the table tb as C and calculates a score between C and A. The present process is a process similar to that at step S703, and a numerical value that can be calculated using the table tb like a correlation coefficient or the like that is calculated using a column of the data item indicated by A of the table tb and a column of the data item indicated by C.

At step S2004, the filtering information generation section 1825 decides whether or not the score between A and C calculated from the table tb at step S2003 is higher than the score between A and C in the table ta. For the score in regard to the table ta, values of the correlation coefficient 1516 and so forth in a record where the analysis table 1505 of the data model information table 116 (1816) depicted in FIGS. 9A to 9C is the table ta and in which the combination of the item ID (1) item ID (1) 1514 and the item ID (2) 1515 of the table stored in the score 1503 is the item ID indicative of A and the item ID indicative of C are referred to.

For example, in the case where the correlation coefficient between the delay time and the precipitation amount is higher at a value thereof targeting all days than at a value thereof targeting only weekdays, the filtering information generation section 1825 decides that the score between A and C calculated from the table tb is higher than the score between A and C in the table ta. In the case where the applicable correlation coefficient is higher, step S2005 is executed, but in the case where it is decided that the application correlation is equal or lower, the processing for C is ended.

At step S2005, the filtering information generation section 1825 sets an analysis target link, which has, as attributes thereof, a score as a weight and is a filtering item in the relationship network of the data item layer and the data value of B in the table tb, which is a filtering value, between a node representative of A and another node representative of C. Further, similar information is placed into the filtering information table 1823.

The foregoing processes are carried out for the data items other than A and B in the table ta. Further, the foregoing processes are carried out for each of the sets that has one or more data values B has as a component thereof (partial set except the whole set including all data values). Furthermore, the processes described above are carried out for the data items other than A in the table ta.

At step S2006, the filtering information generation section 1825 updates the data model corresponding to the table ta. In particular, the filtering information generation section 1825 updates the data model information table 1816. To the data model information table 1816, a filtering item filter value and an analysis table are added to the table stored in the score 1503 of the data model information table 116 depicted in FIGS. 9A to 9C.

The link added at step S2005 is added to the table placed in the score 1503 of the record whose analysis table 1505 of the data model information table 1816 is the table ta.

Into the filtering value, B that is a filtering item is placed; into the filter value, a data value of B in the table tb, which is a filtering value, is placed; and into the analysis table, the ID of the analysis data table information table 115 indicative of the table tb is placed. In regard to the remaining items, similarly as at step S705, into the item ID (1) 1514, the item ID of the node indicative of A is placed; into the item ID (2) 1515, the item ID of the node indicative of C is placed; into the score of the correlation coefficient 1516 and so forth, the calculated score is placed; and into the sample number 1517, the record number of the table tb is placed. The foregoing processes are carried out for the analysis data tables acquired at step S2001, and the present processing is ended.

In the present process example depicted in FIGS. 20A to 20C, not only a case in which the keyword is included in the data item layer and another case in which the keyboard is included in the data value layer are handled similarly to each other at step S1906. However, in place of this, in the case where the keyboard is included in the data value layer, when an analysis data table is acquired at step S2001, after the analysis data table is converted into a data table that includes only records having the applicable data value, namely, is filtered in advance, the succeeding processes may be carried out.

This makes it possible to restrict, for example, when "sudden ill person" is inputted as a keyword, the analysis data tables to those in the case where the data item "delay factor" is "sudden ill person," by which survey analysis support of a cause of sudden illness becomes possible.

Referring back to FIGS. 19A to 19C, the rest of the example of the basis processing procedure of the data analysis support apparatus 101A according to the second embodiment is described.

At step S1909, the analysis target item presentation section 1821 outputs items, which are to be recommended as a target for analysis in combination, for each data item extracted at step S1906 to the display apparatus 109. An example of an output screen image is hereinafter described with reference to FIGS. 21A and 21B.

In the present process, after all analysis data tables are generated and accumulated, search for a data item according to a keyword inputted by a user (step S1906) and the processes for the data item (step S1908 and so forth) are carried out. However, in place of this, after a data item according to a keyword searched by the user is extracted, an analysis data table and a data table including the data item may be generated, whereafter the processes at and after step S1907 are carried out for the data table.

As the process of the analysis data table generation section 119 at this time, the node A in FIG. 14 is determined as a data item corresponding to the keyword, and at step S601, connection components including the node A are extracted, whereafter processes at and later than step S603 are carried out without carrying out step S602.

FIGS. 21A and 21B depicts an example of a screen image when the analysis target item presentation section 1821 in the second embodiment recommends data items to be made an analysis target on the display apparatus 109.

A search box 2101 is a text box into which a keyword of data to be made an analysis target is to be inputted through the inputting apparatus 108 by the user. In the present embodiment, "delay" is inputted.

The search button 2102 is a button to be depressed through the inputting apparatus 108 by the user. The depression of the search button 2102 becomes a trigger to execution of step S1905. A table 2103 is a table of data item names 2105 extracted through search of data items at step S1906.

Data items to be analyzed in combination from among data items selected using a radio button 2104 through the inputting apparatus 108 by the user are recommended on the present screen image.

A table 2106 is a table of data models including data items selected using the radio button 2104 and is similar to the correspondence display field in the second screen image example depicted in FIGS. 17A and 17B. It is to be noted here that, in addition to the method for displaying in an ascending order or a descending order of the analysis target item group number, correlation coefficient or sample number, a method for displaying in an ascending order or a descending order of the weight of a node or the weight of a link (heaviest one in the data model) that is a result of analysis using the history information table 1826 hereinafter described is available. They may be displayed or may be combined in any order. Further, the user may designate using a combo box or the like.

A table 2107 is a list of link information set between data items selected in the table 2103 at step S2006 in regard to a data model selected through the radio button of the table 2106 and of analysis target links that have a filtering item and a filtering value. This is displayed referring to the table placed in the score 1503 of the data model information table 1816 and the filtering information table 1823.

A filter item 2108 and a value 2109 are displayed referring to the filtering item and the filter value possessed by the table stored in the score 1503 of the data model information table 1816.

An item 2110 displays a data item of a recommendation target to be analyzed in combination of the data item selected through the radio button 2104, namely, an item name not of the data item selected through the radio button 2104 from among the data items indicated by the item ID (1) 1514 or the item ID (2) 1515.

A sample number 2111 is displayed referring to the sample number 1517 of the applicable record of the table stored in the score 1503 of the data model information table 1816, and a score 2112 is displayed referring to the correlation coefficient 1516.

Although a relationship network display 2113 is similar to that of FIGS. 17A and 17B, only the recommendation target data item for the analysis in combination with the data item selected through the radio button 2104 is displayed emphatically.

In the present embodiment, the precipitation amount, wind speed, departure time and diagram type that are data items to be analyzed in combination with the delay time are displayed emphatically. Further, in the present embodiment, it is recommended to analyze the combinations of the delay time with the precipitation amount and of the delay time with the wind speed, restricting the diagram time minute to weekdays, using the table 2107.

Referring back to FIGS. 19A to 19C, description of the example of the basic processing procedure of the data analysis support apparatus 101A according to the second embodiment is continued. Although the foregoing processes are processes for presenting recommendation items in response to a keyword input of the user, the following processes represent processes executed by the data analysis support apparatus 101A after an analysis target item presented by the present data analysis support apparatus 101A by the user and actually the user carries out analysis in the data analysis system 104.

The process at step S1910 is a process of deciding, after the presentation at step S1909, whether or not the user selects an analysis target item, for example, in the data analysis system 104, namely, whether or not a transmission request for an analysis data table corresponding to the analysis target item is received. If such a request is received, then the processing advances to step S1911, but if such a request is not received, then the present processing is ended.

The process at step S1911 is a process of extracting an analysis data table corresponding to the selected analysis target item from the analysis data table information table 115 referring to the data model information table 1816, transmitting the analysis data table to the data analysis system 104 through the communication network 122 and placing the applicable analysis data table into the history information table 1826 together with the selected analysis target item (analysis target candidate).

At step S1912, the history analysis section 1827 carries out history analysis on the basis of the history information stored in the history information table 1826. The present process is a process of increasing the weight of the node information and the link information of the data item layer of the relationship network table 114 in regard to the analysis target items and the analysis data table placed in the history information table 1826.

Further, in the data model information table 1816 and the filtering information table 1823, corresponding information is updated together. By executing the present process, an item having a history of analysis in the analysis system can be presented preferentially by the analysis target item presentation section 1821, and a related data item can be referred to through the relationship network display 2113.

Further, in the present process, machine learning may be executed using a group of the analysis target items and the analysis data tables stored in the history information table 1826, information of corresponding data models, attributes of the relationship network, corresponding system layer, table layer and data value layer and so forth as teacher data such that, from among a plurality of analysis data tables existing for groups of same data items, the best table is presented to the analysis target item presentation section 1821. Further, whether a data value that is a result of a steady state analysis section hereinafter described in connection with a third embodiment is such "as planned" or such "as usual" or whether a data value is a deviating abnormal value may be stored into the history information table 1826 and learned as teacher data.

While, in the present embodiment, the analysis target item selection history of the data analysis system 104 is used as the history information, a data reference history, a selection history and so forth of the user in the data analysis support apparatus 101A may be placed as history information into the history information table 1826 and learned.

Further, in the present embodiment, an analysis in which a storage request is issued for an analysis carried out by a user may be stored into the history information table 1826 such that it is learned as teacher data.

Further, update of data of the source data storage section 113, namely, update of data values of operation information the operating systems 102 and 103 have, may be checked periodically such that, in the case where the history information table 1826 is referred to and a data value of an item analyzed already or referred to already is updated, the data value may be presented as an item to be analyzed again.

(3) Third Embodiment

A data analysis support system including a data analysis support apparatus 101B according to a third embodiment has a configuration substantially similar to the data analysis support system including the data analysis support apparatus 101 according to the first embodiment and the data analysis support system including the data analysis support apparatus 101A according to the second embodiment and executes substantially similar operation. In the following, description is given principally of differences between them.

The second embodiment demonstrates an example in which one data item that becomes an analysis target is determined in accordance with an input of a user and a data item to be analyzed in combination with the item is recommended. In contrast, in the third embodiment, an example is demonstrated in which, for one data item determined in accordance with a user input, candidates for a different data item that become a cause of the same are presented as analysis target items.

Figure 22A:
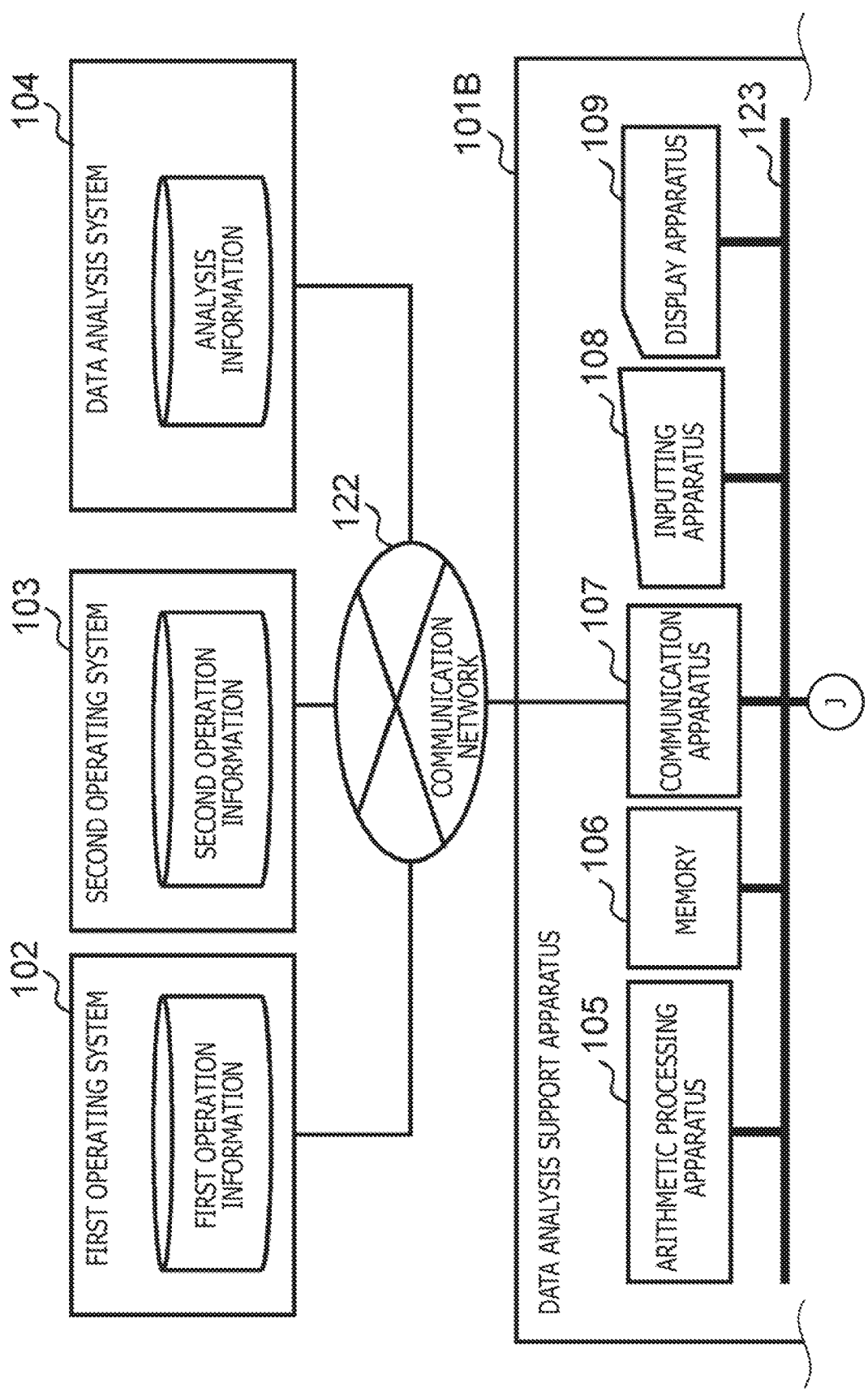
FIGS. 22A and 22B are block diagrams depicting an example of a system configuration of a data analysis support system including a data analysis support apparatus according to a third embodiment.
Figure 22B:
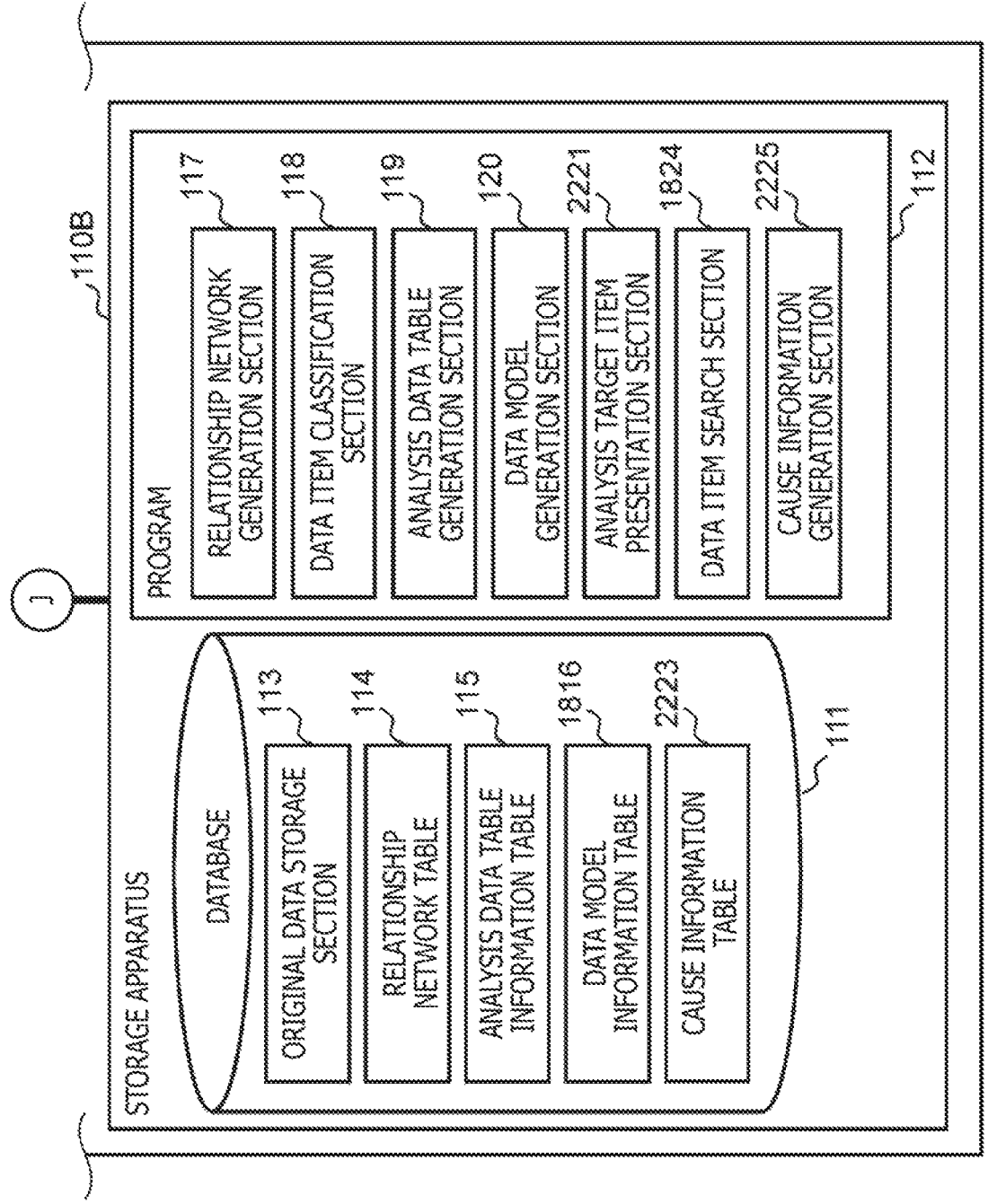

FIGS. 22A and 22B depict an example of a system configuration of the data analysis support apparatus according to the third embodiment. In the third embodiment, the filtering information table 1823 and the history information table 1826 are removed from and a cause information table 2223 is added to the configuration of the database 111 depicted in FIGS. 18A and 18B. Further, the filtering information generation section 1825 and the history analysis section 1827 are removed from and a cause information generation section 2225 is added to the configuration of the program 112. It is to be noted that, in FIGS. 22A and 22B, like components to those in FIGS. 18A and 18B are denoted by like reference characters and description of them is omitted.

The cause information generation section 2225 determines, if there is a data item having a high correlation to one data item determined by a user input, then targeting the data values other than the data value having a correlation, to which one of the other items the data value has a high correlation to successively extract candidates for a data item that becomes a cause, and accumulates the extracted candidates into the cause information table 2223.

Figure 23B:
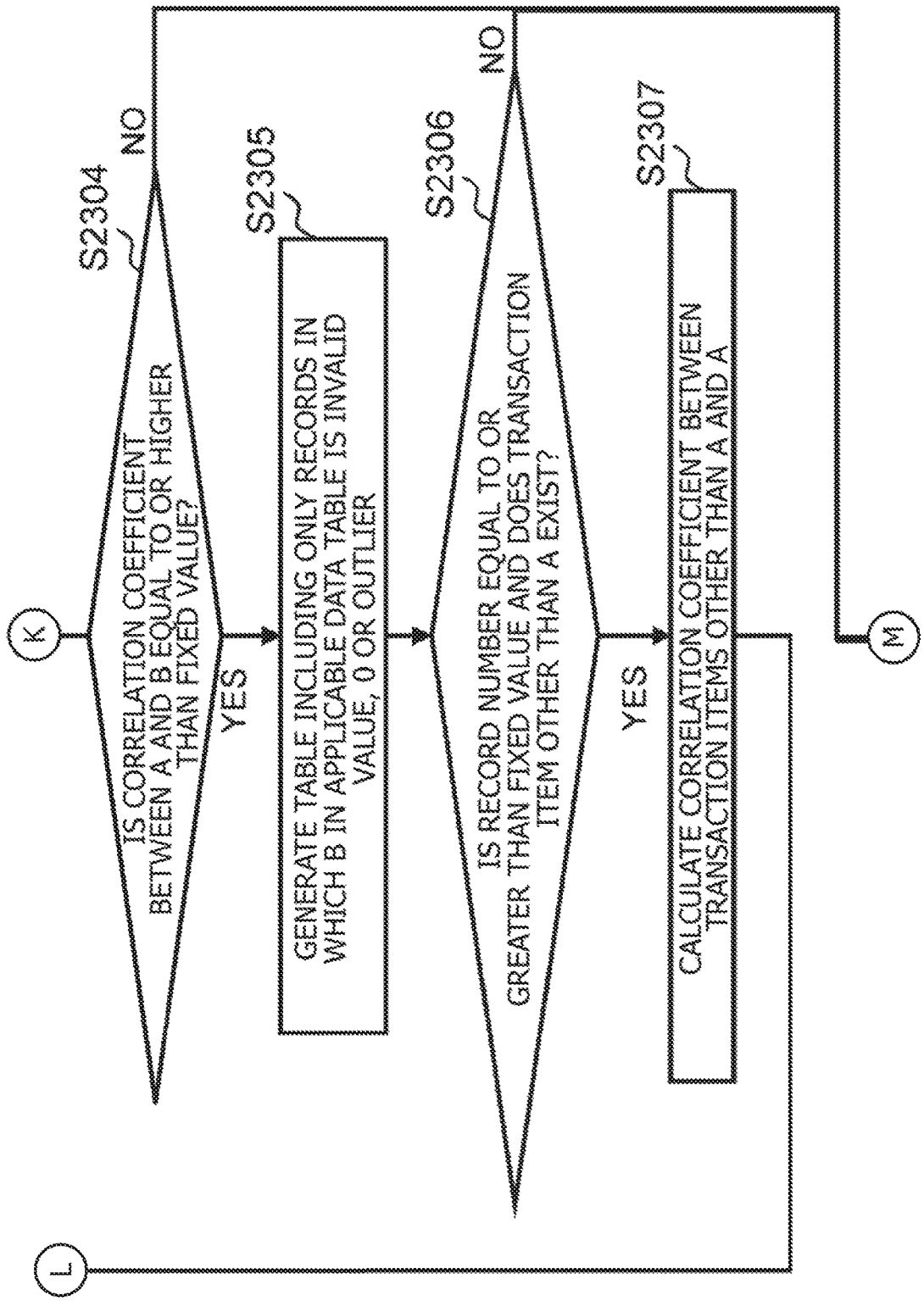
Figure 23C:
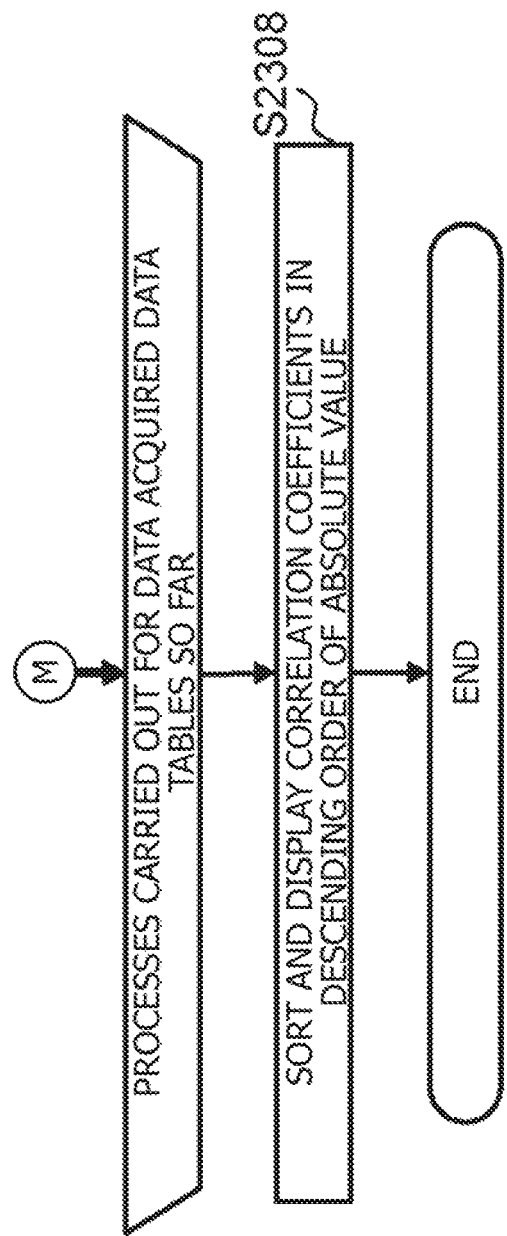

FIGS. 23A to 23C depict an example of a processing procedure of the cause information generation process. In this cause information generation process, the data item search section 1824 first searches for and extracts applicable data items in accordance with a keyword inputted from the user and then causes the display apparatus 109 to display the applicable data items like a table 2103. Now, an example of a processing procedure for generating cause information, by the cause information generation section 2225, for a data item selected using the radio button 2104 by the user is described with reference to FIG. 23.

The following description is given assuming that a data item that indicates that the type is transaction in a node of the data item layer of the relationship network table 114 is a transaction item.

First at step S2301, the cause information generation section 2225 determines the data item selected using the radio button 2104 by the user as A and extracts an analysis data table including a transaction item different from A in the analysis data table that includes A from within the analysis data table information table 115. The following processes are carried out for each of such analysis data tables extracted in this manner in the following manner.

At step S2302, the cause information generation section 2225 acquires a data item that has the highest correlation coefficient to A from among the transaction items the applicable analysis data table has and determines the acquired data item as B. The correlation coefficient refers to the correlation coefficient 1516 in the score 1503 of the data model information table 1816. In the case where a plurality of similar data items exist, the following is carried out for each data item.

At step S2303, the cause information generation section 2225 stores the data items A and B and the correlation coefficient between them into the cause information table 2223. At step S2304, the cause information generation section 2225 decides whether or not the correlation relationship between A and B is higher than a predetermined value. The present value may be registered in advance as a correlation coefficient that can be regarded as a cause into the system or may be determined for each item by the user. If the correlation relationship is higher than the predetermined value, then step S2305 is executed, but if the correlation relationship is not equal to or higher than the predetermined value, then the processing for the analysis data table is ended.

At step S2305, the cause information generation section 2225 generates an analysis data table by leaving, from records of the applicable analysis data table, those records whose data item B is an invalid value or 0 or an outliner and deleting the data item B.

At step S2306, the cause information generation section 2225 decides whether or not the record number of the analysis data table generated at step S2305 is equal to or greater than a fixed value and besides a transaction item other than A exists.

In the present embodiment, the record number is a record number with which a correlation coefficient between A and the other transaction items can be calculated. In the case where an affirmative result is obtained at step S2306 described above, step S2307 is executed, but in the case where an affirmative result is not obtained, the processing for the analysis data table is encoded.

At step S2307, the cause information generation section 2225 calculates a correction coefficient between A and each transaction item other than A using the analysis data table generated at step S2305. After the present step is executed, the cause information generation section 2225 executes step S2302 and continues the processing for the correlation coefficient between A and each transaction item in the analysis data table generated at step S2305.

After the foregoing processes are carried out for the analysis data tables, the cause information generation section 2225 executes step S2308. At step S2308, the cause information generation section 2225 sorts the groups of a data item and a correlation coefficient stored in the cause information table 2223 in regard to A in the descending order of the absolute value of the correlation coefficient and causes the display apparatus 109 to display the sorted groups. This makes it possible to display data items that become cause candidates for the data value of the data item selected by the user.

It is to be noted that, while, in the present embodiment, cause information is generated targeting all data values, in place of this, a steady state analysis section that determines a steady state of a transaction item regarding each analysis data table may be provided such that display of a node whose data values are only "as planned" and "as usual" is not performed but only a node whose data value deviates is presented as an analysis target and only a cause of an abnormal value is displayed.

The steady state analysis section carries out a process for each transaction item of each analysis data table. When the applicable transaction item is A, this steady state analysis section carries out the following processes for each master item (the applicable data item is represented by B). The steady state analysis section decomposes a set whose components are data values of A in the applicable analysis data table for each data value of B into partial sets, and distributions of the data values of A in the individual partial sets are compared with each other. Further, the steady state analysis section unites partial sets having a same distribution as a group together with data values of corresponding B and determines the most distribution as a steady state of A at the data values of corresponding B. For example, a delay time is decomposed for each date, and an ordinary distribution in weekdays of the delay time is determined as a steady state.

It is to be noted that the present invention is not limited to the embodiments described above but includes various modifications. For example, the embodiments described above are described in detail in order to explain the present invention in a straightforward manner and are not necessarily restricted to those that include all components of the embodiments described hereinabove. Further, part of the components of the embodiments can be replaced with a configuration of a different data analysis support related apparatus not detected. Further, in regard to part of the components of the embodiments, it is possible to perform addition, deletion or replacement of a different component.

Further, the configurations, functions, processing sections, processing means and so forth described above may partly or entirely implemented by hardware, for example, by designing them as an integrated circuit or the like. Further, the configurations, functions and so forth described above may be represented by software by a processor interpreting and executing a program for implementing the individual functions. Information of a program for implementing the functions, tables, files and so forth can be placed into a recording apparatus such as a memory, a hard disk, a SSD (Solid State Drive) or the like or a recording medium such as an IC card, an SD card, a DVD or the like.

Further, control lines and information lines are depicted only in regard to those that are considered necessary for description, and all control lines or information lines necessary for a product are not necessarily depicted. It may be considered that actually almost all components are connected to each other.

Although, in the present embodiments, a data analysis support apparatus when data relating to a railway are analyzed are an example of an application target of the present invention, in the case where the present invention is applied to a data analysis support apparatus relating to maintenance of a railway, there is the possibility that a failure of a car or a line may be detected by analysis before failure, and resources of a railway can be operated efficiently and energy consumption can be suppressed.

(4) Other Embodiments

The embodiments described above are exemplary for description of the present invention, and it is not intended to restrict the present invention only to the embodiments. The present invention can be carried out in various forms without departing from the subject matter thereof. For example, although, in the description of the embodiments, processes of various programs are described sequentially, this is not particularly restrictive. Accordingly, unless a processing result is contradictory, the order of the processes may be changed or the processes may operate in parallel.

INDUSTRIAL APPLICABILITY

The present invention can be applied widely to a data analysis support apparatus and a data analysis support system that support data analysis targeting data of a plurality of systems.

DESCRIPTION OF REFERENCE CHARACTERS 101, 101A, 101B: Data analysis support apparatus
102: First operating system
103: Second operating system
104: Data analysis system
105: Arithmetic processing apparatus
106: Memory
107: Communication apparatus
108: Inputting apparatus
109: Display apparatus
110: Storage apparatus
111: Database
112: Program
113: Source data storage section
114: Relationship network table
115: Analysis data table information table
116: Data model information table
117: Relationship network generation section
118: Data item classification section
119: Analysis data table generation section
120: Data model generation section
121: Analysis target item presentation section
122: Communication network
123: Data bus

The invention claimed is:

1. A data analysis support apparatus for maintenance of a railway that supports analysis targeting operation data of operation data tables in at least one or more operating systems in a railway system, comprising:
an arithmetic processing apparatus; and
a memory coupled to the arithmetic processing apparatus and storing a program, which when executed by the arithmetic processing apparatus causes the arithmetic processing apparatus to:
classify data items possessed by the individual operation data into a first data type based on an actual value and a second data type based on a planned value or a pre-definition;
generate a relationship between the operating systems in the railway system, a relationship between the operation data tables, a relationship between the data items possessed by the operation data tables and a relationship between data values possessed by records of the operation data tables, as a relationship network;
generate, based on the relationship network, an analysis data table that includes at least one data items included in the first data type;
calculate a score, for analysis target candidates configured from combinations of the data items, and a score to be used as an analysis recommendation degree based on the analysis data table; and
output the analysis target candidates together with the analysis recommendation degrees based on the scores which indicate a potential failure of a railway car or a railway line prior to occurrence of the potential failure.

2. The data analysis support apparatus according to claim 1, wherein the arithmetic processing apparatus:

generates the analysis data table used for analysis in a form in which a plurality of data items that can be analyzed in combination from among the data items are combined, and outputs and transmits the analysis data table in response to a request from an outside.

3. The data analysis support apparatus according to claim 2, wherein the arithmetic processing apparatus generates the relationship network that retains at least one of relationships between sites that have the individual operating systems, between the operating systems, between the data tables, between the data items and between the data values, integrates data groups having a relationship to each other and outputs the data group together with the relationships.

4. The data analysis support apparatus according to claim 1, wherein the program further causes the arithmetic processing apparatus to:

extract a particular data item that corresponds to a keyword inputted from an outside; and extract and accumulate data items by narrowing down the analysis data table with particular data of the particular data item based on the scores.

5. The data analysis support apparatus according to claim 1, wherein, where a particular one or more ones of the data items extracted include a particular data item having a correlation relationship greater than a predetermined value, it is decided for each of the data values other than the data values having the correlation relationship, to which one of the other items the correlation relationship is greater than the predetermined value, and candidates for a data item that becomes a cause are successively extracted, whereafter the data items that become a cause of the value of the data item related to the keyboard inputted from the outside.

6. The data analysis support apparatus according to claim 5, wherein the program further causes the arithmetic processing apparatus to:

determine a steady state of a data item based on an actual value in regard to each of the analysis data tables; and integrate, from among data items based on actual values of the analysis data tables, the data items having distributions same as each other as groups and determines a most distribution as a steady state.

7. The data analysis support apparatus according to claim 1, wherein the memory includes a history information table configured to store history information of the analysis data table together with the analysis target candidates; and wherein the program causes the arithmetic processing apparatus to carry out history analysis by learning based on the history information stored in the history information table.

8. A data analysis support system comprising:

a data analysis support apparatus for maintenance of a railway that supports analysis targeting operation data of operation data tables in one or more operating systems in a railway system, the data analysis support apparatus including:

an arithmetic processing apparatus;

a memory coupled to the arithmetic processing apparatus and storing a program, which when executed by the arithmetic processing apparatus causes the arithmetic processing apparatus to:

classify data items possessed by the individual operation data into a first data type based on an actual value and a second data type based on a planned value or a pre-definition;

generate a relationship between the operating systems in the railway system, a relationship between the operation data tables, a relationship between the data items possessed by the operation data tables and a relationship between data values possessed by records of the operation data tables, as a relationship network;

generate, based on the relationship network, an analysis data table that includes at least one data items included in the first data type;

calculate a score, for analysis target candidates configured from combinations of the data items, a score to be used as an analysis recommendation degree based on the analysis data table; and output the analysis target candidates together with the analysis recommendation degrees based on the scores which indicate a potential failure of a railway car or a railway line prior to occurrence of the potential failure; and an analysis apparatus configured to determine an analysis target item based on the analysis target candidates outputted from the data analysis support apparatus.

* * * * *